(12) United States Patent
Tang et al.

(10) Patent No.: US 10,798,738 B2
(45) Date of Patent: Oct. 6, 2020

(54) DEVICE AND METHOD

(71) Applicant: SONY CORPORATION, Tokyo (JP)

(72) Inventors: Yifu Tang, Kanagawa (JP); Hiromasa Uchiyama, Tokyo (JP); Hiroaki Takano, Saitama (JP); Atsushi Yoshizawa, Kanagawa (JP); Kazuyuki Shimezawa, Chiba (JP)

(73) Assignee: SONY CORPORATION, Tokyo (JP)

( * ) Notice: Subject to any disclaimer, the term of this patent is extended or adjusted under 35 U.S.C. 154(b) by 78 days.

(21) Appl. No.: 16/078,374

(22) PCT Filed: Feb. 23, 2017

(86) PCT No.: PCT/JP2017/006738
§ 371 (c)(1),
(2) Date: Aug. 21, 2018

(87) PCT Pub. No.: WO2017/169348
PCT Pub. Date: Oct. 5, 2017

(65) Prior Publication Data
US 2019/0059091 A1    Feb. 21, 2019

(30) Foreign Application Priority Data
Mar. 31, 2016   (JP) ................................ 2016-073260

(51) Int. Cl.
*H04W 74/08*    (2009.01)
*H04W 4/40*    (2018.01)
*H04W 72/08*    (2009.01)
*H04W 4/46*    (2018.01)

(52) U.S. Cl.
CPC ......... *H04W 74/0808* (2013.01); *H04W 4/40* (2018.02); *H04W 4/46* (2018.02); *H04W 72/08* (2013.01)

(58) Field of Classification Search
CPC .... H04W 74/0808; H04W 4/40; H04W 72/08
See application file for complete search history.

(56) References Cited

U.S. PATENT DOCUMENTS

2015/0327180 A1* 11/2015 Ryu ......................... H04L 1/00
                                                           370/329
2017/0188391 A1*  6/2017 Rajagopal ......... H04W 74/0816

FOREIGN PATENT DOCUMENTS

JP         2015-508943 A        3/2015

OTHER PUBLICATIONS

International Search Report dated May 16, 2017 in PCT/JP2017/006738 filed Feb. 23, 2017.

(Continued)

*Primary Examiner* — Curtis A Alia
(74) *Attorney, Agent, or Firm* — Xsensus LLP

(57) ABSTRACT

[Object] To provide a device capable of performing efficient resource sensing in V2X communication.
[Solution] Provided is a device including a processing unit configured to perform sensing using one of first sensing of sensing resources for a predetermined period and selecting communication resources on a basis of a result of the sensing and second sensing of selecting communication resources on a basis of a result of decoding control information transmitted by another user with reference to a mapping table at the time of the first sensing and the second sensing.

20 Claims, 57 Drawing Sheets

(56) References Cited

OTHER PUBLICATIONS

LG Electronics, "Summary of V2V offline summary", 3GPP TSG-RAN WG1#84, R1-161405, Feb. 24, 2016, retrieved from <URL:http://www.3gpp.org/ftp/tsg_ran/WG1_RL1/TSGR1_84/Docs/R1-161405.zip>, 2 pages.

Oshima, K. et al., "A study on controlling QoS-aware channel access of DSA system in 2.4 GHz ISM band," IEICE Technical Report, Feb. 29, 2012, vol. 11, No. 452, 33 pages, (with English translation).

Endo, T. et al., "A Study on Station Clustering Strategy for Centralized PFDMA WLAN Systems," Proceedings of the 2013 IEICE General Conference Tsushin 1, Mar. 5, 2013, 5 pages, (with English translation).

\* cited by examiner

FIG. 37
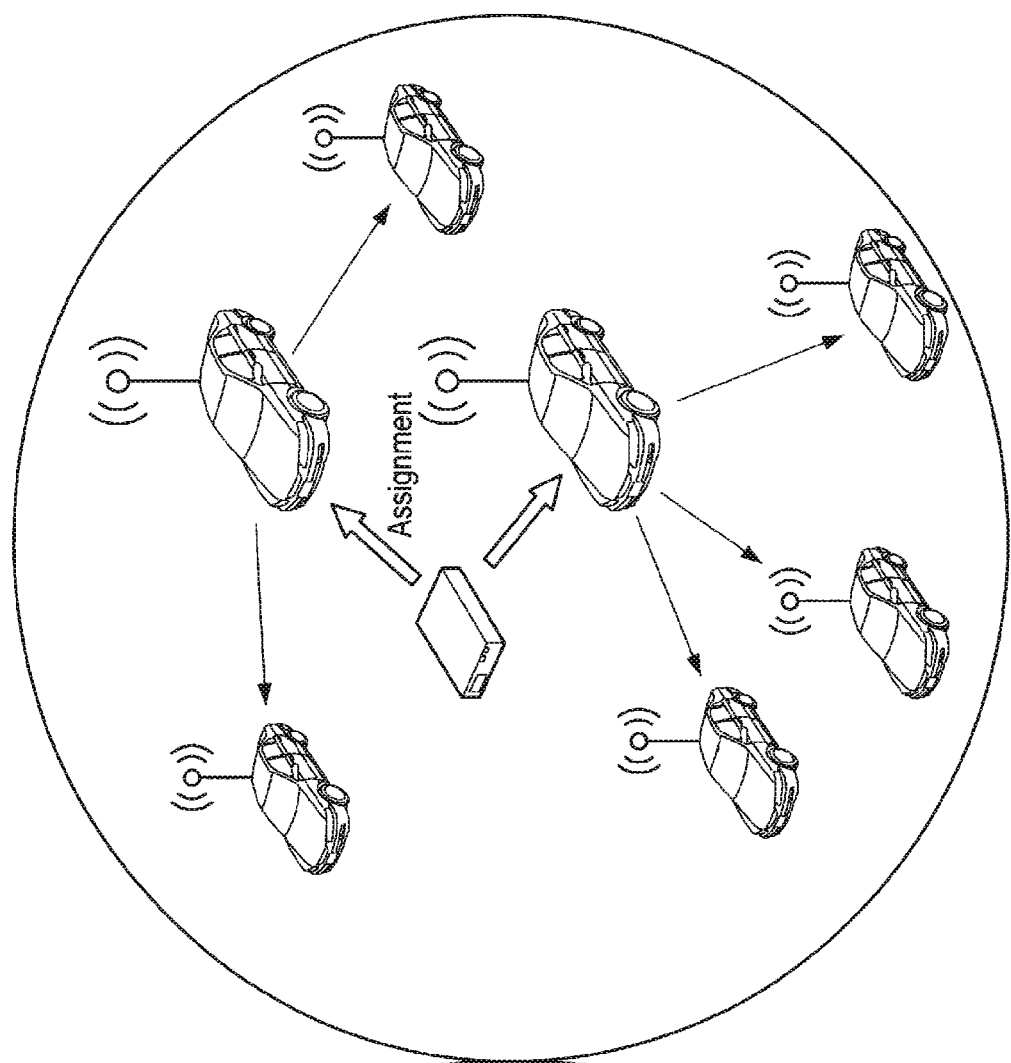
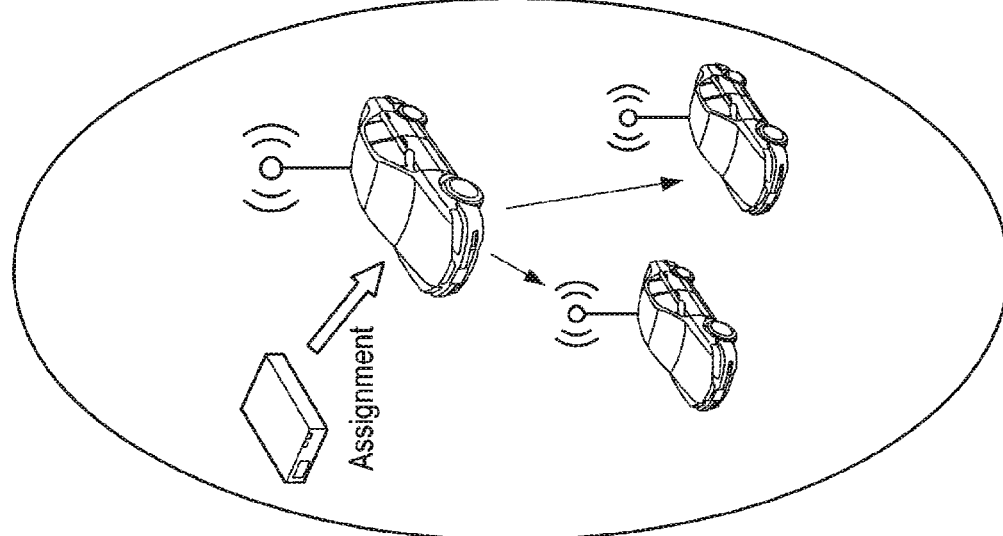

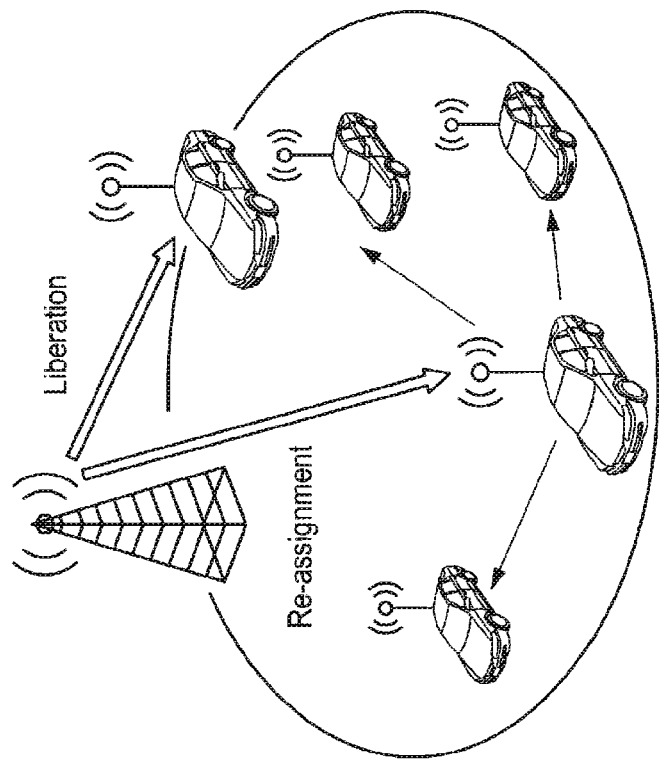
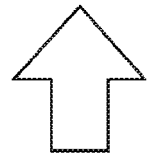
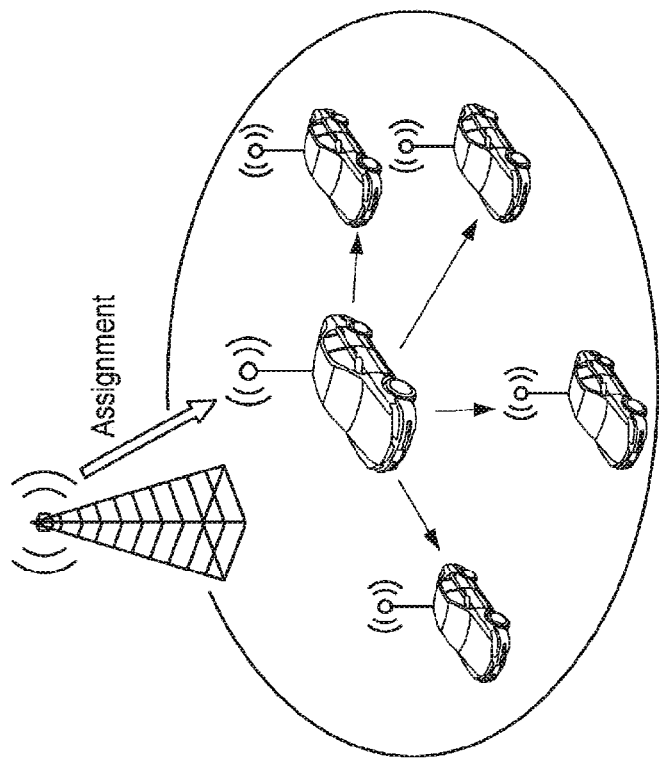
FIG. 40

DEVICE AND METHOD

TECHNICAL FIELD

The present disclosure relates to a device and a method.

BACKGROUND ART

Techniques for assigning resources in device to device (D2D) communication between terminal devices have been disclosed (for example, Patent Literature 1).

On the other hand, in recent years, anticipation of in-vehicle communication (V2X communication) to implement future automatic driving has been increasing. "V2X communication" is an abbreviation of "vehicle to X communication" and refers to a system in which a "vehicle" communicates with an "object." Here, examples of the "object" include a vehicle, a facility (infrastructure/network), and a pedestrian (V2V, V2I/N, and V2P). As wireless communication for vehicles, development of 802.11p-based dedicated short range communication (DSRC) has mainly advanced so far, but in recent years, discussions on standardization of "LTE-based V2X" which is LTE-based in-vehicle communication have started.

CITATION LIST

Patent Literature

Patent Literature 1: JP 2015-508943T

DISCLOSURE OF INVENTION

Technical Problem

The present disclosure proposes a device and a method which are novel and improved and capable of performing efficient resource sensing in V2X communication.

Solution to Problem

According to the present disclosure, there is provided a device including a processing unit configured to perform sensing using one of first sensing of sensing resources for a predetermined period and selecting communication resources on a basis of a result of the sensing and second sensing of selecting communication resources on a basis of a result of decoding control information transmitted by another user with reference to a mapping table at the time of the first sensing and the second sensing.

In addition, according to the present disclosure, there is provided a method including performing sensing using one of first sensing of sensing resources for a predetermined period and selecting communication resources on a basis of a result of the sensing and second sensing of selecting communication resources on a basis of a result of decoding control information transmitted by another user with reference to a mapping table at the time of the first sensing and the second sensing.

Advantageous Effects of Invention

As described above, according to the present disclosure, it is possible to provide a device and a method which are novel and improved and capable of performing efficient resource sensing in V2X communication.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 37 is an explanatory diagram illustrating an example in which a representative UE performs sensing.

FIG. 40 is an explanatory diagram illustrating an example in which a representative UE is freed in a case in which separated from a current eNB.

MODE(S) FOR CARRYING OUT THE INVENTION

Figure 1:
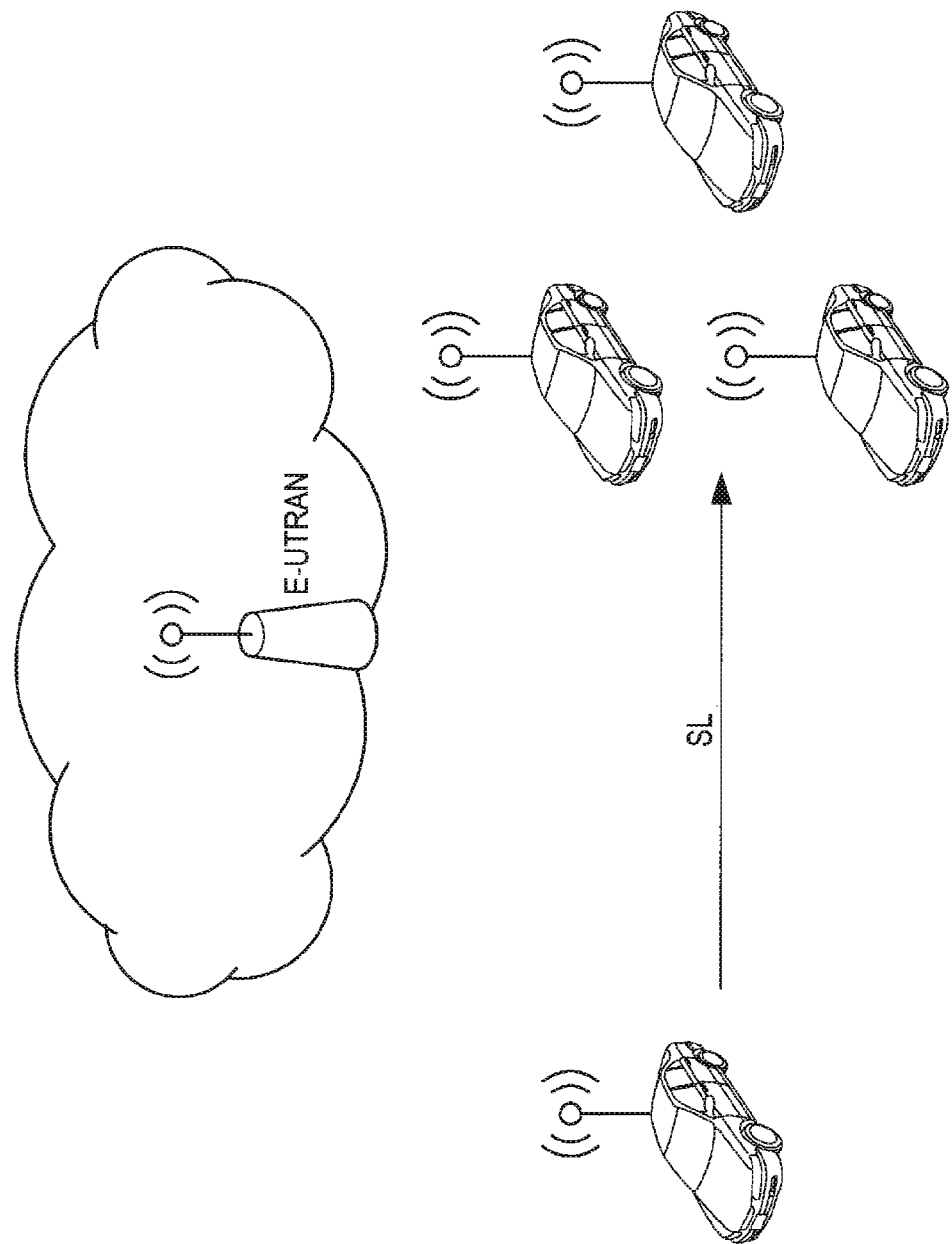
FIG. 1 is an explanatory diagram for describing a V2X operation scenario.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will proceed in the following order.
1. Embodiment of present disclosure
1.1. Overview
1.2. Example
1.3. Configuration example
2. Application examples

1. EMBODIMENT OF PRESENT DISCLOSURE 1.1. Overview

First, an overview of an embodiment of the present disclosure will be described.

As described above, in recent years, anticipation of in-vehicle communication (V2X communication) to implement future automatic driving has been increasing. "V2X communication" is an abbreviation of "vehicle to X communication" and refers to a system in which a "vehicle" communicates with an "object." Here, examples of the "object" include a vehicle, a facility (infrastructure/network), and a pedestrian (V2V, V2I/N, and V2P). As wireless communication for vehicles, development of 802.11p-based DSRC has mainly advanced so far, but in recent years, discussions on standardization of "LTE-based V2X" which is LTE-based in-vehicle communication have started.

Examples of cases in which V2X communication is used are listed below. There have been demands for communication such as periodic message transmission in which a message is periodically transmitted to a vehicle for the purpose of safety or an event trigger message providing necessary information in accordance with an event (3GPP TR 22.885).

(V2X Use Case Examples)
1. Forward collision warning
2. Control loss warning
3. V2V use case for emergency vehicle warning
4. V2V emergency stop use case
5. Cooperative adaptive cruise control
6. V2I emergency stop use case
7. Queue warning
8. Road safety services
9. Automated parking system
10. Wrong way driving warning
11. V2V message transfer under operator control
12. Pre-crash sensing warning
13. V2X in areas outside network coverage
14. V2X road safety service via infrastructure
15. V2I/V2N traffic flow optimization
16. Curve speed warning
17. Warning to pedestrian against pedestrian collision
18. Vulnerable road user (VRU) safety 19. V2X by UE type RSU
20. V2X minimum QoS
21. Use case for V2X access when roaming
22. Pedestrian road safety via V2P awareness messages
23. Mixed use traffic management
24. Enhancing positional precision for traffic participants Examples of requirements based on these use cases are shown below.

TABLE 1

(Example parameters for V2X Services)

| | Effective range | Absolute velocity of a UE supporting V2X Services | Relative velocity between 2 UEs supporting V2X Services |
|---|---|---|---|
| #1 (suburban) | 200 m | 50 kmph | 100 kmph |
| #2 (freeway) | 320 m | 160 kmph | 280 kmph |
| #3 (autobahn) | 320 m | 280 kmph | 280 kmph |
| #4 (NLOS/urban) | 150 m | 50 kmph | 100 kmph |
| #5 (urban intersection**) | 50 m | 50 kmph | 100 kmph |
| #6 (campus/shopping area) | 50 m | 30 kmph | 30 kmph |

| | Maximum tolerable latency | Minimum radio layer message reception reliability (probability that the recipient gets it within 100 ms) | Example Cumulative transmission reliability |
|---|---|---|---|
| #1 (suburban) | 100 ms | 90% | 99% |
| #2 (freeway) | 100 ms | 80% | 96% |
| #3 (autobahn) | 100 ms | 80% | 96% |
| #4 (NLOS/urban) | 100 ms | 90% | 99% |
| #5 (urban intersection**) | 100 ms | 95% | — |
| #6 (campus/shopping area) | 100 ms | 90% | 99% |

To achieve the above requirements, standardization of a physical layer of V2X communication has already started in 3GPP. V2I/N and V2P have been standardized while focus has been performed focusing on standardization of the V2V communication which is inter-vehicle communication.

A base technology of V2X communication is D2D communication which was standardized in 3GPP in the past. Since D2D communication is inter-terminal communication that does not go through a base station, enhancing it by applying it to V2V communication and V2P communication (it can also be applied to some V2I communication) can be considered. Such an interface between terminals is referred to as a PC5 interface.

Further, enhancing V2I communication and V2N communication by applying them to existing communication between a base station and a terminal can be considered. Such an interface between a base station and a terminal is referred to as a Uu interface.

As described above, in order to implement V2X communication, it is necessary to enhance the PC5 interface and the Uu interface to meet the requirements.

The main enhancement points include, for example, improvement of resource allocation, countermeasures against a Doppler frequency, establishment of a synchronization technique, implementation of low power consumption communication, implementation of low delay communication, and so on.

(V2X Operation Scenario)

A V2X operation scenario will be described. It is based on the V2V communication. Further, in the following description, if one automobile is replaced with a pedestrian, it becomes V2P communication, and in a case in which it terminates at a facility or a network, it becomes V2I/N communication.

Figure 2:
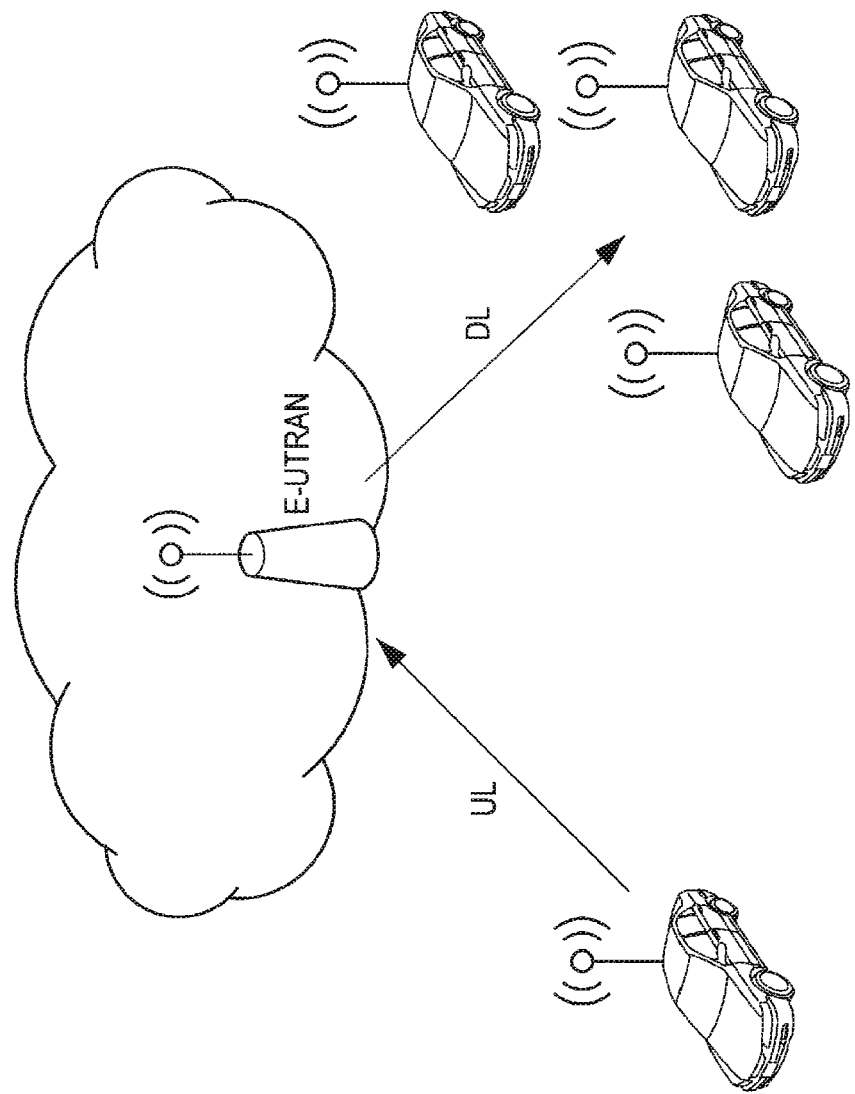
FIG. 2 is an explanatory diagram for describing a V2X operation scenario.
Figure 3:
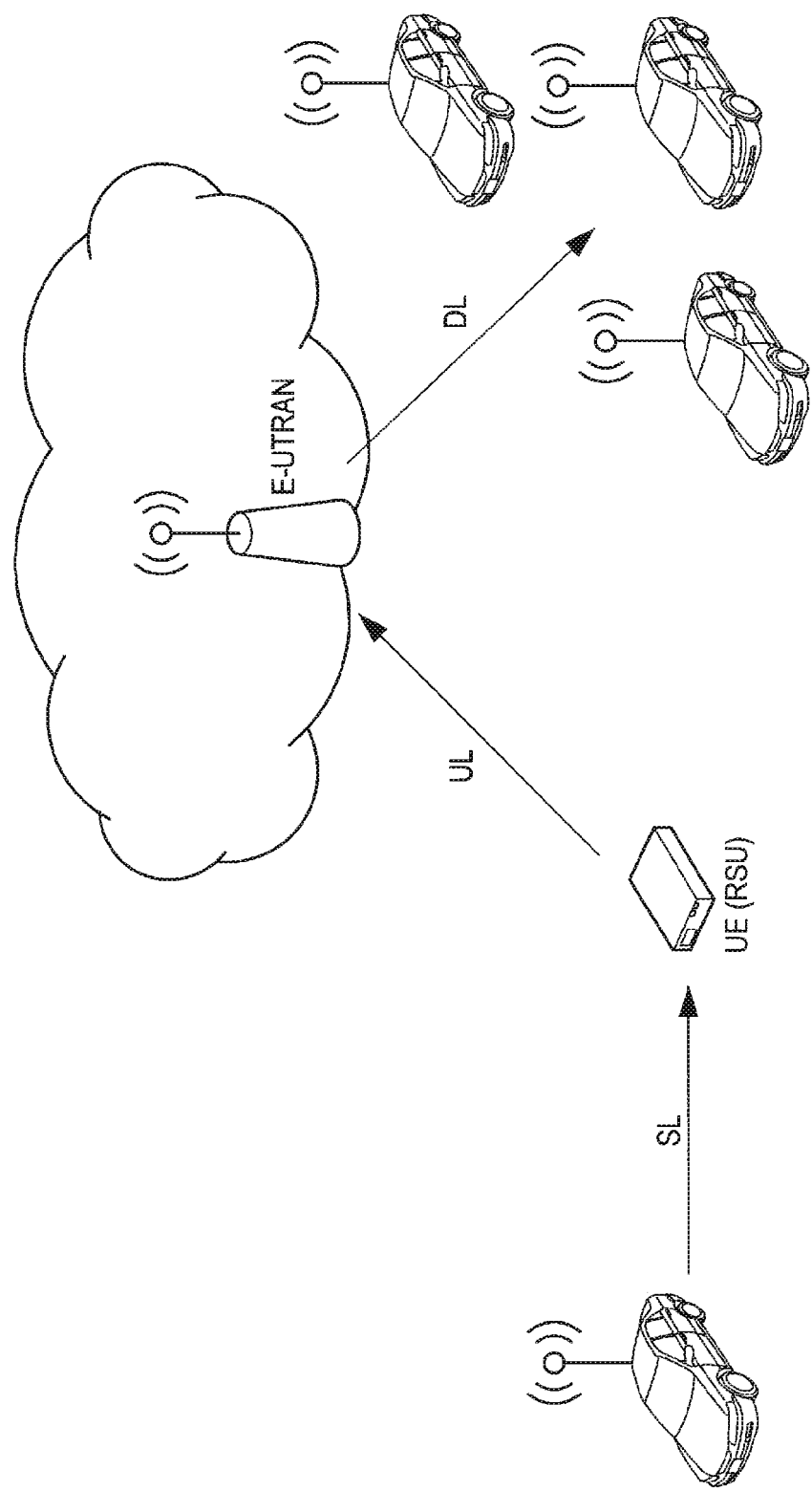
FIG. 3 is an explanatory diagram for describing a V2X operation scenario.
Figure 4:
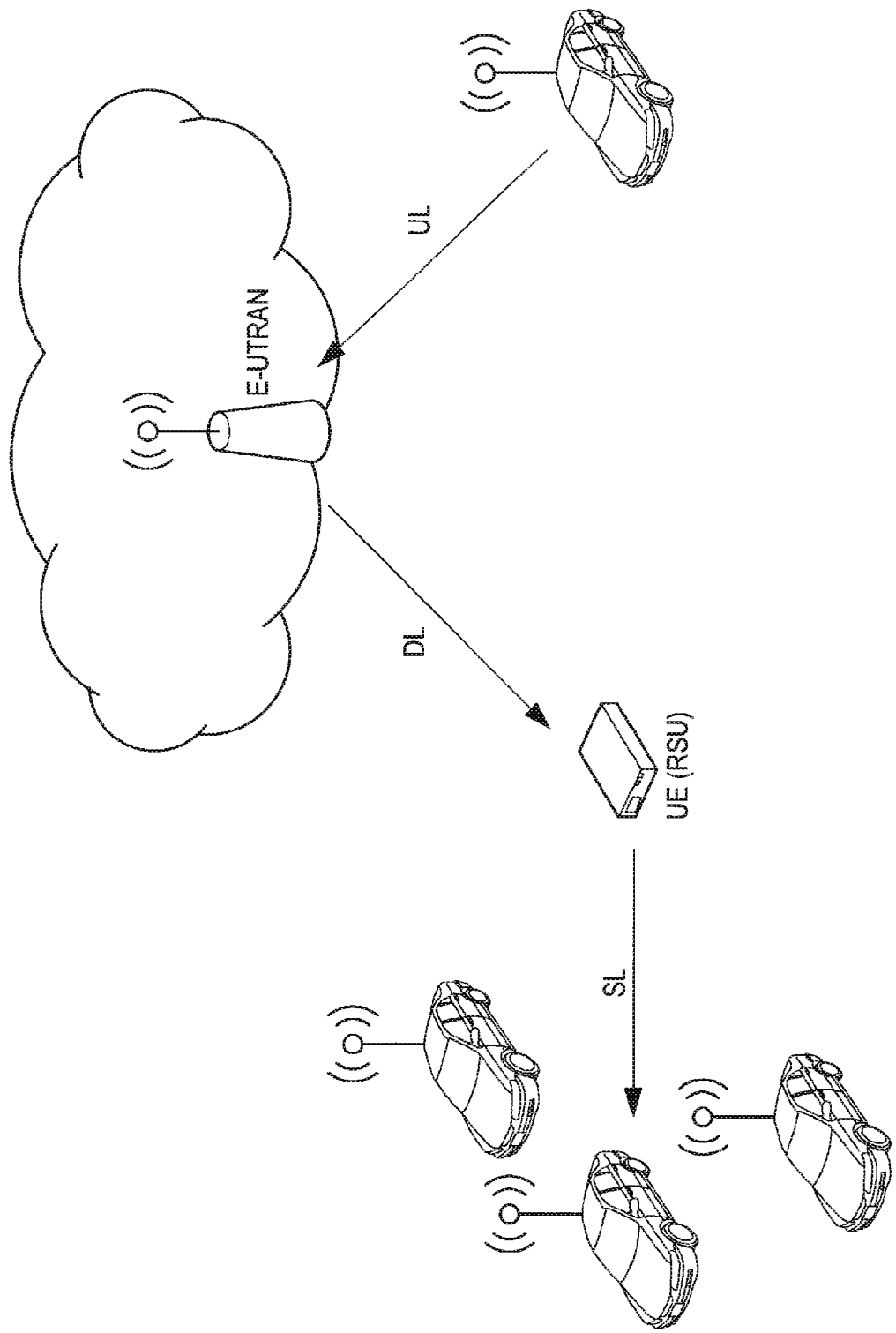
FIG. 4 is an explanatory diagram for describing a V2X operation scenario.
Figure 5:
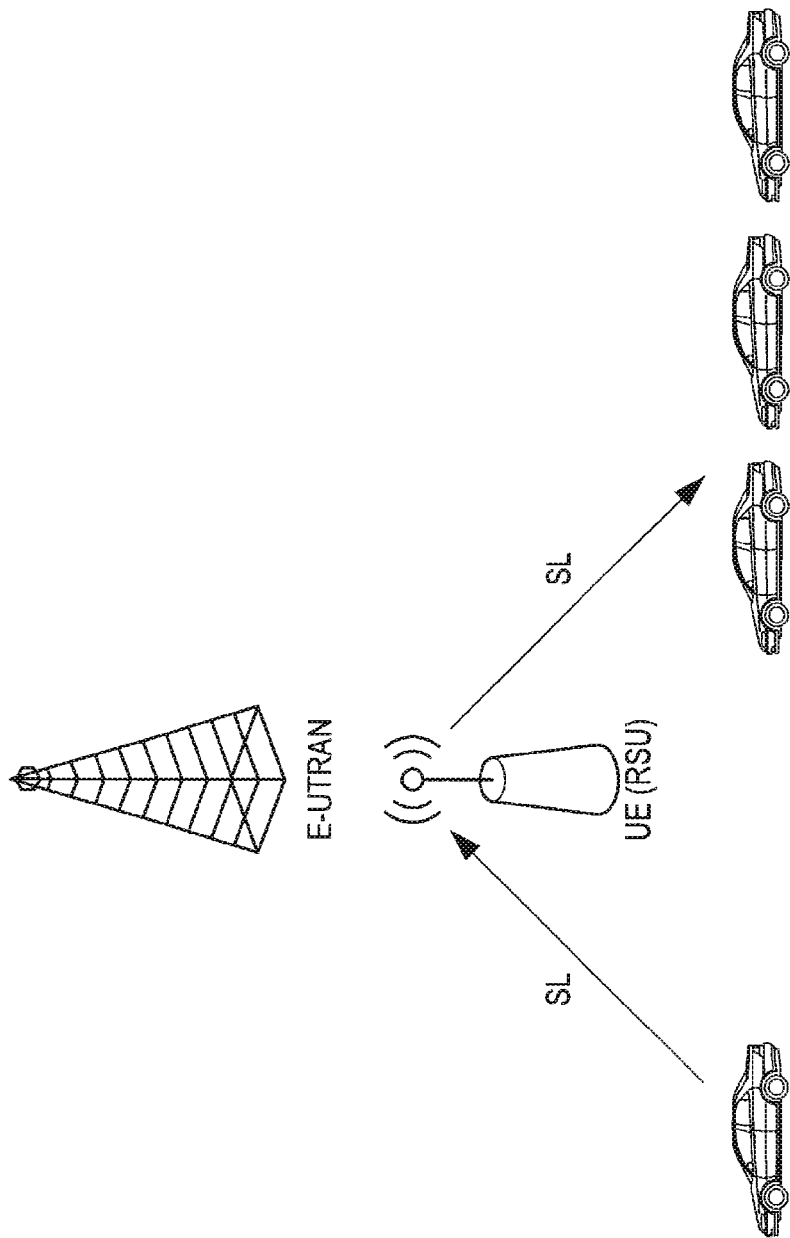
FIG. 5 is an explanatory diagram for describing a V2X operation scenario.

FIG. 1 to FIG. 5 are explanatory diagrams for describing the V2X operation scenario. FIG. 1 illustrates a scenario in which vehicles communicate directly with each other without a base station (E-UTRAN). FIG. 2 illustrates a scenario in which vehicles communicate via a base station. FIGS. 3 and 4 illustrate a scenario in which vehicles communicate via a terminal (a UE, here, a roadside wireless device (RSU)) and a base station. FIG. 5 illustrates a scenario in which vehicles communicate via a terminal (a UE, here, a roadside wireless device (RSU)).

Since V2X communication is different from D2D in communication requirements, communication environment, or the like, the existing D2D communication is unable to be used without change. Therefore, it is necessary to enhance it to a form of adapting to V2X communication. Feature differences between D2D communication and V2X communication are illustrated below.

(1) V2X communication is high in reliability and needs low delay communication.
(2) There is traffic specific to V2X.
(3) V2X has various links.
(4) An in-band emission (IBE) problem.
(5) A half duplex (HD) problem.
(6) There is a problem in that a capacity is larger than that in D2D.
(7) Position information is consistently obtained.

First, (1) is obvious from the use cases of V2X communication. V2X communication has many safety purposes, and the reliability is a very important index. Further, since a moving speed of a vehicle is faster than that in a walking use case of D2D, implementation of low delay communication is necessary.

For the traffic specific to V2X of (2), mainly two types of traffic, that is, periodic traffic and event trigger traffic, are assumed in V2X communication. The periodic traffic is communication of periodically notifying peripheral vehicles of data, and it is also a feature of V2X.

For the various links of (3), V (vehicle)/I (infrastructure)/N (network)/P (pedestrian) are assumed as communication targets (X) of the vehicle in V2X communication. A point having such various links is also unique to V2X communication.

Figure 6:
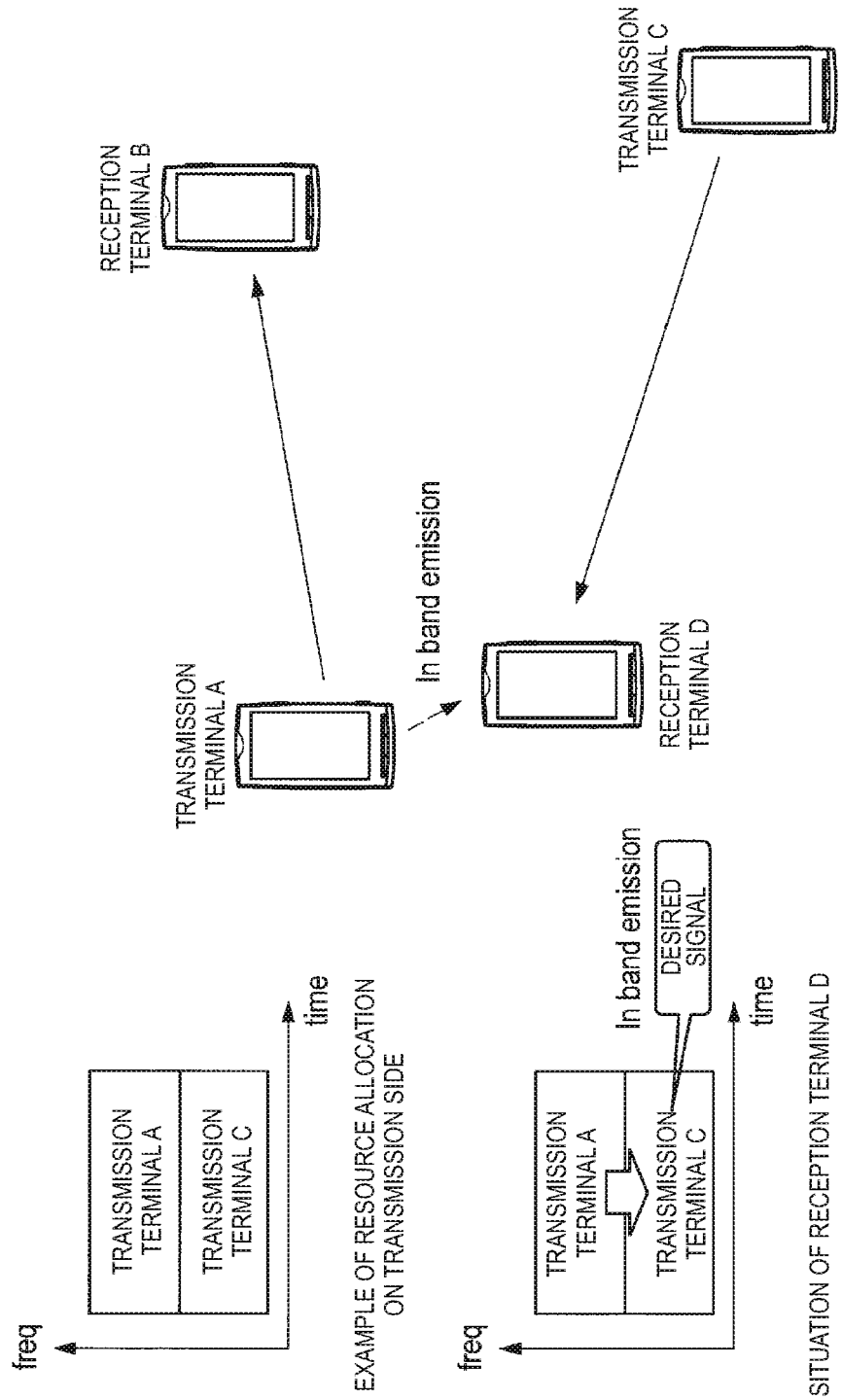
FIG. 6 is an explanatory diagram for describing an IBE.

The IBE problem of (4) and the HD problem of (5) are related to topology and RF performance of a terminal. First, the IBE will be described with reference to FIG. 6. Unlike the communication between the base station and the terminal, in the V2V communication, a position relation between a transmission terminal and a reception terminal consistently changes. In a case in which there is a reception terminal near the transmission terminal, emission from a transmission side may affect a nearby reception terminal. The orthogonality is maintained on a frequency axis, but influence of the IBE becomes remarkable from the proximity of the distance between the transmission terminal and the reception terminal. In FIG. 6, a transmission terminal A gives the IBE to a reception terminal D. As described above, in a case in which the distance between the transmission terminal and the reception terminal is short, there is a possibility of interference occurring in adjacent resources on the frequency. This problem can happen even in D2D. However, in V2X communication in which more terminals communicate than that in D2D, the IBE problem becomes more noticeable.

The HD problem of (5) refers to a problem in that the terminal is unable to perform reception while performing transmission. For this reason, it is necessary to cope with it, for example, it is necessary to prepare two or more opportunities for receiving, and it is necessary to prevent transmission of other users from being assigned in a frame for transmitting data. The HD problem is not a problem specific to V2X, but it is a big restriction in V2X communication in which it is necessary to perform much transmission and reception.

Next, the capacity of (6) will be described. As described above, in V2X communication, the number of accommodated terminals is larger than that in D2D communication. Further, as an automobile travels on the road, a terminal density inevitably increases locally. For this reason, the improvement in the capacity is indispensable in V2X communication. It is necessary to eliminate as much unnecessary overhead and the like as possible and implement efficient communication.

The reason why the position information of the last (7) can consistently be obtained is because an automobile consistently knows its position information as can be seen from a navigation system installation of an automobile in recent years. Such position information becomes a very important feature in enhancing V2X communication.

Figure 7:
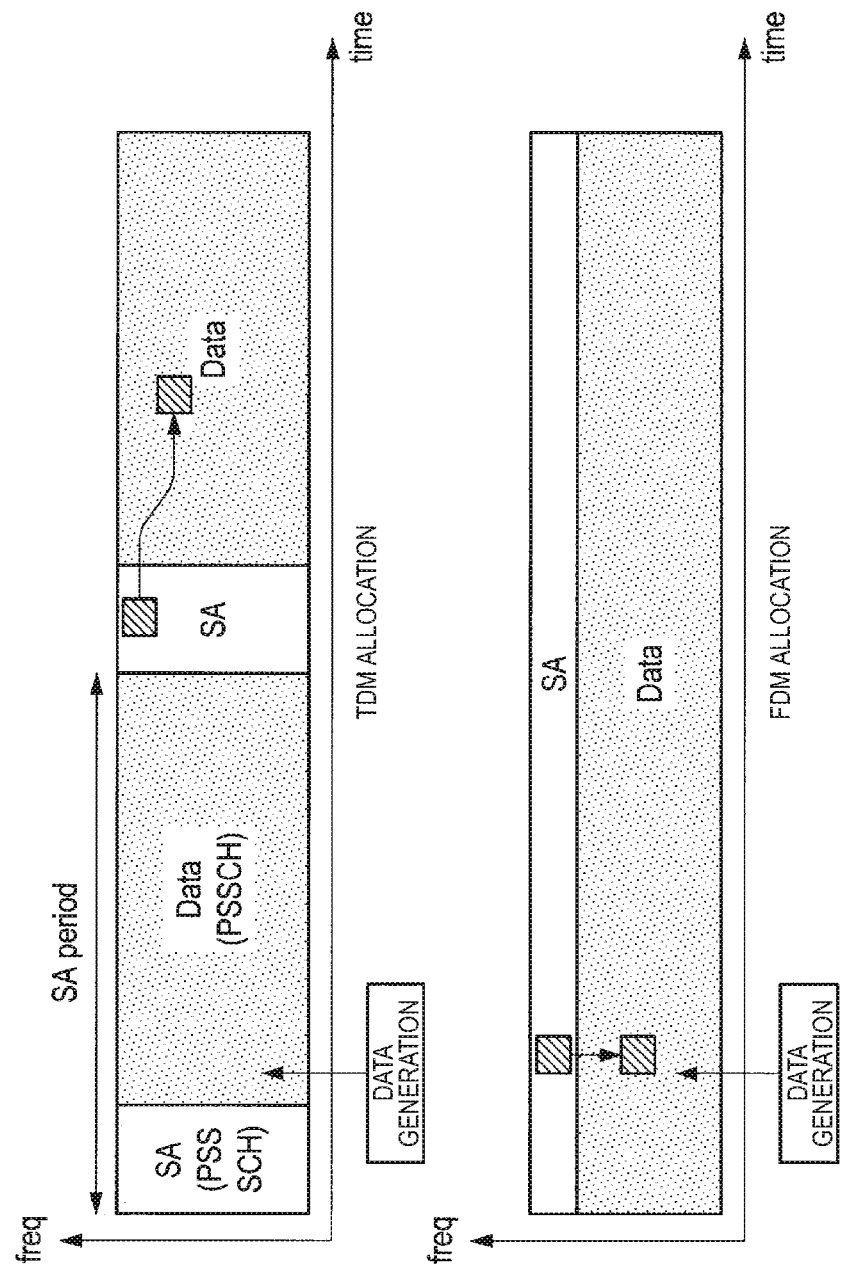
FIG. 7 is an explanatory diagram for describing TDM allocation and FDM allocation.

In order to solve these problems, a resource allocation method using frequency division multiplexing (FDM) is currently under review in 3GPP. Time division multiplexing (TDM) assignment and FDM assignment will be described with reference to FIG. 7. The PC5 interface in which D2D communication and V2X communication are performed is mainly configured with a control channel unit (physical sidelink control channel (PSCCH)) and a data channel unit (physical sidelink shared channel (PSSCH)).

Since a notification of a PSSCH resource indication or the like is performed in the PSCCH, there is a problem that a delay from generation to transmission of a packet becomes large in the TDM scheme. On the other hand, there is an advantage in that complexity of a terminal is excellent. Further, in D2D, the TDM assignment scheme is adopted. On the other hand, in the FDM scheme, since the PSCCH is mapped in the frequency direction, the delay is improved. Further, the problems of the IBE and the HD can be expected to be improved by transmitting scheduling assignment (SA) and data in the same SF (subframe). Therefore, in V2X communication, establishment of a communication method using the FDM scheme is necessary.

Figure 8:
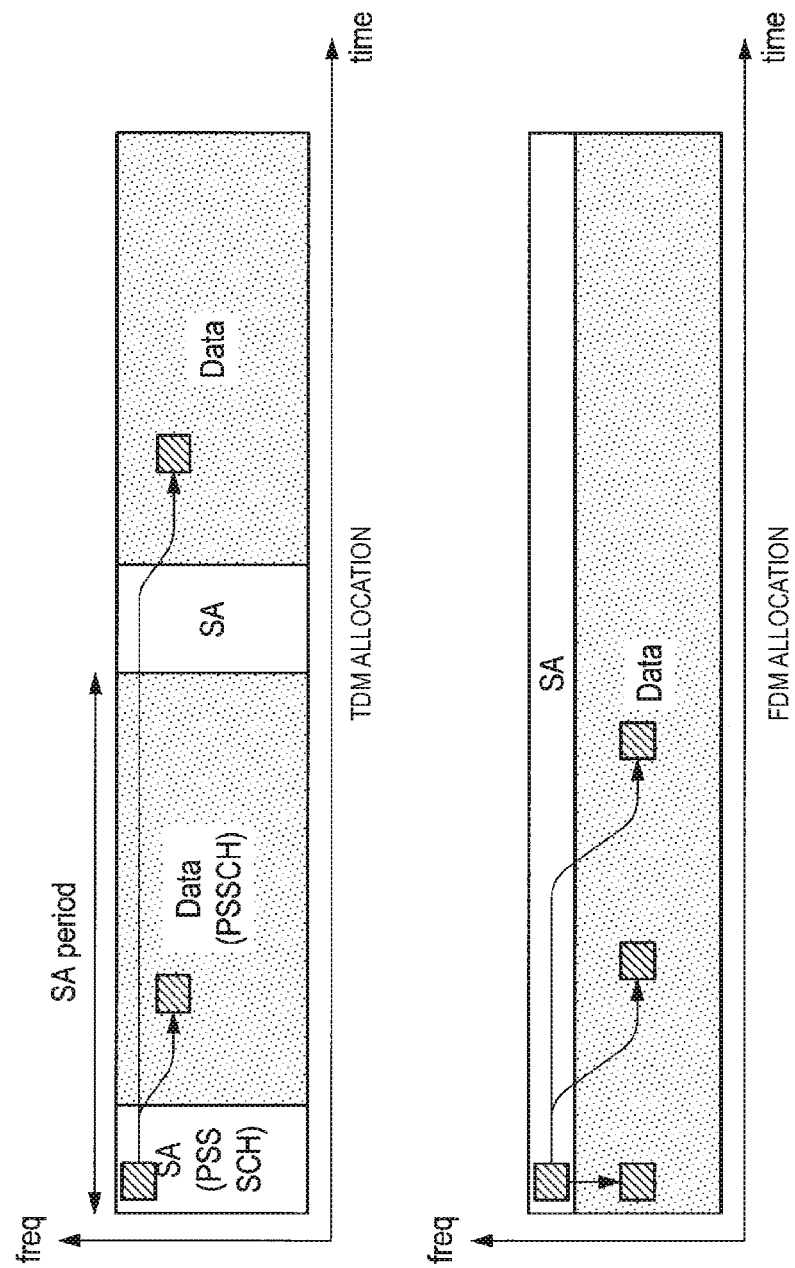
FIG. 8 is an explanatory diagram for describing an overview of an SPS.

In addition to the FDM scheme, addition of further enhancement is under review as well. Introduction of semi-persistent scheduling (SPS) is also under review to solve the problem of the capacity of (6) described above. This makes good use of a characteristic of a traffic type having a feature in V2X communication. An overview of SPS is illustrated in FIG. 8. In SPS, a plurality of pieces of data are scheduled with one SA. Therefore, it is unnecessary to transmit the SA each time data is transmitted, and the overhead can be reduced. Particularly, in the periodic communication such as the periodical traffic of V2X, it is confirmed that such scheduling produces a large effect. Therefore, introduction of SPS is also necessary in V2X communication.

Figure 9:
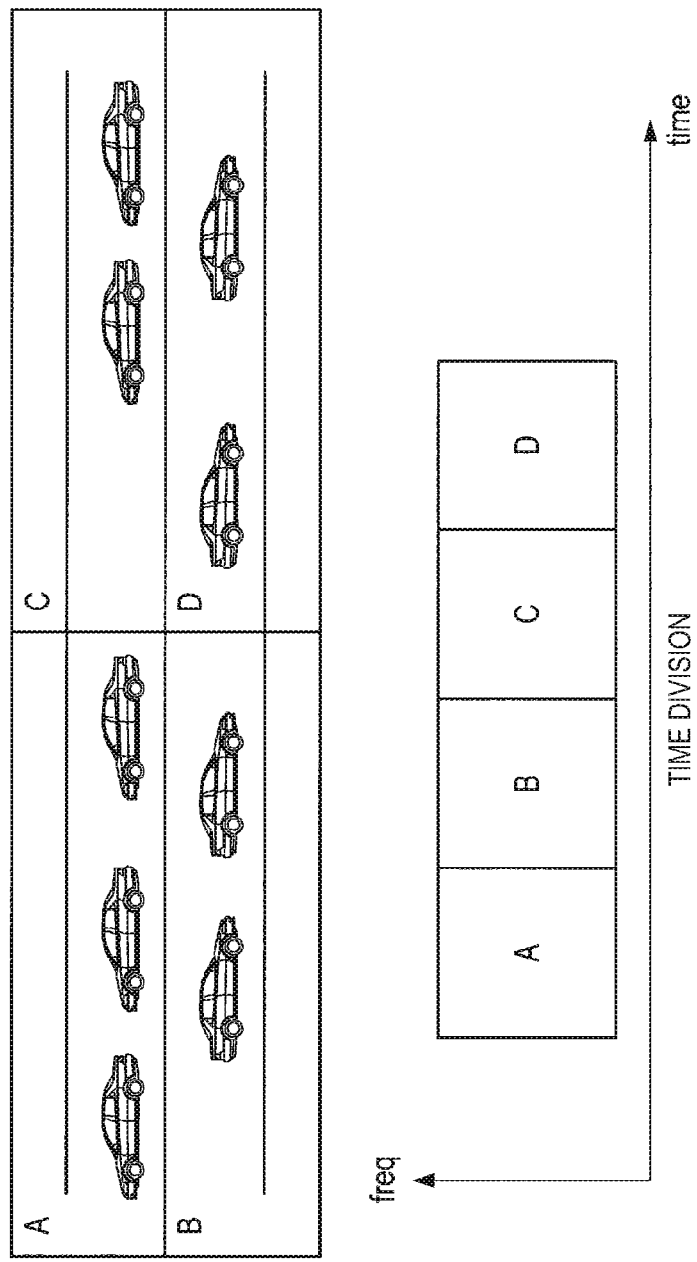
FIG. 9 is an explanatory diagram for describing enhancement using position information.
Figure 10:
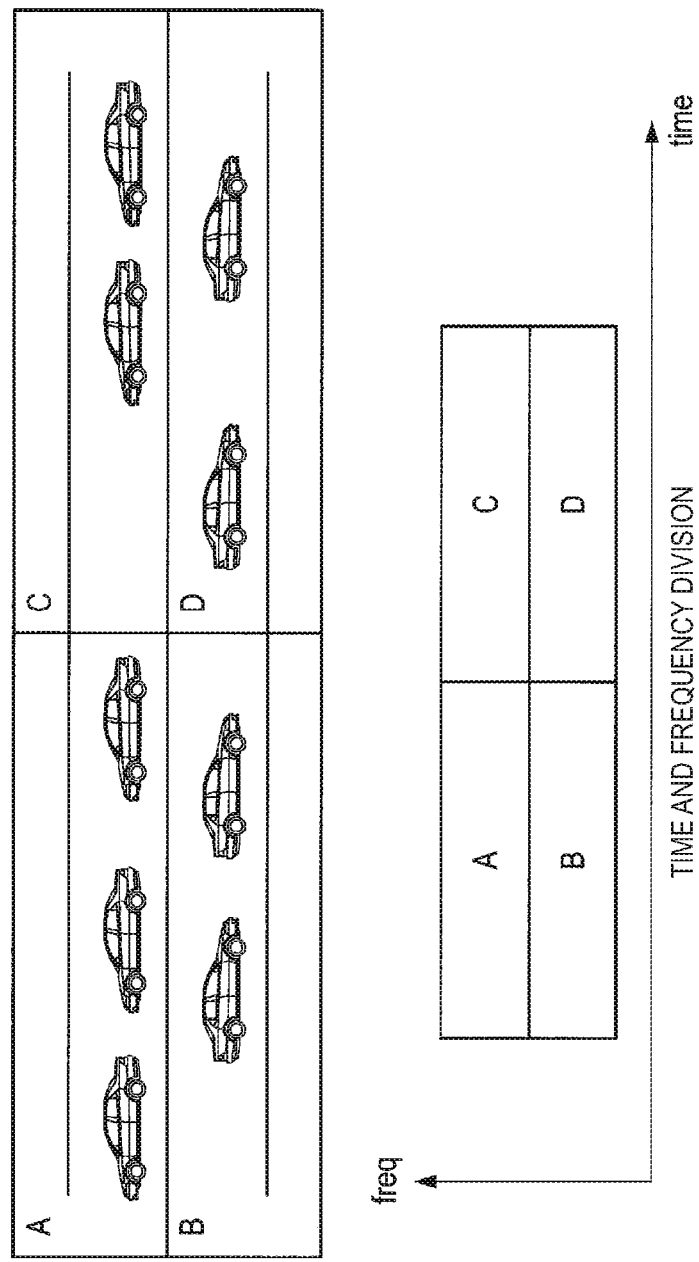
FIG. 10 is an explanatory diagram for describing enhancement using position information.

Next, enhancement using the position information will be described with reference to FIGS. 9 and 10. As described in (6), the capacity is a big problem in V2X. Therefore, space reuse of frequency resources is under review. The position information of an automobile described in (7) is used in performing spatial reuse. Enhancement using the position information is also currently being discussed in 3GPP.

The overview of the enhancement of the PC5 interface has been described above. In V2X communication, there are two types of resource allocation, that is, centralized resource allocation of a mode 1 and autonomous resource selection of a mode 2. In the case of the mode 1, the base station performs all the resource allocation of the PC5 interface. The terminal side performs only transmission with the resources indicated to the base station. There is concern about the overhead between the base station and the terminal, but a communication characteristic is excellent because resources are assigned orthogonally. On the other hand, in the mode 2, the terminal autonomously selects resources to be used for transmission from a resource pool notified of by the base station. There is no concern about overhead in the mode 1, but since there is a possibility of selecting the same resources as other terminals, a collision problem arises. The mode 2 has an advantage in that it can operate not only in-coverage which is within a network of the base station but also out-of-coverage.

Several proposals are currently being presented on this collision problem in the mode 2. The solutions can be roughly divided into two. One is energy sensing. Energy sensing is a method of sensing resources for a certain period of time and selecting communication resources from relatively unused resources on the basis of the sensing result. While it is simple, the accuracy is not that high since it is a power level. Here, it is possible to sense systems other than LTE. Another method is SA decoding. This is a method of decoding the SA (control information) transmitted by another user and recognizing a location of resources being used. The resources being used can be discovered with high accuracy, but there is a disadvantage in that sensing of SA resources is unable to be performed, and the resources being used are unable to be detected in a case in which the SA decoding fails.

Finally, a list describing enhancements performed so far is shown in Table 2. These are only examples of representative enhancements, and various other methods are under review.

TABLE 2

(List describing enhancements)

Enhancement
FDM
SPS
Geo-location
Sensing (Energy sensing, SA decoding)

1.2. Content of Problem to be Solved (1) Sensing Mode Switching

In a case in which there are one or more sensing modes, the UE does not know a sensing mode to be used in a given situation. Further, for the energy sensing, blind sensing is used for an SA pool and a data pool, but it is a sensing mode in which extreme levels of power are used by UEs carried by pedestrians.

Here, in an embodiment of the present disclosure, the UE is caused to set the sensing mode by two methods.

Figure 11:
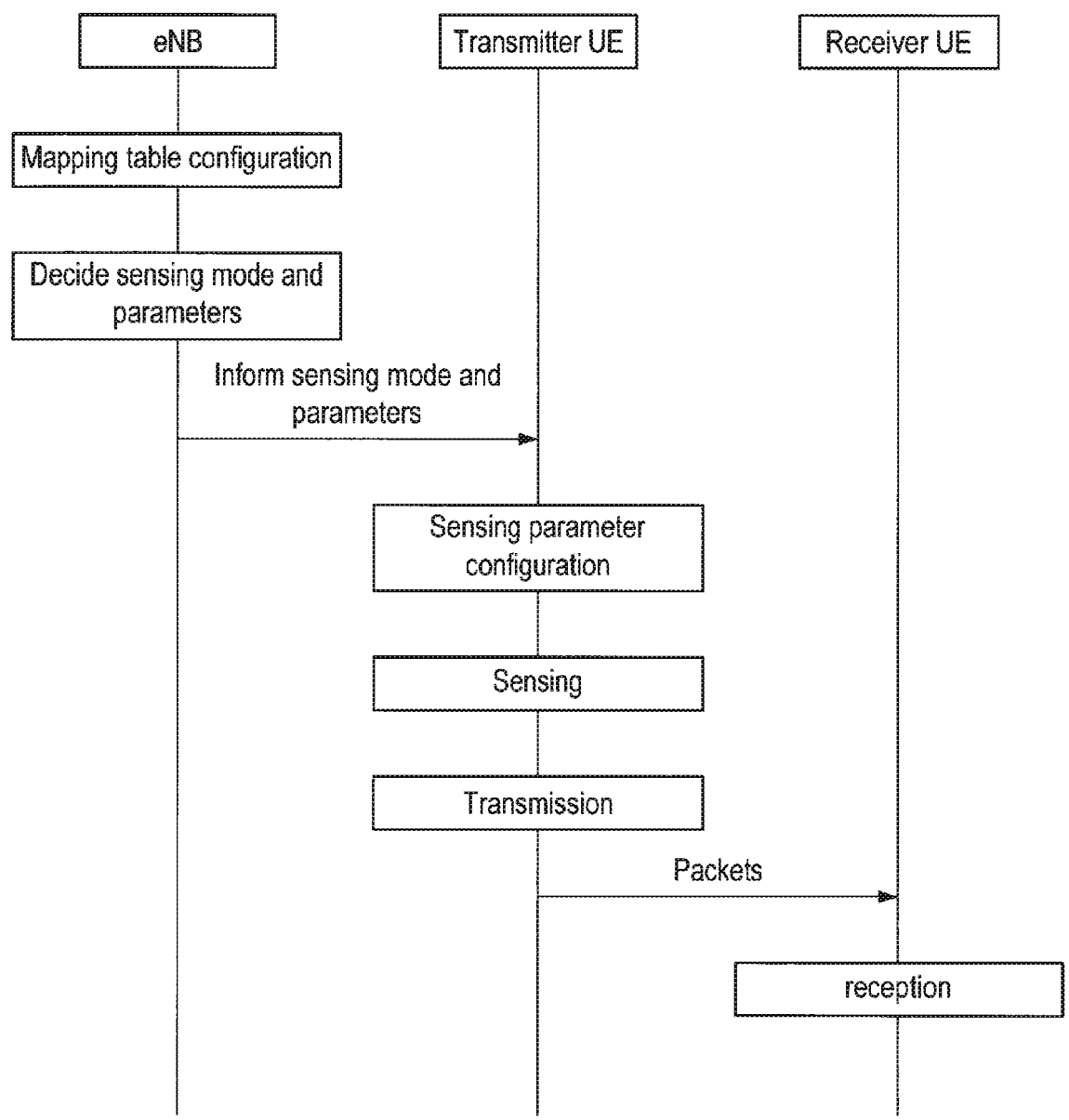
FIG. 11 is a flowchart illustrating a method of deciding a sensing mode.

The first method is a method in which an eNB decides a sensing mode to be used. FIG. 11 is a flowchart illustrating a mode of deciding the sensing mode by an eNB, a transmission side UE, and a reception side UE.

The eNB decides a sensing mode and a sensing parameter. Then, the eNB generates a mapping table in which relations of the sensing mode and the sensing parameter with a state are specified. Then, the eNB decides the sensing mode and the sensing parameter and gives a notification indicating the sensing mode and the sensing parameter to the transmission side UE.

The transmission side UE sets the sensing mode and the sensing parameter notified of by the eNB, performs sensing in accordance with the sensing mode and the sensing parameter, and transmits the packet. The reception side UE receives the packet transmitted from the transmission side UE.

Figure 12:
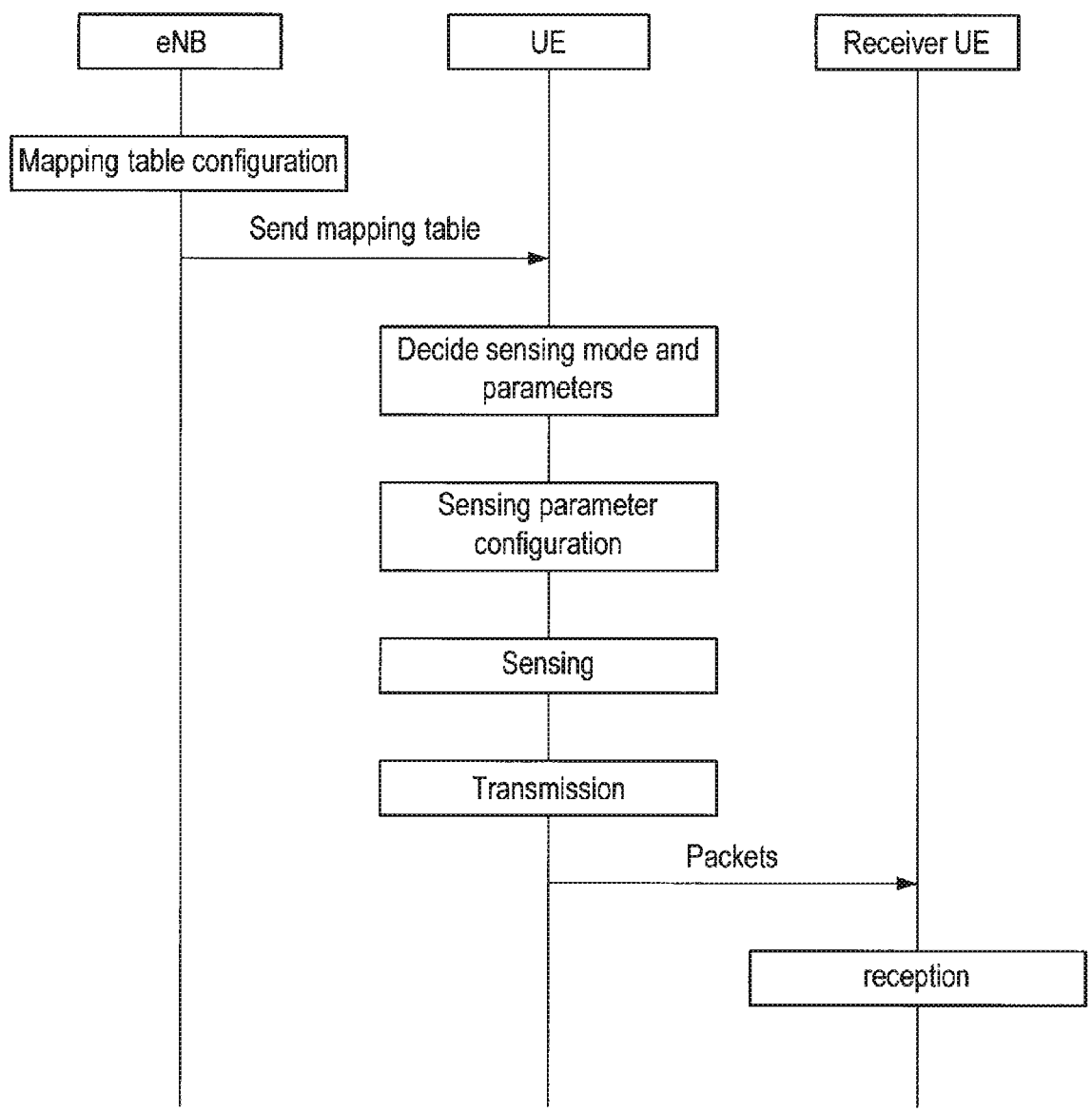
FIG. 12 is a flowchart illustrating a method of deciding a sensing mode.

The second method is a method in which the UE decides a sensing mode to be used. FIG. 12 is a flowchart illustrating a mode of deciding the sensing mode by the eNB, the transmission side UE, and the reception side UE.

The eNB decides the sensing mode and the sensing parameter. Then, the eNB generates a mapping table in which relations of the sensing mode and the sensing parameter with the state are specified. Then, the eNB gives a notification of the mapping table to the reception side UE. The mapping table may be pre-configured on the terminal in advance.

Upon receipt of the notification of the mapping table, the reception side UE decides the sensing mode and the sensing parameter, performs sensing in accordance with the sensing mode and the sensing parameter, and transmits the packet. The reception side UE receives the packet transmitted from the transmission side UE.

The mapping table is a table in which the sensing mode to be used and the sensing parameter to be used are specified depending on a situation. Table 3 shows an example of the mapping table.

TABLE 3

(Example of mapping table)

| | |
|---|---|
| Condition C1 | Sensing mode S1, sensing parameter {P11, P12 . . . } |
| Condition C2 | Sensing mode S2, sensing parameter {P11, P12 . . . } |
| . . . | . . . |

The "sensing mode" is used for the energy sensing, the SA decoding, or a combination thereof. Further, the "sensing mode" may be combined with data decoding, assistant sensing from eNB, or the like. Further, the data decoding is a scheme that decodes data of other terminals and checks a use situation of resources, and the assistant sensing from the eNB is a scheme that receives information of wireless environment information from the eNB and performs sensing.

Examples of "condition" include having a low power requirement, having a security requirement, having a low latency requirement, transmitting a periodic message or an event trigger message, having a high or low priority, a category, a type of sensing channel such as a PSCCH or a PSSCH, a type of the presence of other radio access technologies (RATs), a congestion degree of data traffic, a resource usage rate, and a terminal position.

The "sensing parameter" may include parameters such as a sensing interval, a sensing start time, and weight information, information of a restricted sensing area for saving a battery, and the like. The information of the restricted sensing area may include information of a sensing time interval or a frequency band, for example, information such as a frequency area to be sensed such as a bandwidth, a resource pool, and a subcarrier. The information of the restricted sensing area may also include a definition of a sensing area, for example, information of a block ID. The block ID is an ID attached to each partitioned pool. Further, the information of the restricted sensing area may include information of a location in which sensing is performed. The terminal performs designated sensing at a designated position.

The mapping table can be updated. The sensing mode can be changed depending on a given situation, and the sensing parameter can be changed depending on a given situation. Further, the sensing parameter can be changed depending on a given sensing mode.

The eNB evaluates whether a current mapping is not the best choice. Further, the UE reports to the eNB when the current mapping is not the best choice. Accordingly, the mapping table can be updated.

The eNB gives a notification indicating the mapping table, the sensing mode, and the sensing parameter to the UE, but, for example, the SIB or the DCI can be used for the notification. For example, the eNB broadcasts such information. For example, in a scenario of a coexisting DSRC, the eNB requests all UEs to select the energy sensing. Further, for example, the eNB gives a notification of information to a group of UEs or some UEs in a multicast manner. Further, for example, the eNB gives a notification of information to a unique UE in a unicast manner.

The mapping table can be transmitted, for example, at a timing at which an RRC connection is set up or reestablished. Further, the mapping table can be transmitted, for example, at an initially set timing. Further, the mapping table may be transmitted, for example, at an updated timing. Further, the mapping table may be transmitted, for example, at a timing at which the UE transmits the request for the mapping table. Further, the mapping table may also be periodically transmitted, for example, with a period specified by the UE.

(2) Centralized Sensing

It is inefficient and unnecessary that all the UEs perform sensing. In particular, in a case in which the sensing results are almost the same, it is desirable that the sensing results be shared.

Here, in an embodiment of the present disclosure embodiment, centralized sensing are executed by two methods.

Figure 13:
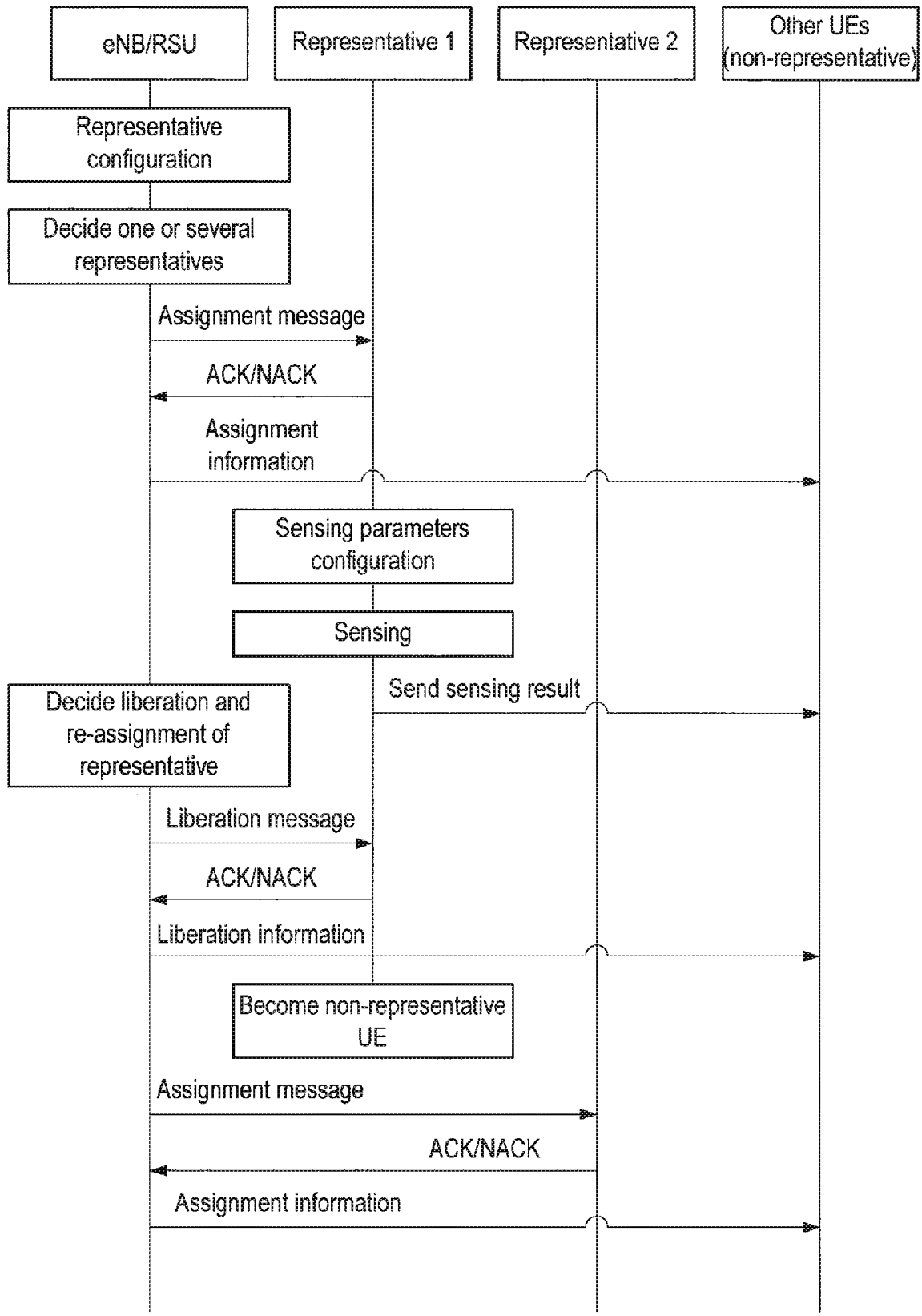
FIG. 13 is a flow diagram illustrating a method of performing centralization of sensing.

A first method is a method in which the eNB or the RSU decides one or more representatives performing sensing. FIG. 13 is a flowchart illustrating an operation example of an eNB or an RSU, a node performing sensing as a representative, and other UEs when centralization of sensing is performed.

The eNB or the RSU specifies a condition for representing sensing, decides a node to be sensed as a representative, and transmits a message indicating that it is assigned as a representative to the decided node. The representative transmits ACK or NACK to the message indicating that it is assigned as a representative to the eNB or the RSU. Further, the eNB or the RSU can become a representative. In this case, the eNB or the RSU may set itself as a representative or may be set as a representative from the core network side. In particular, in the case of a node (a small cell, a UE type RSU, or the like) existing under the eNB, it is possible to performs the settings from the eNB side.

Upon receiving a response from the representative, the eNB or the RSU transmits information indicating that the representative UE is assigned to the other UEs.

The representative performs a setting of sensing and performs sensing. Further, the representative transmits a sensing result to the UE which is not the representative.

The eNB or the RSU determines whether or not liberation of the representative and reassignment of the representative are performed. In a case in which the liberation of the representative UE is performed, the eNB or the RSU transmits a liberation message to the current representative. The representative transmits ACK or NACK to the liberation message to the eNB or the RSU.

Then, the eNB or the RSU transmits information indicating that the representative is liberated to the other UEs, and transmits the message indicating that it is assigned as the representative to another node. The representative transmits ACK or NACK to the message indicating that it is assigned as the representative to the eNB or the RSU. Upon receiving the response from the representative, the eNB or the RSU transmits information indicating that the representative is assigned to other UEs.

Figure 14:
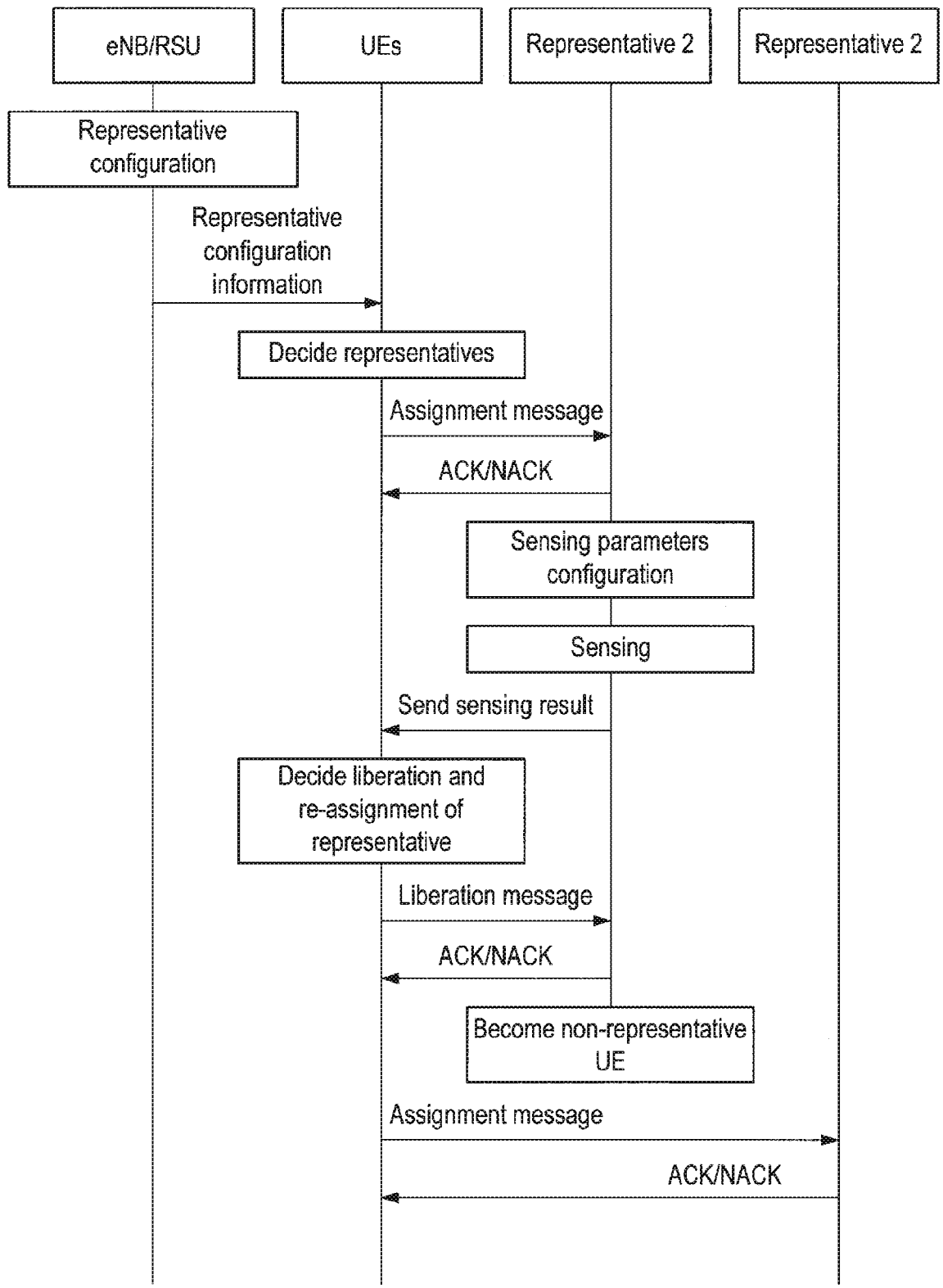
FIG. 14 is a flow diagram illustrating a method of performing centralization of sensing.

A second method is a method in which the UE decides one or more representative UEs performing sensing. FIG. 14 is a flowchart illustrating an operation example of the eNB or the RSU, a node performing sensing as a representative, and other UEs in a case in which centralization of sensing is performed.

The eNB or the RSU specifies a condition for representing the sensing and transmits information of the setting of the representative to the UE.

Upon receiving the information of the setting of the representative from the eNB or the RSU, the UE decides the representative on the basis of the information and transmits the message indicating that it is assigned as the representative to the node decided as the representative. The representative that has received the message indicating that it is assigned as the representative transmits ACK or NACK.

The representative performs a setting of sensing and performs sensing. Further, the representative transmits a sensing result to the UE which is not the representative.

The UE can determine whether or not the liberation of the representative and the reassignment of the representative are performed. In a case in which the liberation of the representative is performed, the UE transmits a liberation message to the current representative. The representative transmits ACK or NACK to the liberation message to the UE.

Then, the UE transmits information indicating that the representative is liberated to the other UEs, and transmits the message indicating that it is assigned as the representative to another node. The representative transmits ACK or NACK to the message indicating that it is assigned as the representative to the UE. Upon receiving the response from the representative, the UE transmits information indicating that the representative UE is assigned to other UEs.

For example, there is candidacy for the representative as a setting of the condition for representing which is executed by eNB or the RSU. The eNB may be a representative for sensing, the RSU may be a representative for sensing, and the UE may be a representative for sensing.

For example, as a method of deciding the representative UE, the eNB, the RSU, or the UE may decide the representative UE randomly from UEs located in a predetermined area for a predetermined period of time or may decide the representative UE on the basis of a predetermined rule. As the predetermined rule, for example, the UE transmitting a synchronization signal may be the representative UE, or the representative UE may be decided on the basis of an ID of the UE, a position of the UE, a category of the UE, a battery state of the UE, a speed of the UE, mobility of the UE, a status of a buffer of the UE, or the like.

As the information of the setting of the representative, for example, in a case in which the UE decides the representative, information such as a method of determining the representative, a start time and a period in which it acts as the representative, and the sensing parameter may be included. The sensing parameter may include, for example, parameters such as the sensing mode, the sensing start time, the sensing period, and the sensing target. The sensing target may be LTE-V2X, DSRC, or the like. In a case in which the target is LTE-V2X and the UE, a list of UEs to be sensed may be provided.

The liberation of the representative may be performed, for example, in a case in which the current representative is unable to perform the sensing. For example, the liberation of the representative may be performed in a case in which the sensing function is stopped in the eNB or the RSU or in a case in which the UE enters the idle state, is requested to reduce power consumption, deviates from the coverage of the current eNB, or does not function as the current RSU.

The reassignment of the representative may be performed promptly after the liberation of the representative or may be performed at a position at which a value of a timer reaches a next assignment timing.

For ACK or NACK, the representative transmits ACK when the assignment or liberation request is transmitted to the representative. If NACK is returned or there is no response until a response deadline, a new representative can be assigned.

If ACK is received after the representative assignment message, other UEs are notified of at least an ID of the representative. If ACK is received after the representative liberation message, other UEs are notified that the current representative is liberated.

Other nodes may assist the sensing instead of the UE. The eNB monitors the resource use situation and the sensing of all the UEs located within the coverage. In this case, the eNB collects measurement reports of a wireless situation from the UEs located within the coverage.

Further, the RSU also monitors the resource use situation and the sensing of neighboring UEs.

One or more representative UEs perform sensing for all other neighboring UEs. The eNB decides a UE performing sensing as the representative randomly or by a predetermined method. The predetermined method may be, for example, a method of selecting a terminal with a high SA reception capability (such as a terminal equipped with an advanced receiver) or a method of selecting a UE that does not care about power consumption even when the energy sensing is used.

Further, the RSU may decide the UE performing the sensing as the representative randomly or in a predetermined method.

Further, the UE also decides the representative either randomly, decides the UE transmitting the synchronization signal or decides the representative on the basis of the ID of the UE.

The representative UE can be liberated in a case in which the current representative UE is unable to perform the sensing. The representative UE is unable to perform the sensing, for example, in a case in which the status of the UE changes from the connected state to the idle state, in a case in which the UE desires to reduce power consumption, in a case in which the UE deviates from the coverage of the current eNB, or in a case in which the UE does not function as the current RSU. Further, in a case in which a timer of the sensing period is set, and the sensing period ends, the representative UE can be liberated. When the sensing period ends, the eNB or the RSU may decide to perform the liberation, or the UE may perform the sensing one after another.

At the time of reassignment, for example, a new UE may be selected randomly or may be selected by a predetermined method. Further, the reassignment may be performed immediately after the liberation or may be performed after a certain period of time.

(3) Sensing+LBT

When sensing+LBT (Listen before Talk) is introduced, it is possible to perform transmission with less collision while maintaining fairness among users. On the other hand, the LBT is a scheme adopted in the WiFi system, but it is difficult to handle unique traffic and it is difficult to apply it without change in V2X communication supported by the base station. Therefore, enhancement of the LBT is necessary for the LTE V2X communication. Further, the sensing scheme here is not limited to the energy sensing, and the SA decoding, the data decoding scheme, or the like may be used.

A selection method of selecting the LBT scheme in accordance with a traffic type will be described. In V2X communication, there are a periodical traffic in which the latency requirements are not strict and an event trigger traffic in which latency requirements are strict.

Particularly in the case of the event trigger traffic with the strict latency requirements, a standby time of a back-off time of the LBT is latency, and communication requirements may be unable to be satisfied.

In this regard, in the present embodiment, two LBT schemes will be described.

(Type 1: LBT with Back-Off Process)

This is an LBT with a back-off timer. Transmission conditions of the transmission terminal are as follows.

After deciding to use sensing plus LBT, a positive counter N=Ninit is generated.
Start sensing, in a case in which the resource of the sensed subframe is not occupied, decrease the value of N; else, N keeps invariant.
In a case in which N become 0, select resources and send packets.

(Type 2: LBT with No Backoff Process)

This is an LBT with no back-off timer. Transmission conditions of the transmission terminal are as follows.

After deciding to use sensing plus LBT, a positive counter N=Ninit is generated.
UEs select resources and send packets in N subframes.

Figure 15:
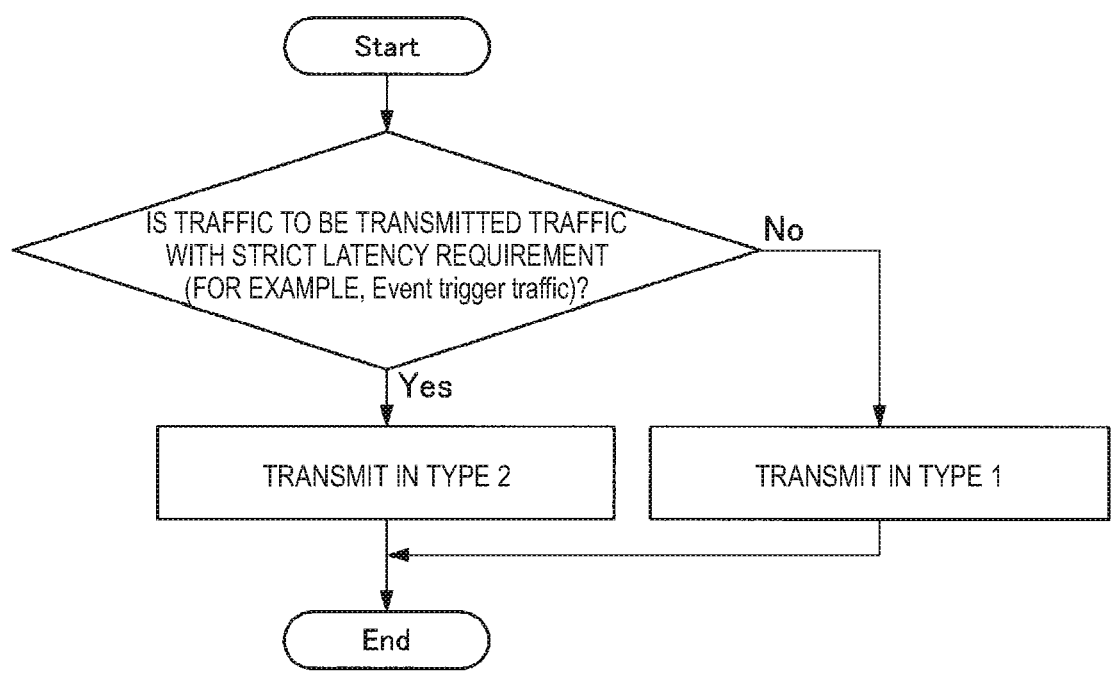
FIG. 15 is a flowchart illustrating a method of switching an LBT scheme.

A threshold value of the sensing may be set separately in Type 1 and Type 2. Further, the threshold value may be set separately for each channel such as the PSCCH or the PSSCH. A method of switching the LBT scheme in accordance with the traffic type to be transmitted is proposed. FIG. 15 is a flowchart illustrating a method of switching the LBT scheme. If the traffic to be transmitted is traffic with the strict latency requirements, for example, the event trigger traffic, it is transmitted in Type 2, and otherwise it is transmitted in Type 1. Further, the LBT scheme may be switched in accordance with a resource use situation (a traffic congestion situation). After the sensing, in a case in which available resources are tight, the probability of selecting the same resource as the neighboring terminal is high. To avoid this, the terminal switches the LBT scheme in accordance with the resource congestion degree. For example, in a case in which the sensing is performed, and a selectable resource amount is equal to or less than a certain threshold value, the terminal determines that incompatibility of resource selection with other terminals occurs and can operate to avoid the incompatibility by selecting the LBT scheme.

In addition to the traffic type and the resource use situation, a terminal category, a terminal ID, priority information of traffic, a speed of the terminal, or the like may be used as the information used to switch the LBT, and the LBT scheme may be switched in accordance with such information.

For a method of switching the LBT type, an arbitrary LBT scheme is notified from the base station. The notification may be given for each UE or for each cell. A mapping table of the LBT scheme and information used for switching may be provided from the base station to the terminal, or the terminal side may select the LBT type in accordance with the information used for switching. The method of switching the LBT type may be set in the terminal in advance.

(Introduction of 2-Step Sensing)

In V2X communication, a case in which the operation is carried out while performing co-existence with the DSRC system (802.11p communication) is assumed. In this case, in the LTE V2X communication, it is necessary to detect the DSRC system and perform the operation not to give interference. At the same time, it is necessary to avoid packet collision with other users even within the LTE V2X communication.

Therefore, in the present embodiment, DSRC_LBT for DSRC system detection is introduced. DSRC_LBT may be Type 1 or Type 2, but Type 1 is preferable.

Further, in the present embodiment, LTE_V2X_LBT for mode 2 communication packet collision avoidance in the LTE V2X system is introduced. LTE_V2X_LBT may be Type 1 or Type 2, but Type 2 is preferable.

Further, in addition to LTE_V2X_LBT, other sensing methods such as the SA decoding may be used.

Figure 16:
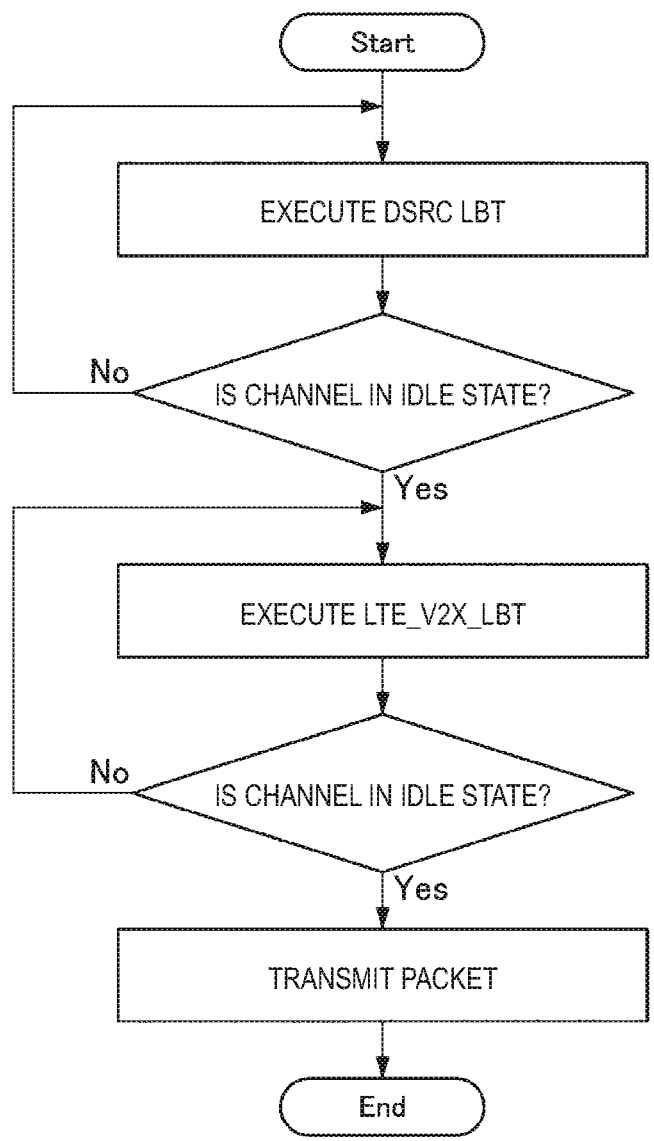
FIG. 16 is a flowchart illustrating a flow of 2-step sensing at a terminal.

FIG. 16 is a flowchart illustrating the flow of 2-step sensing at the terminal. The terminal executes DSRC_LBT, executes LTE_V2X_LBT after the channel state is determined as IDLE. Then, in a case in which the channel state is determined to be IDLE by LTE_V2X_LBT, a signal is transmitted.

The terminal may change an area in which the sensing is performed through DSRC_LBT and LTE_V2X_LBT. Further, the terminal may change the area in the frequency direction, change the area in the time direction, or change the area in both the frequency direction and the time direction. The sensing area may be notified from the base station in advance or may be preset at the terminal.

(LBT Back-Off Setting Method)

In V2X communication, unlike the WiFi system, there is a central control station such as the base station. In this regard, a method of setting the back-off timer of the LBT is necessary.

In the present embodiment, the back-off timer is set from the base station to the terminal. As the notification method from the base station to the terminal, the notification may be given through an RRC, a DCI, an SIB, signaling, or other methods.

A value of the back-off timer may be a back-off timer in the time direction, a back-off timer in the frequency direction, or back-off timers in both the time direction and the frequency direction. In the case of the back-off timer in the frequency direction, a band may be divided into a plurality of subcarriers, divided by the number of subcarriers used for its own transmission, or uniquely divided by a system. Further, the value of the back-off timer may be a sum of the back-off timers in both the time direction and the frequency direction. Further, an effective period of the back-off timer may be set from the base station to the terminal. Further, the back-off timer may be set over a plurality of scheduling periods.

In a case in which a back-off timer table is provided from base station to the terminal, information in which the value of the back-off timer, the back-off timer in the time direction, the back-off timer in the frequency direction, and the back-off timers in both the time direction and the frequency direction are added may be provided.

Figure 17:
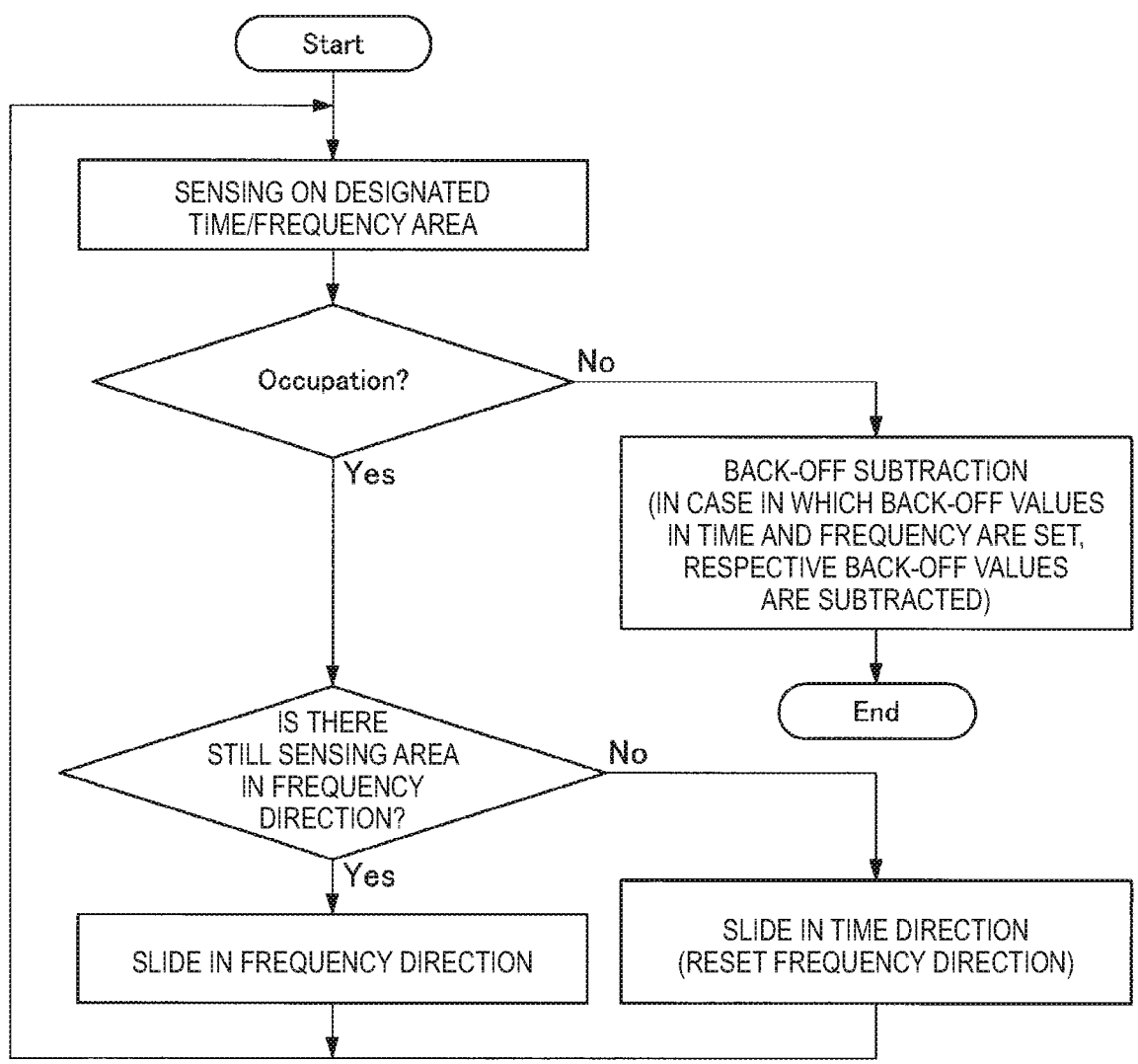
FIG. 17 is a flowchart illustrating an operation example of back-off.

FIG. 17 is a flowchart illustrating an example of the back-off operation. The back-off may be set in the time direction or in the frequency direction. Further, the back-off may be set in both the time direction and in the frequency direction.

The terminal performs sensing at a designated time or in a frequency area, determines whether or not there is still a sensing area in the frequency direction if occupation is detected, slides in the frequency direction if there is still a sensing area in the frequency direction, and resets the frequency direction by sliding in the time direction if there is no sensing area in the frequency direction. In a case in which no occupation is detected, the terminal performs back-off subtraction to be described later. The back-off may be configured with any one of a subframe unit, a subcarrier unit, and an SA period unit or may be configured with a combination thereof.

The terminal sets the back-off timer in a case in which a specific back-off timer is notified of. In a case in which the back-off timer is set with a width, the terminal randomly selects from the width.

Further, in a case in which a table is provided, the terminal selects the back-off timer depending on an associated parameter. In a case in which the back-off timer is set with a width, it is randomly selected from the width.

The terminal subtracts the back-off value in accordance with a sensing result. The terminals can perform subtraction in each of the time direction and the frequency direction. In a case in which the back-off is set in each of a time and frequency, the terminal performs subtraction in each of a time and frequency. In a case in which it is a common back-off, the terminal subtracts one if a non-occupation is detected regardless of a time and a frequency.

Figure 18:
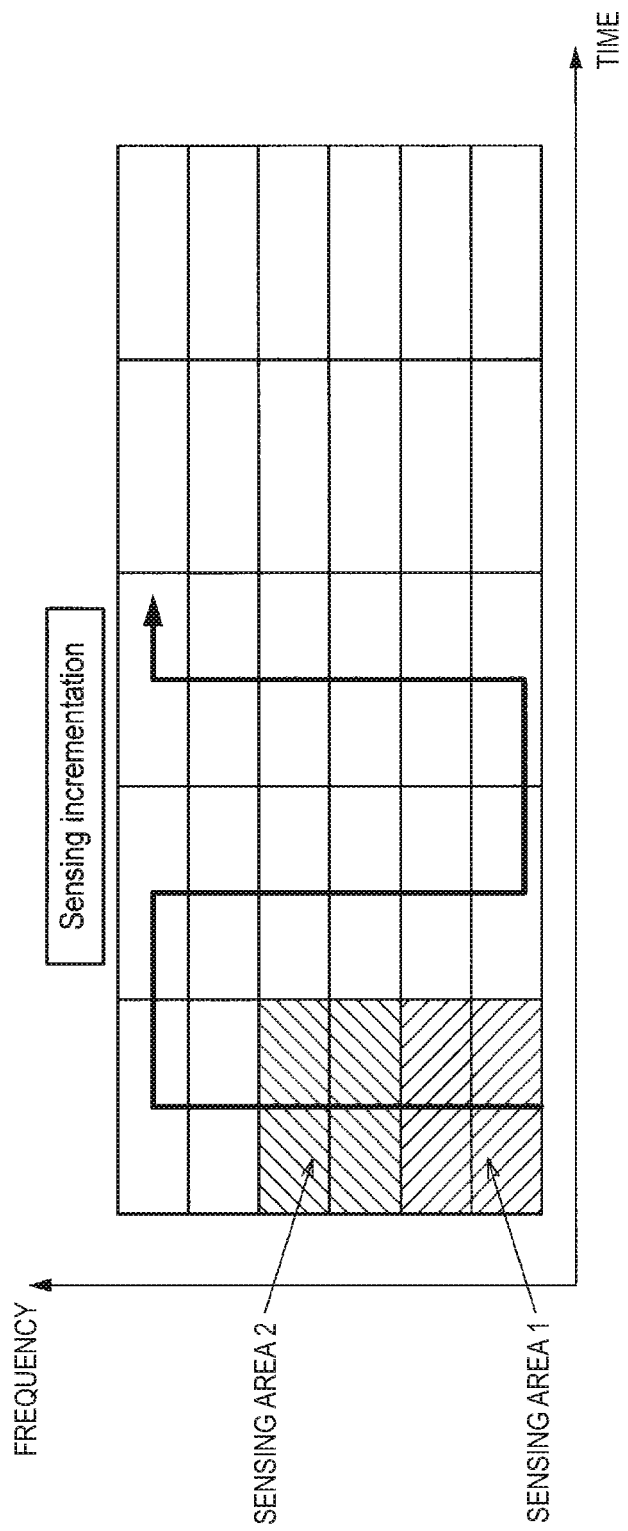
FIG. 18 is a flowchart illustrating a method of setting a sensing area.

FIG. 18 is a flowchart illustrating a method of setting the sensing area. For example, as a method of sliding a time and a frequency, there is a method such as a method of first sliding in the time direction and then sliding in the frequency direction.

In sensing+LBT, transmission is performed after transmission authority is acquired. In the case of TDM, since the SA pool and the data pool are divided in the time axis, it is necessary to newly set the conditions for transmission authority acquisition. For example, even when the transmission authority for the SA resources is acquired, transmission is unable to be performed unless the data area resources can be secured. The reverse is also true. As described above, it is necessary to newly specify the conditions for transmission authority acquisition. Here, three methods are described below.

(1) Method of Acquiring Transmission Authority for SA and Data in a Case in which Transmission Resources of SA can be Secured It is a method in which the transmission terminal acquires the transmission authority for SA and data at a stage at which the sensing is performed on only the SA area, and the transmission authority for the SA is acquired. Since sensing of the data part is not performed, collision of the data part may occur. Since sensing of at least the SA is performed, it is better than not doing anything.

The transmission authority acquisition condition is assumed to be when SA_LBT is OK. If the rest of the SA resources is equal to or more than a certain value, the SA resources are randomly selected from the remaining SA pool, the data resources randomly selected from the data pool, and transmission is performed.

Figure 19:
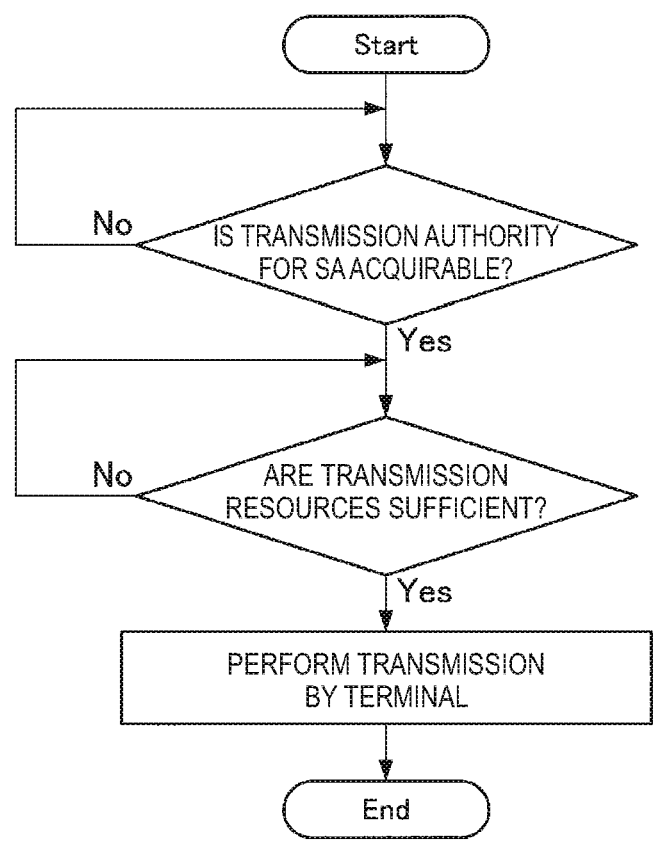
FIG. 19 is a flowchart illustrating a method of determining whether or not transmission authority is acquired with only an SA.

If the rest of the SA resources is equal to or less than a certain value, the transmission is postponed up to the next SA period. The SA resources are selected from the SA resource pool in the next SA period randomly or on the basis of the result of SA_LBT, the data resources are randomly selected from the data pool, and transmission is performed FIG. 19 is a flowchart illustrating a method of determining whether or not it is possible to acquire the transmission authority with only the SA.

If the transmission side terminal desires to transmit a packet, the transmission side terminal sets SA_LBT=N and starts the sensing. N is a counter, and N is decremented by 1 if an SA channel is idle.

If N becomes 0 in subframe $SF_{SA\_LBTend}$, SA_LBT=0. The terminal determines whether or not there are sufficient SA resources in the corresponding SA period by comparing it with the available subframe $SF_{available}$ which is a parameter preset by the base station.

If the SA resources are sufficient, the terminal randomly selects the SA resources from the SA resource pool. If there are no SA resources, the terminal postpones transmission up to the next SA period. The SA resources are selected from the SA resource pool randomly in the next SA period or on the basis of the result of SA_LBT, the data resources are randomly selected from the data pool, and transmission is performed. Here, in a case in which transmission is performed in a next or later SA period, the terminal may subtract the back-off value by a certain amount in order to increase the priority of the transmission opportunity acquisition.

(2) Method of Acquiring Transmission Authority for SA and Data in a Case in which Transmission Resource of Data can be Secured It is a method in which the transmission terminal acquires the transmission authority for SA and data at a stage at which the sensing is performed on only the data area, and the transmission authority for the data is acquired. Since the sensing of the SA part is not performed, the collision of the SA part may occur. Since sensing of at least the data part is performed, it is better than not doing anything.

The transmission authority acquisition condition is assumed to be when Data_LBT is OK. If the rest of the data resources in the corresponding SA period is equal to or more than a certain value, the data resources are reserved from the rest. The terminal randomly selects the SA resources from the SA resource pool in the next SA period, selects the reserved data resources from the data pool, and performs transmission.

If the rest of the data resources is equal to or less than a certain value, transmission is postponed up to the next SA period. The SA resources are randomly selected from the SA resource pool in the next SA period, the data resources are selected from the data pool randomly or on the basis of the result of DATA_LBT, and transmission is performed.

Figure 20:
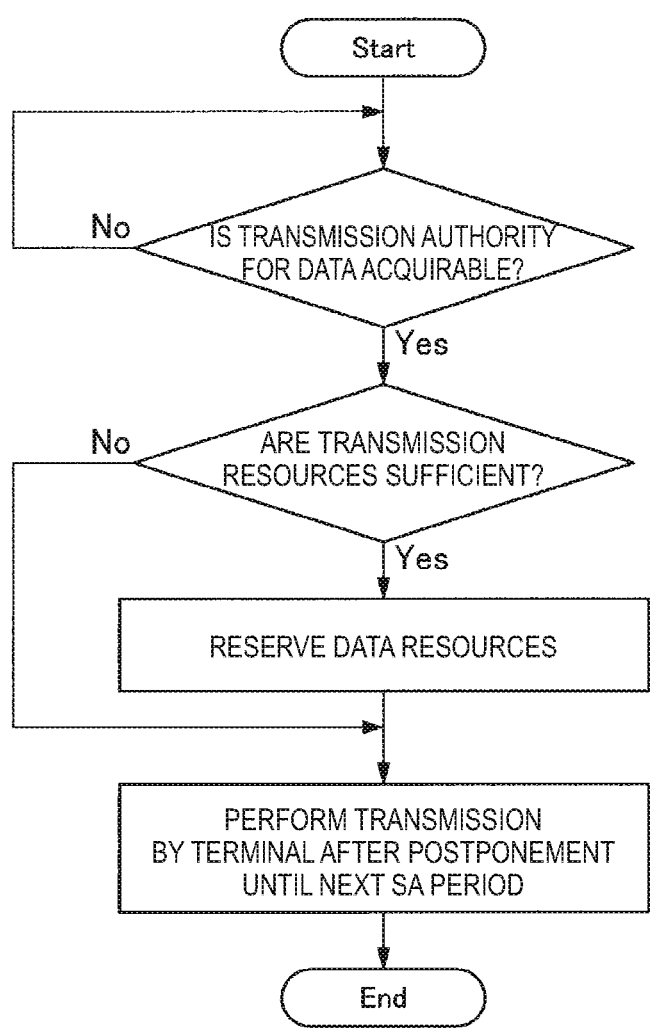
FIG. 20 is a flowchart illustrating an operation example of acquiring transmission authority for an SA and data.

FIG. 20 is a flowchart illustrating an operation example of acquiring transmission authority for the SA and the data in a case in which the transmission resource of the data can be secured. If the transmission side terminal desires to transmit a packet, the transmission side terminal sets DATA_LBT=N and start the sensing. N is a counter, and N is decremented by 1 if an SA channel is idle.

If N becomes 0, the terminal determines whether or not there are sufficient data resources in the corresponding SA period by comparing it with the available subframe $SF_{available}$ which is a parameter preset by the base station.

If there are data resources, the data resources are reserved from the rest. The terminal randomly selects the SA resources from the SA resource pool in the next SA period, selects the reserved data resources from the data pool, and performs transmission.

If there are no data resources, transmission is postponed up to the next SA period. The SA resources are randomly selected from the SA resource pool in the next SA period, the data resources are selected randomly or on the basis of the result of DATA_LBT from the data pool, and transmission is performed.

(3) Method of Acquiring the Transmission Authority for SA and Data in a Case in which Transmission Resources of Both SA and Data can be Secured The transmission terminal performs sensing of both the SA area and the data area. The LBT is applied only to the SA, and reservation is newly introduced for the data. Because sensing of both the SA and the data is performed, the probability of collision is lower than the above two methods.

The transmission authority acquisition condition is assumed to be when SA_LBT is OK, and the resources of the data area are "Reserved." If the rest of the SA resources is equal to or less than a certain value, the transmission is postponed up to the next SA period.

Figure 21:
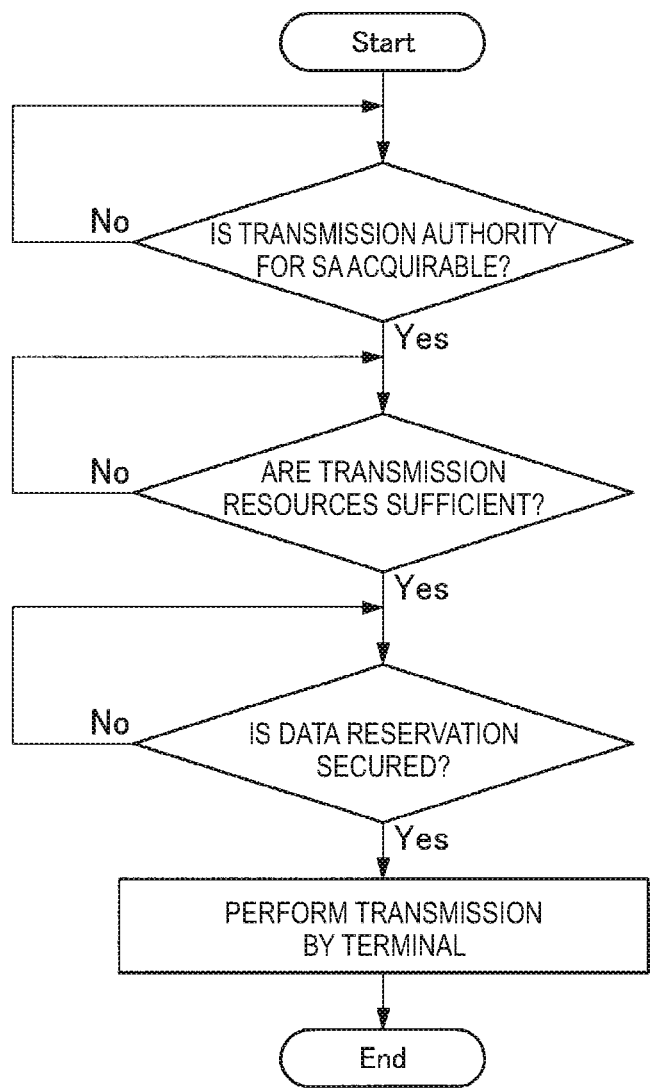
FIG. 21 is a flowchart illustrating an operation example of acquiring transmission authority for an SA and data.

FIG. 21 is a flowchart illustrating an operation example of acquiring the transmission authority for the SA and the data are acquired in a case in which transmission resources of both the SA and the data can be secured.

Figure 22:
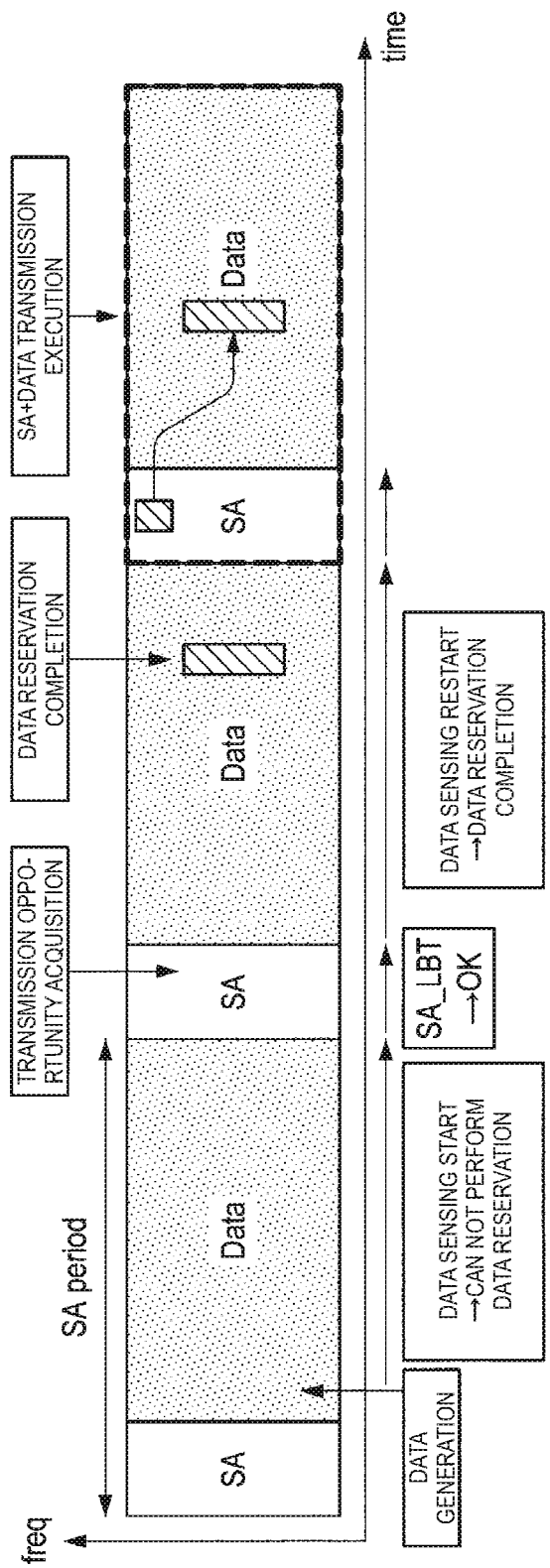
FIG. 22 is an explanatory diagram illustrating an example in which transmission authority for an SA is acquired, but data resources are not reserved.

In a case in which the transmission authority for the SA is acquired, but the data resources are not secured (FIG. 22), whether or not the transmission authority for the SA is acquired, a method of acquiring transmission authority for the SA and the data in a case in which the transmission resources of the SA can be secured is executed.

The data pool performs sensing with no LBT, and resources to be used are reserved. It is determined whether or not the reserved data resources are used in accordance with the result of SA_LBT.

Figure 23:
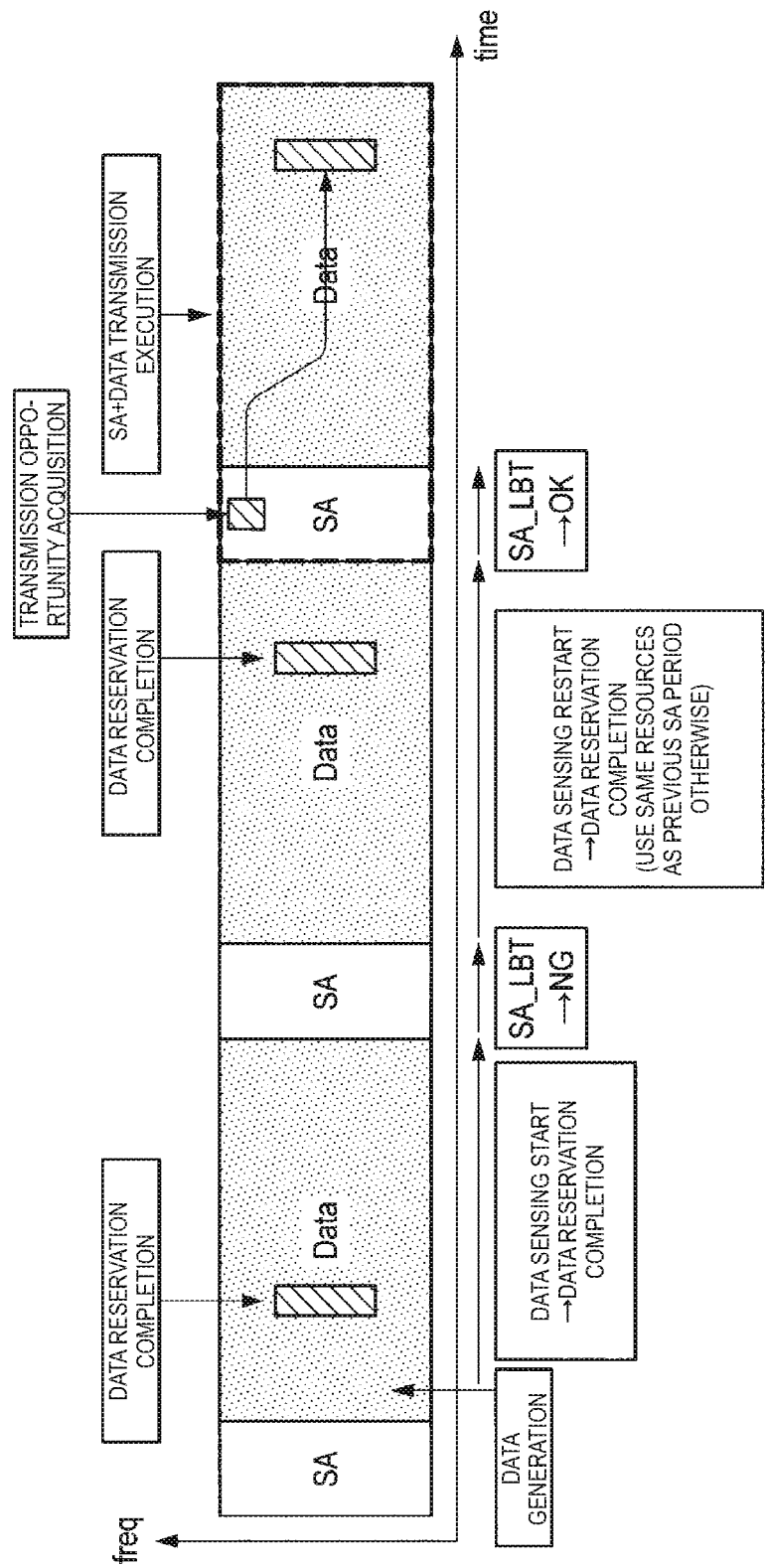
FIG. 23 is an explanatory diagram illustrating an example in which data resources are secured, but transmission authority for an SA is not acquired.

In a case in which the data resources are reserved, but the transmission authority for the SA is not acquired (FIG. 23), the data resources are secured by reserving resources to be used using sensing with no LBT.

If the terminal performs SA_LBT and acquires the transmission authority, the resources of the current SA period are selected with reference to the reserved data resources of the previous SA period. If the rest of SA resources is equal to or less than a certain value, the terminal postpones transmission up to the next SA period.

Next, an example will be described in detail.

1. Sensing of Mode 1 and Mode 2

(Mode 1)

Figure 24:
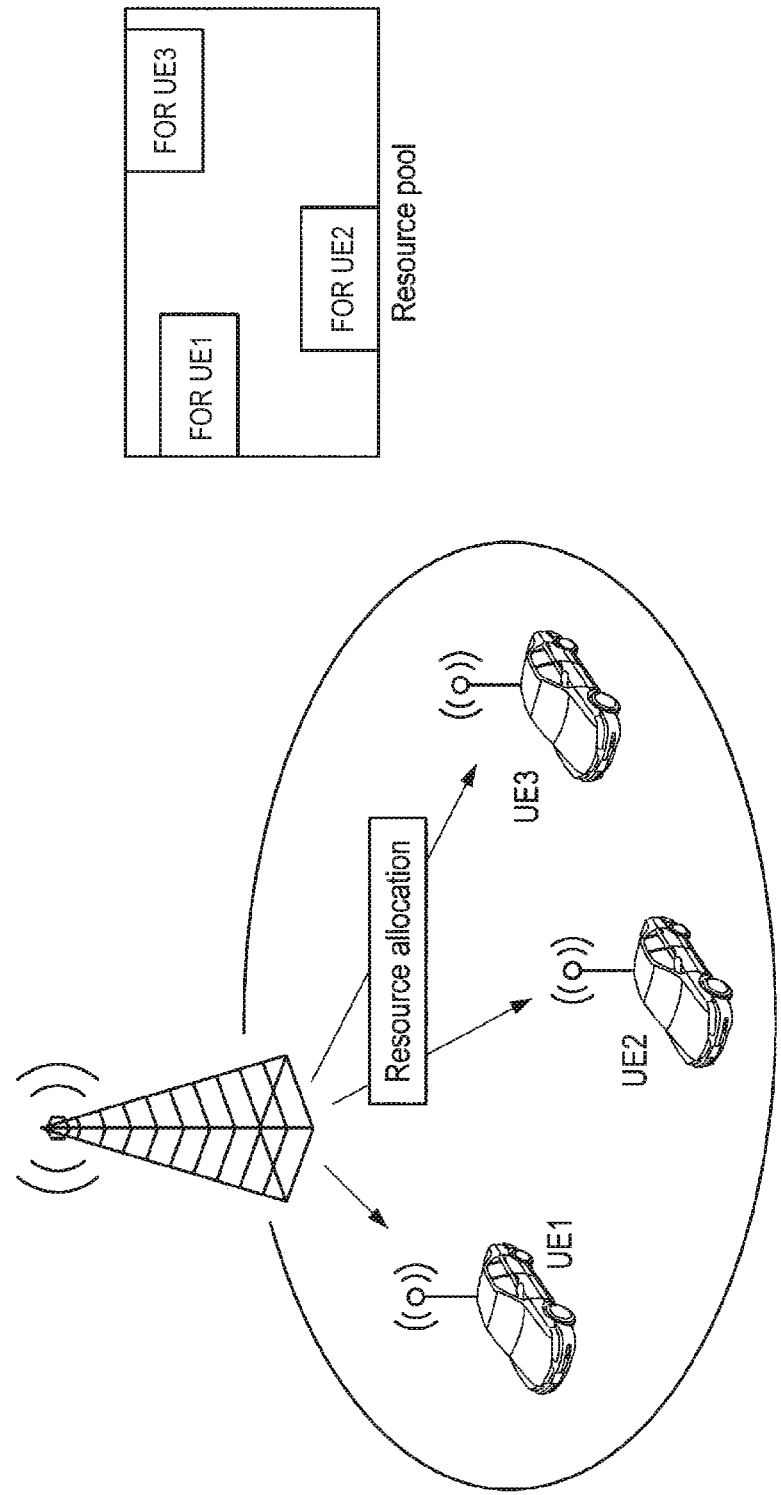
FIG. 24 is an explanatory diagram illustrating a resource allocation example in a mode 1.

The UE should be present within the coverage of the eNB. The eNB sets up the resource pool and indicates resource allocation for all UEs. FIG. 24 is an explanatory diagram illustrating a resource allocation example in the mode 1.

(Mode 2)

Figure 25:
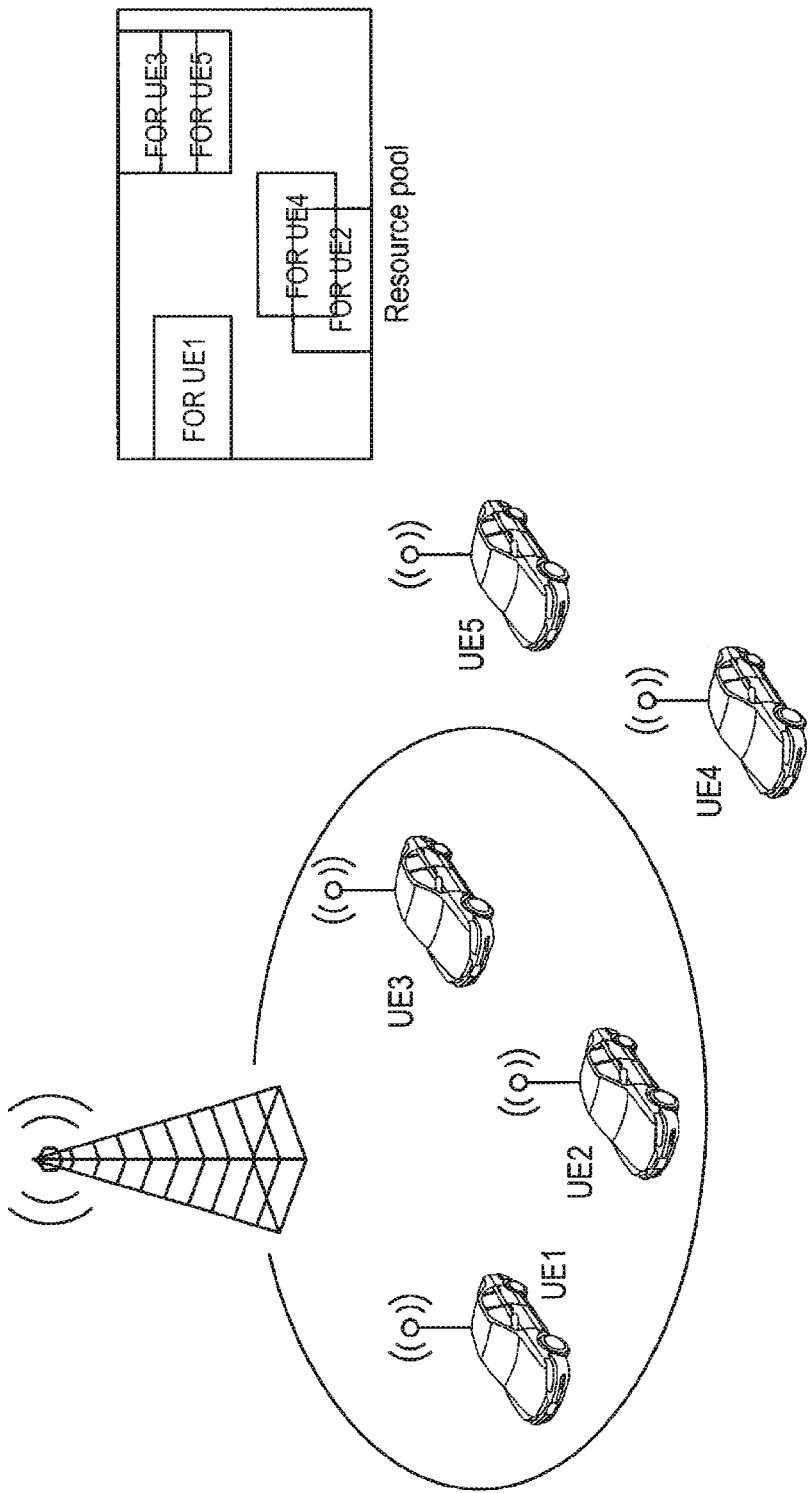
FIG. 25 is an explanatory diagram illustrating a resource allocation example in a mode 2.

The UE may be within or outside the coverage of the eNB. In a case in which the UE is outside the coverage, the resource pool should be preset. The UE randomly selects resources from the resource pool. FIG. 25 is an explanatory diagram illustrating a resource allocation example in the mode 2.

2. Restriction of Sensing Area (In Case of TDM)

Figure 26:
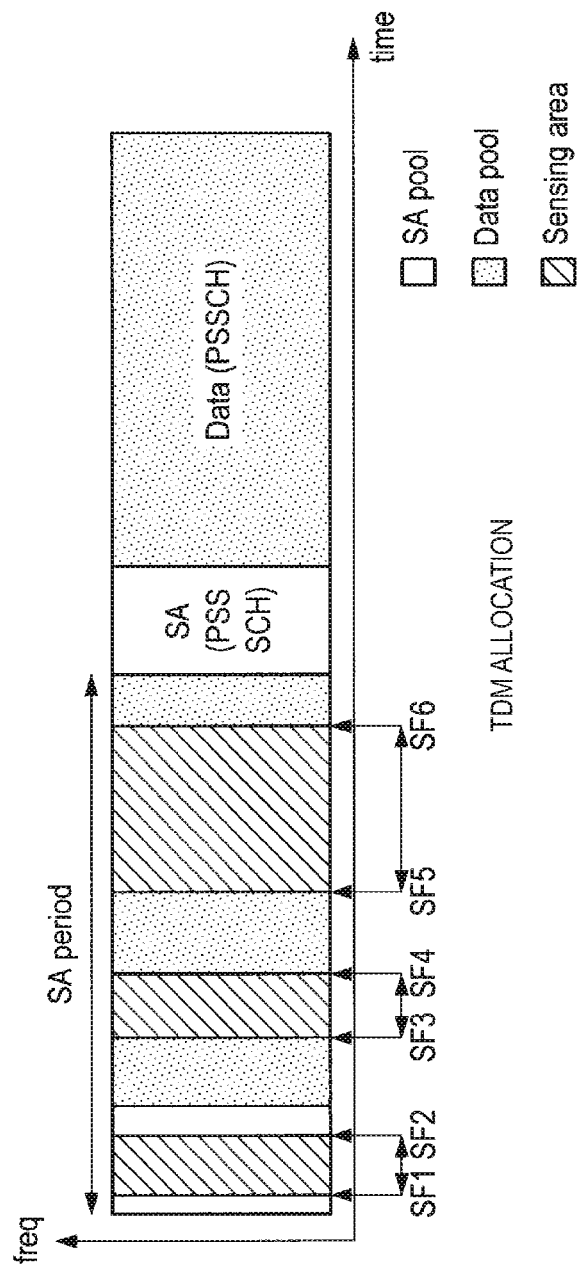
FIG. 26 is an explanatory diagram illustrating an example in which a time interval of sensing in TDM is restricted.

In the UE, the time interval of sensing may be restricted. FIG. 26 is an explanatory diagram illustrating an example in which the time interval of sensing in TDM is restricted. The UE is informed of the time interval for sensing by way of, for example, {(SF1, SF2), (SF3, SF4), and (SF4, SF5)} in FIG. 26.

Figure 27:
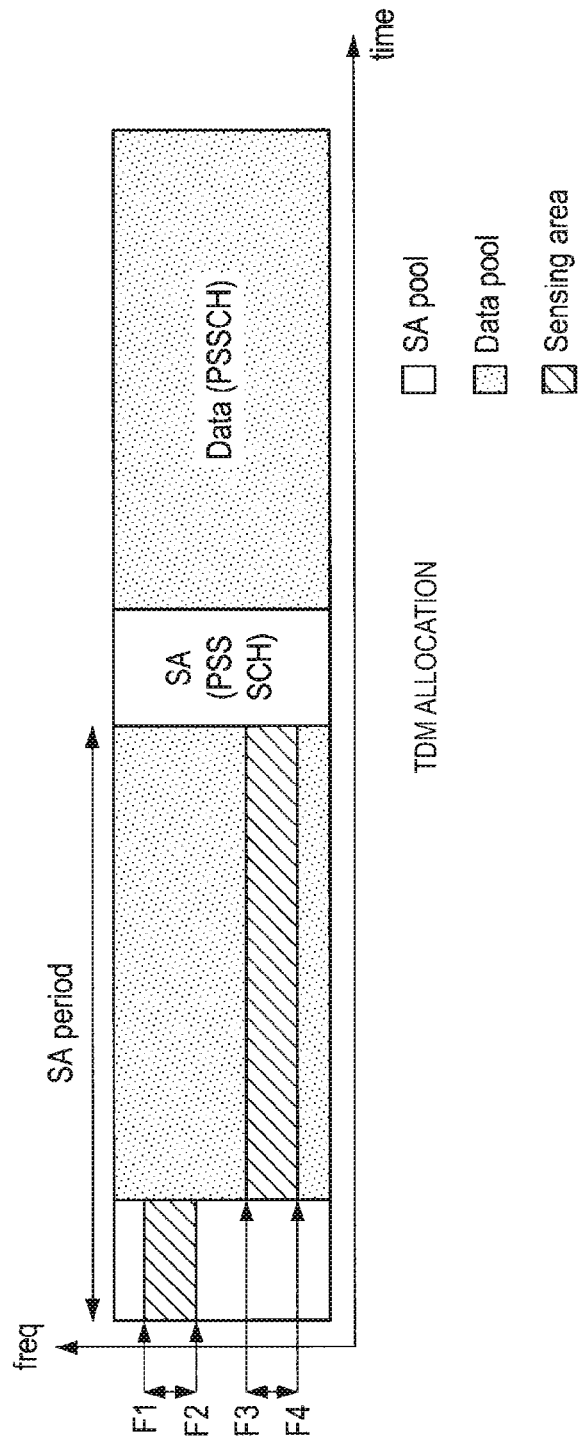
FIG. 27 is an explanatory diagram illustrating an example in which a frequency band of sensing in TDM is restricted.

Further, in the UE, the frequency band of sensing may be restricted. FIG. 27 is an explanatory diagram illustrating an example in which the frequency band of sensing in TDM is restricted. The UE is informed of the frequency band for sensing by way of, for example, SA{(F1, F2)} and data{(F3, F4)} in FIG. 27.

Figure 28:
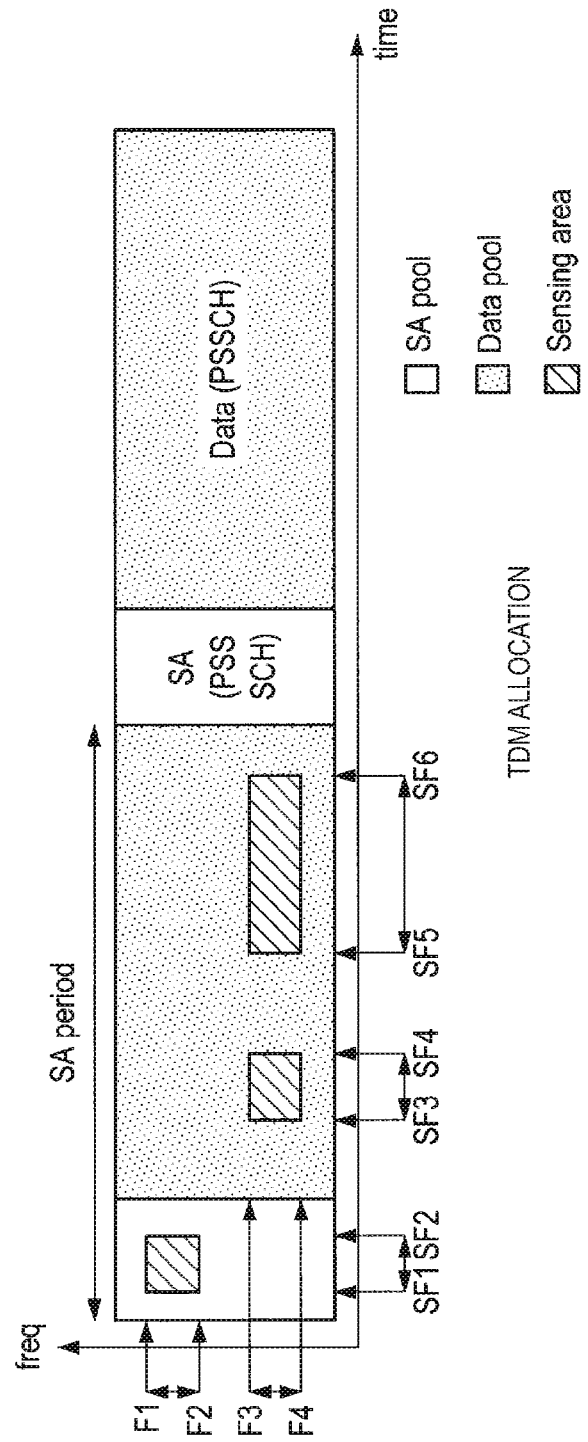
FIG. 28 is an explanatory diagram illustrating an example in which both a time interval and a frequency band of sensing in TDM are restricted.

In the UE, both the time interval and the frequency band of sensing may be restricted. FIG. 28 is an explanatory diagram illustrating an example in which both the time interval and the frequency band of sensing in TDM are restricted. The UE is informed of the time interval and the frequency band for sensing by way of, for example, {(SF1, SF2), (SF3, SF4), (SF4, SF5)}, SA{(F1, F2)}, and data{(F3, F4)} in FIG. 28.

Figure 29:
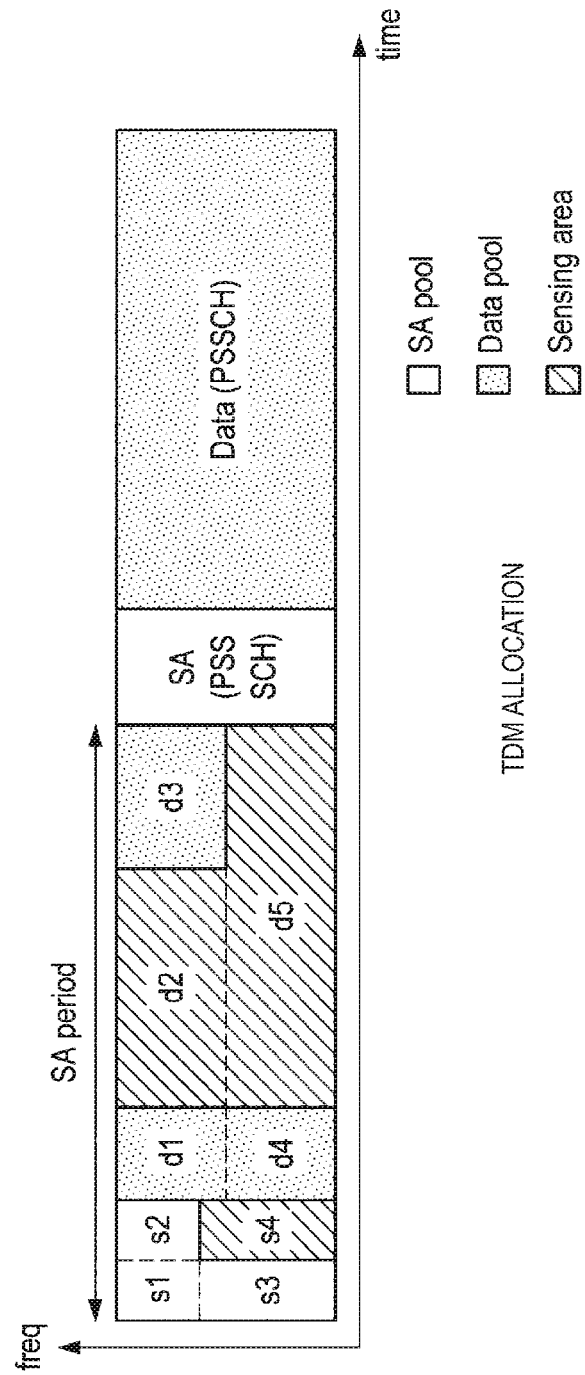
FIG. 29 is an explanatory diagram illustrating an example in which a block of sensing in TDM is restricted.

In the UE, a block of sensing may be restricted. The pool is partitioned, and each pool is given a block ID. FIG. 29 is an explanatory diagram illustrating an example in which the block of sensing in TDM is restricted. The UE is informed of the block ID for sensing in units of block by way of, for example {s4, d2, d5} in FIG. 29.

(In Case of FDM)

Figure 30:
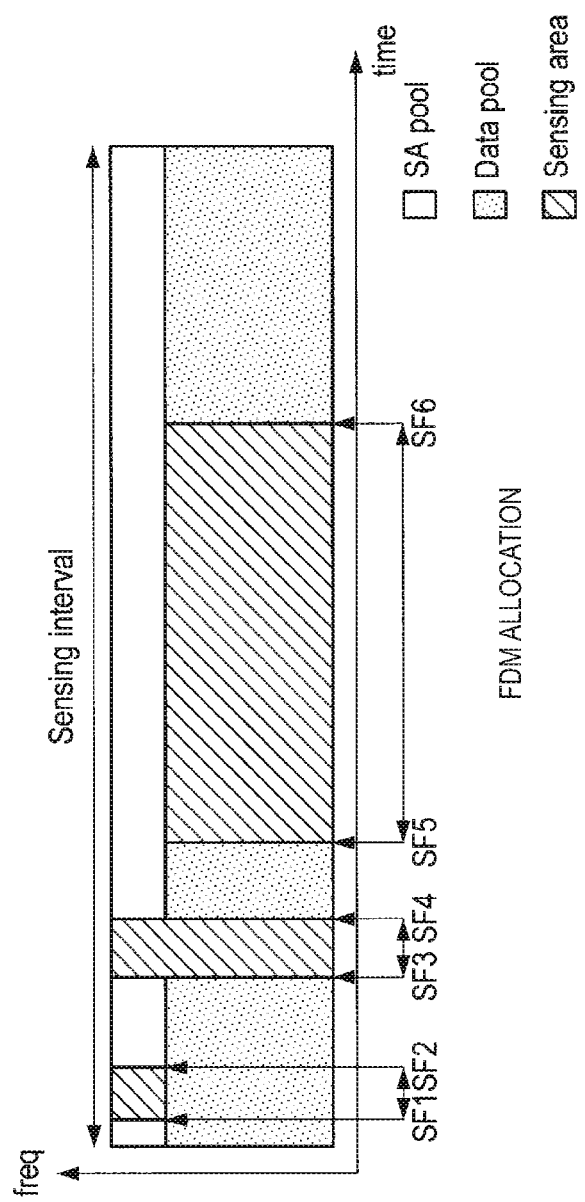
FIG. 30 is an explanatory diagram illustrating an example in which a time interval of sensing in FDM is restricted.

In the UE, the time interval of sensing may be restricted. FIG. 30 is an explanatory diagram illustrating an example in which the time interval of sensing in FDM is restricted. The UE is informed of the time interval for sensing by way of, for example, {(SF1, SF2), (SF3, SF4), and (SF4, SF5)} in FIG. 30.

Figure 31:
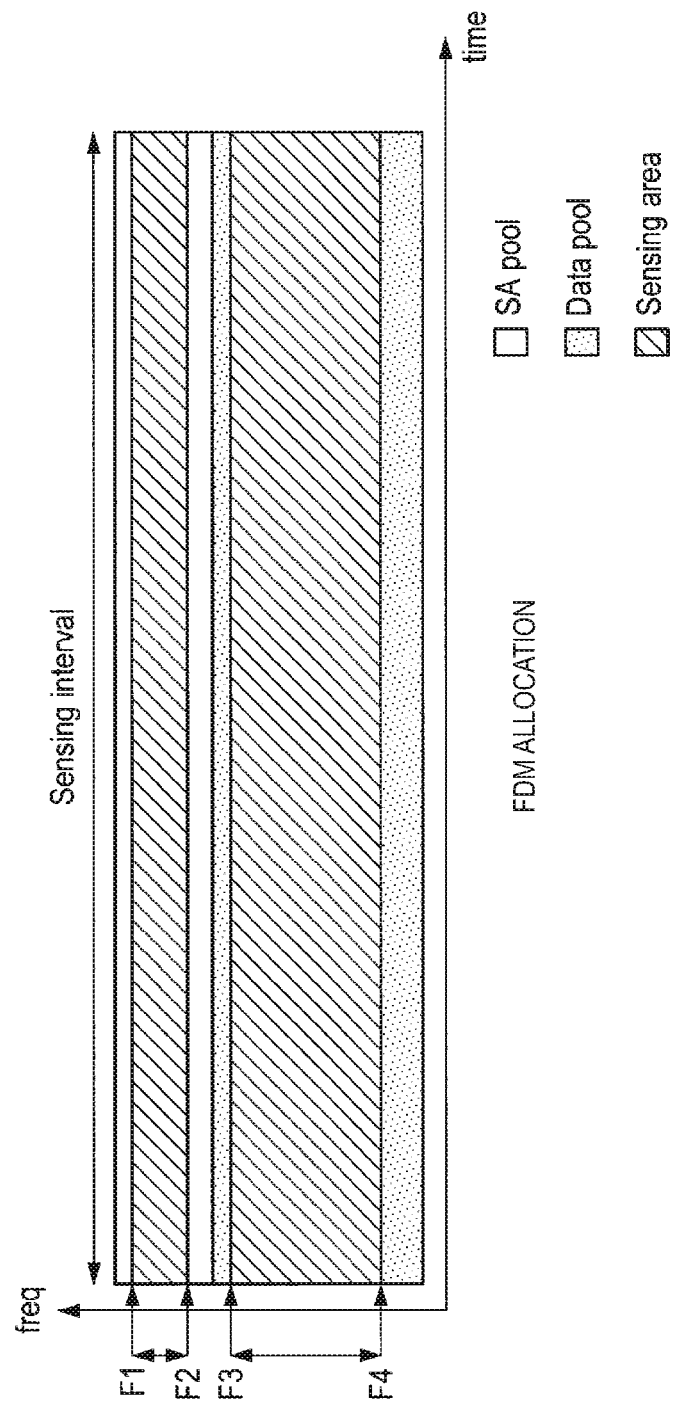
FIG. 31 is an explanatory diagram illustrating an example in which a frequency band of sensing in FDM is restricted.

Further, in the UE, the frequency band of sensing may be restricted. FIG. 31 is an explanatory diagram illustrating an example in which the frequency band of sensing in FDM is restricted. The UE is informed of the frequency band for sensing by way of, for example, {(F1, F2)} and {(F3, F4)} in FIG. 31.

Figure 32:
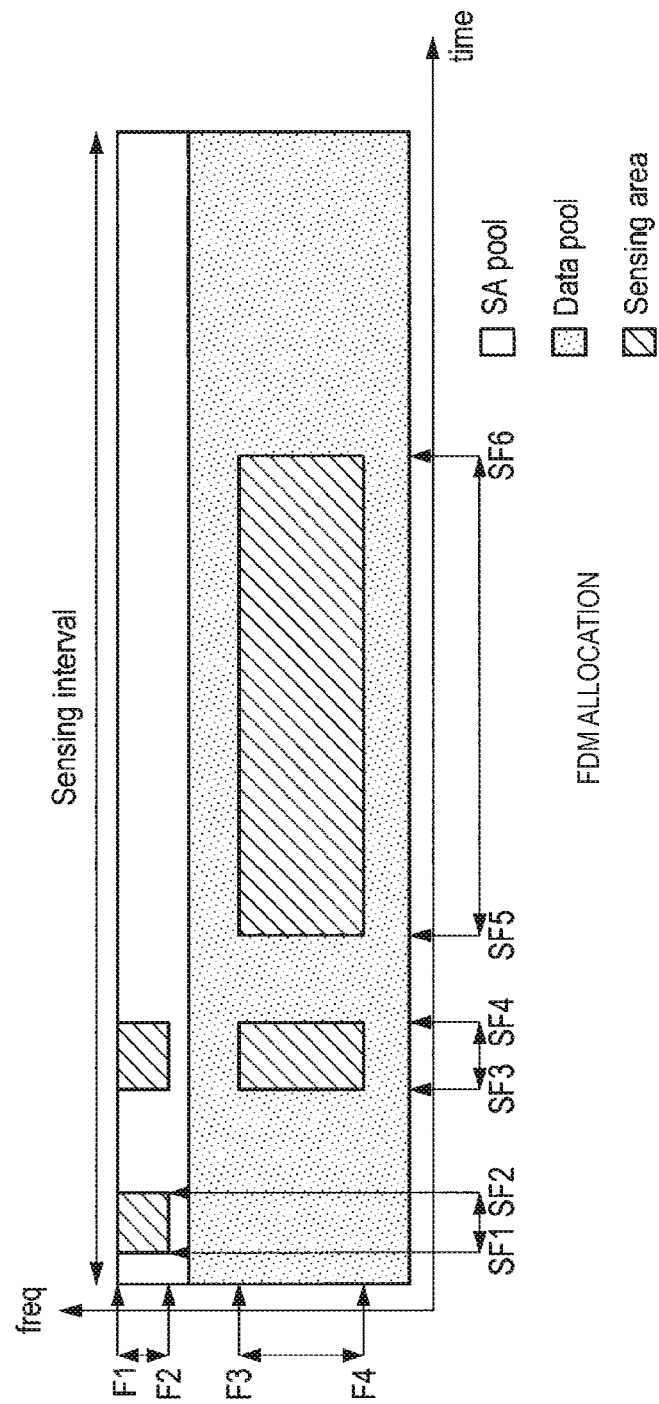
FIG. 32 is an explanatory diagram illustrating an example in which both a time interval and a frequency band of sensing in FDM are restricted.

In the UE, both the time interval and the frequency band of sensing may be restricted. FIG. 32 is an explanatory diagram illustrating an example in which both the time interval and the frequency band of sensing in FDM are restricted. The UE is informed of the time interval and the frequency band for sensing by way of, for example, SA{(SF1, SF2)}, {(SF3, SF4)}, data{(SF4, SF5)}, and {(F1, F2), (F3, F4)} in FIG. 32.

Figure 33:
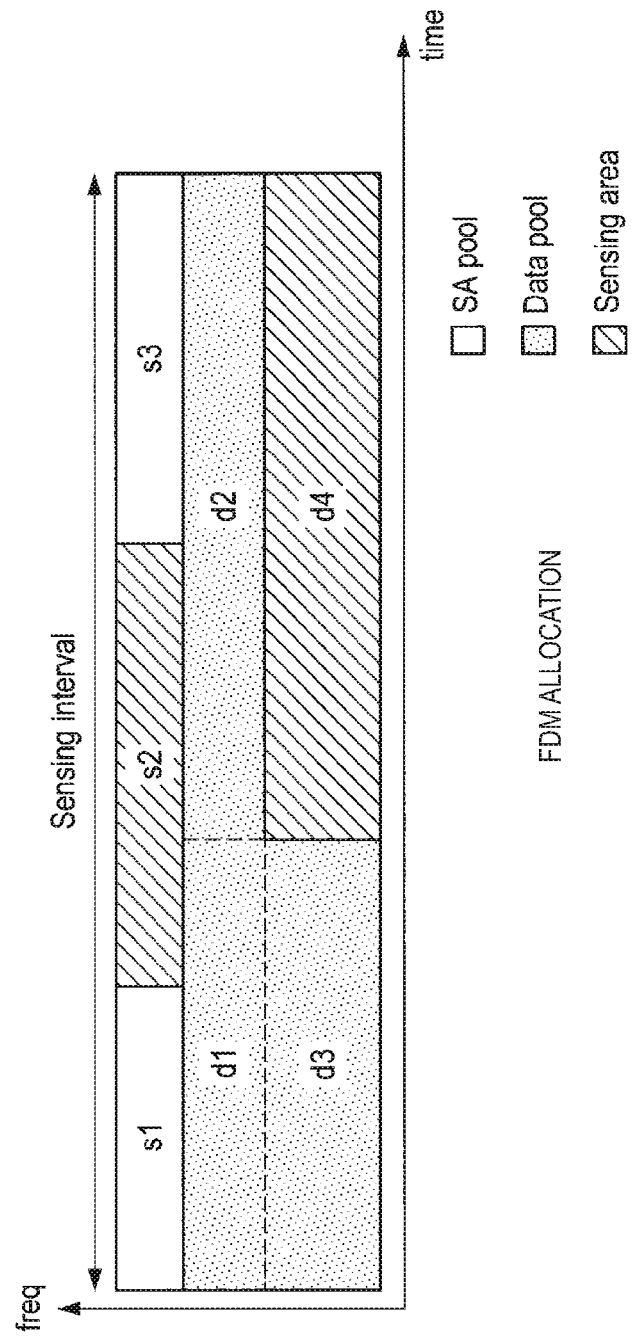
FIG. 33 is an explanatory diagram illustrating an example in which a block of sensing in FDM is restricted.

In the UE, a block of sensing may be restricted. The pool is partitioned, and each pool is given a block ID. FIG. 33 is an explanatory diagram illustrating an example in which the block of sensing in FDM is restricted. The UE is informed of the block ID for sensing in units of block by way of, for example {s4, d4} in FIG. 33.

3. Typical Example of Sensing (eNB Performs Sensing)

Figure 34:
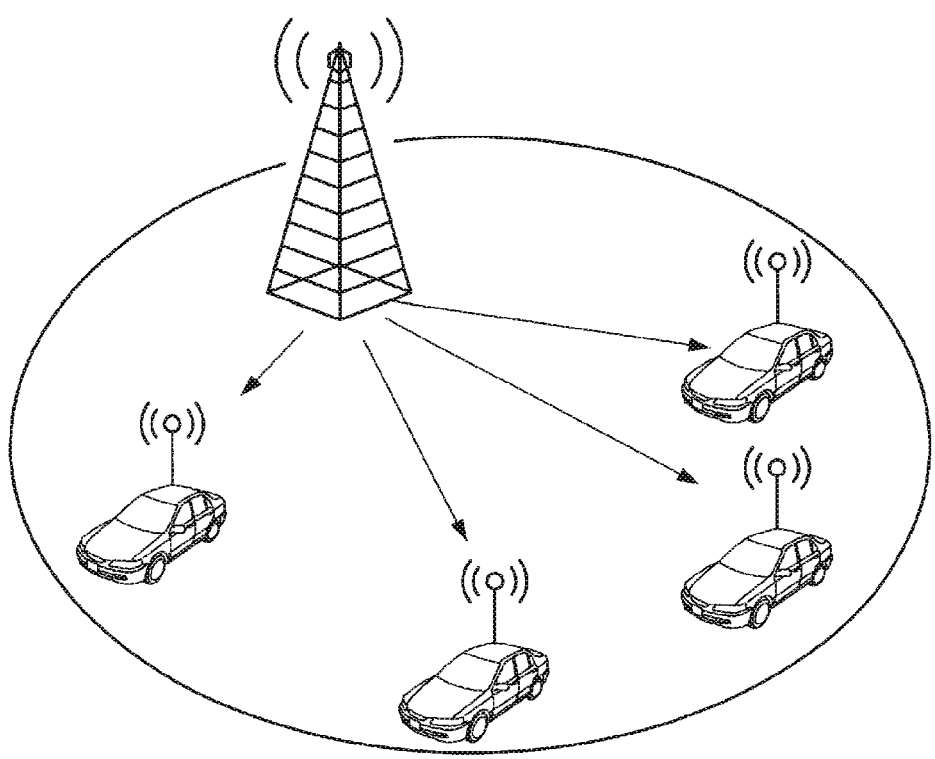
FIG. 34 is an explanatory diagram illustrating an example in which an eNB performs sensing.

FIG. 34 is an explanatory diagram illustrating an example in which the eNB performs the sensing.

(RSU Performs Sensing)

Figure 35:
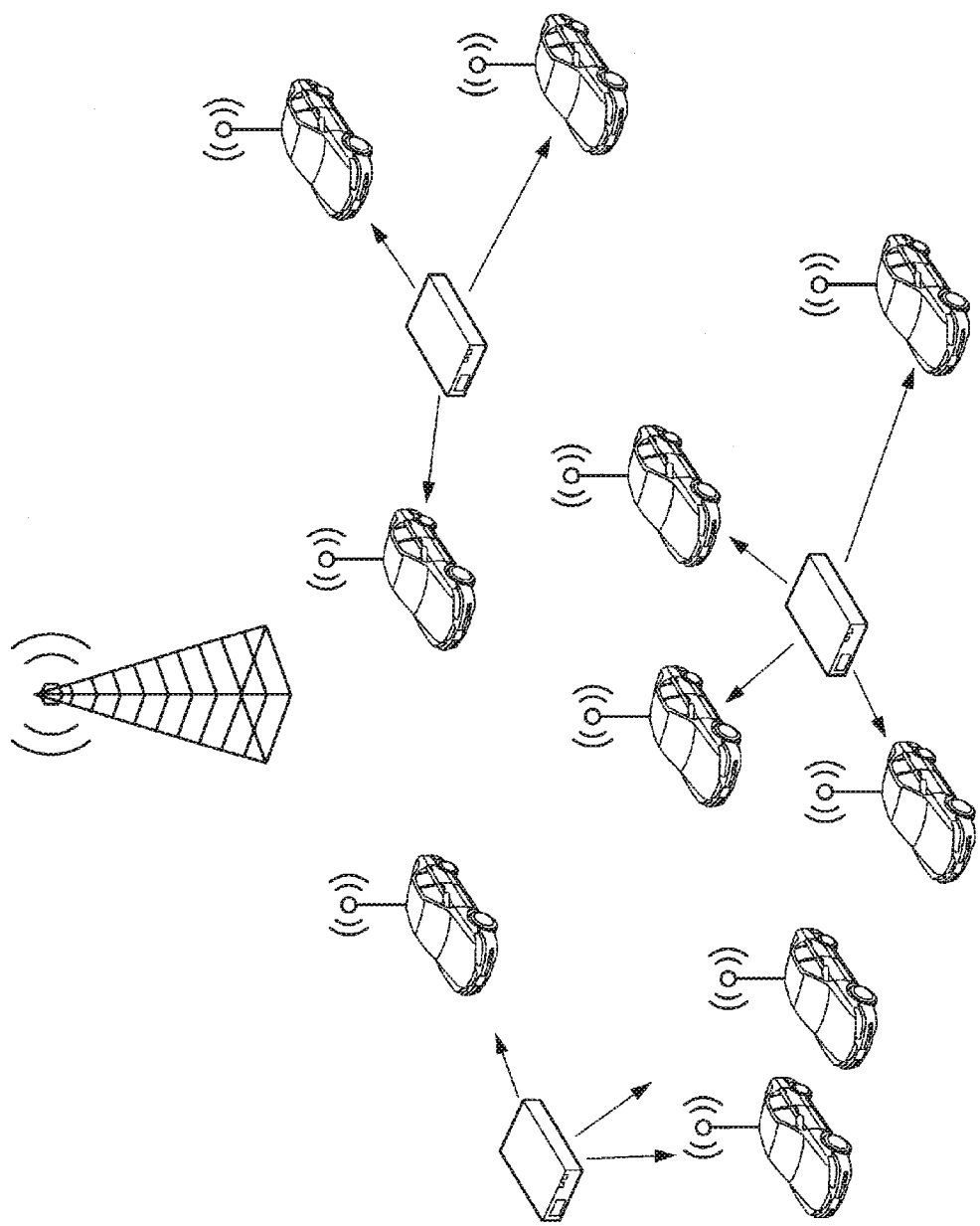
FIG. 35 is an explanatory diagram illustrating an example in which an RSU performs sensing.

FIG. 35 is an explanatory diagram illustrating an example in which the RSU performs the sensing.

(Representative UE Performs Sensing)

Figure 36:
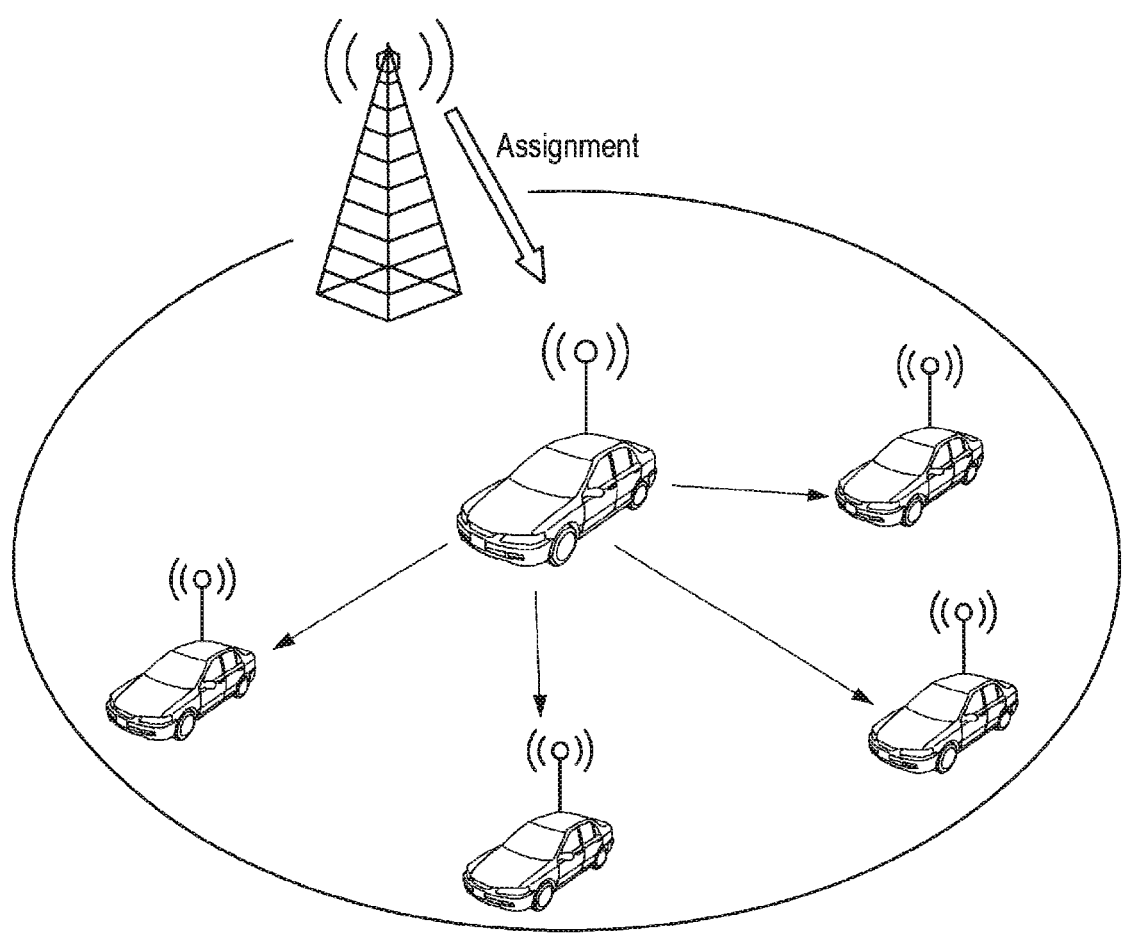
FIG. 36 is an explanatory diagram illustrating an example in which a representative UE performs sensing.

FIG. 36 is an explanatory diagram illustrating an example in which the representative UE performs the sensing. FIG. 36 illustrates an example in which the eNB assigns one or more UEs as a UE performing the sensing.

FIG. 37 is an explanatory diagram illustrating an example in which the representative UE performs the sensing. FIG. 37 illustrates an example in which the RSU assigns one or more UEs as a UE performing the sensing.

Figure 38:
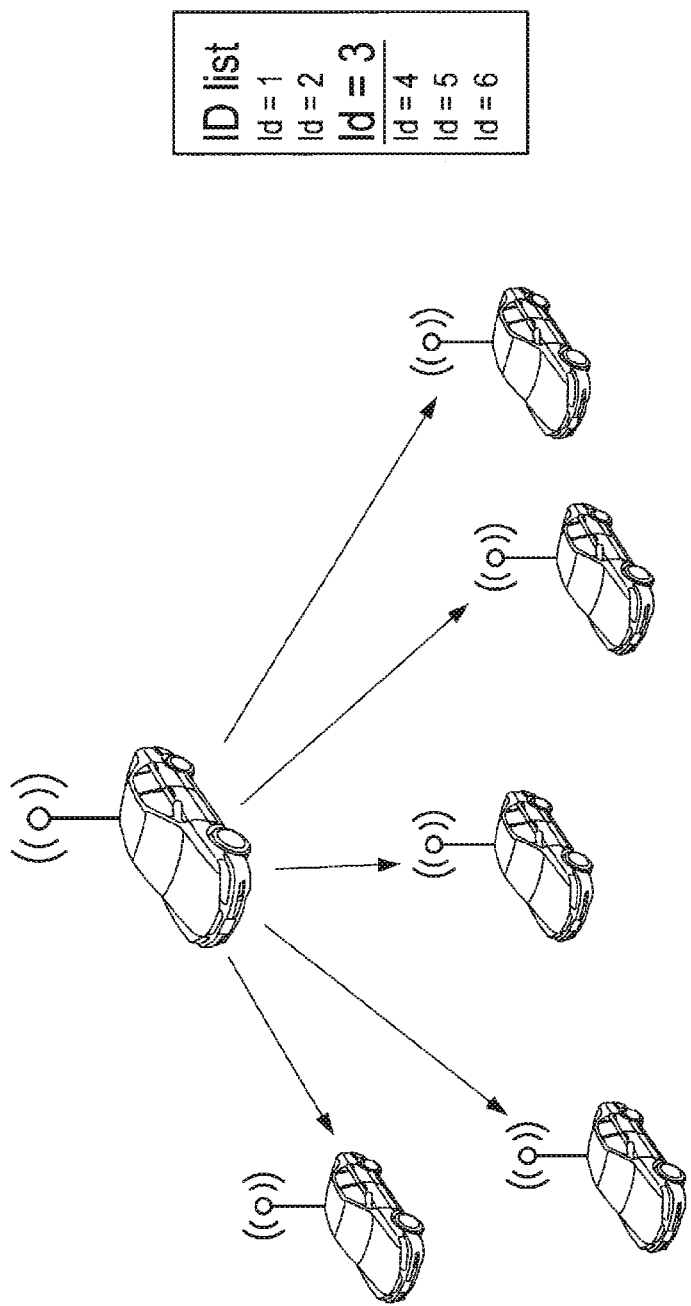
FIG. 38 is an explanatory diagram illustrating an example in which a representative UE performs sensing.

FIG. 38 is an explanatory diagram illustrating an example in which the representative UE performs the sensing. FIG. 38 illustrates an example in which the UE decides the representative UE, for example, using UEid. FIG. 38 illustrates an example in which the UE with Id=3 is decided as the representative UE.

(Liberation and Reassignment of Representative UE)

Figure 39:
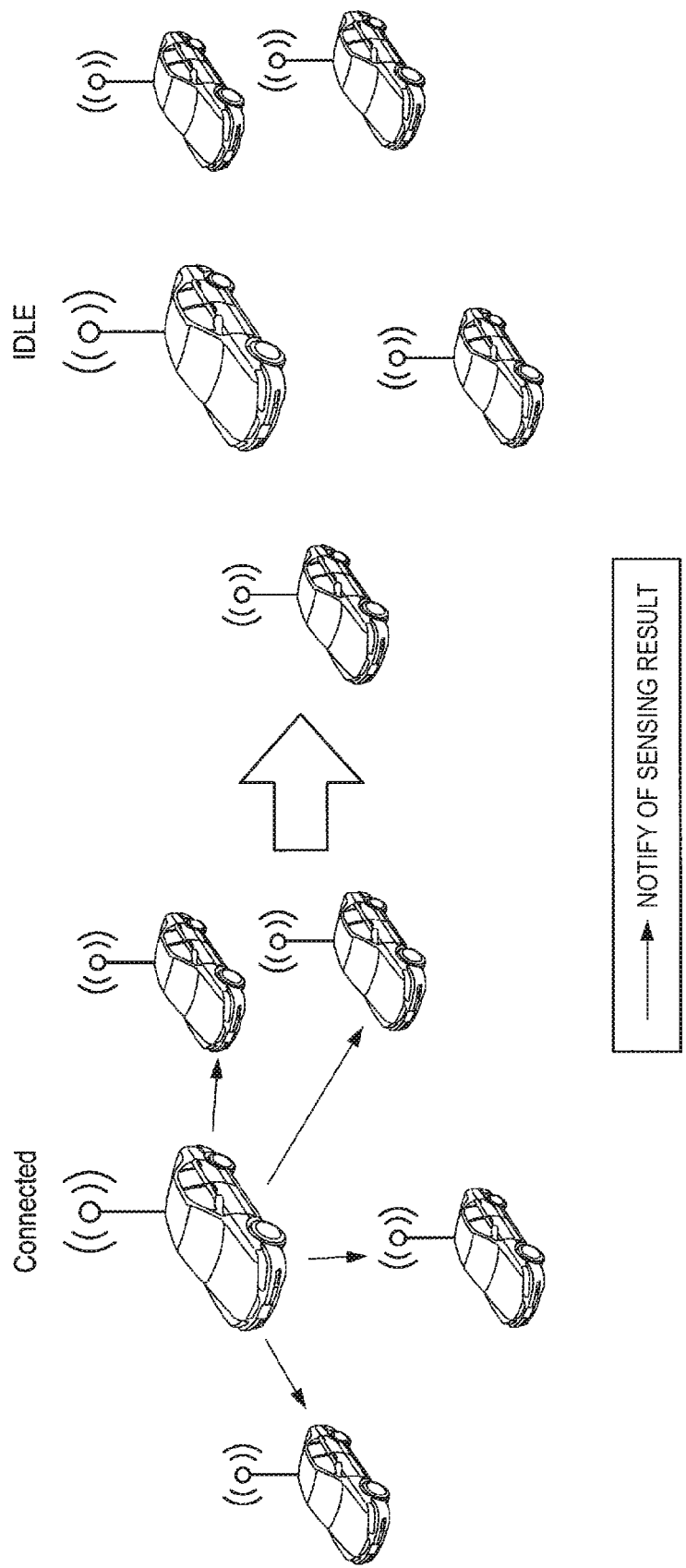
FIG. 39 is an explanatory diagram illustrating an example in which a representative UE is freed in a case in which a state of a UE changes from a connected state to an idle state.

For example, the representative UE may be liberated in a case in which the state of the UE changes from the connected state to the idle state. FIG. 39 is an explanatory diagram illustrating an example in which the representative UE is liberated in a case in which the state of the UE changes from the connected to the idle.

Figure 41:
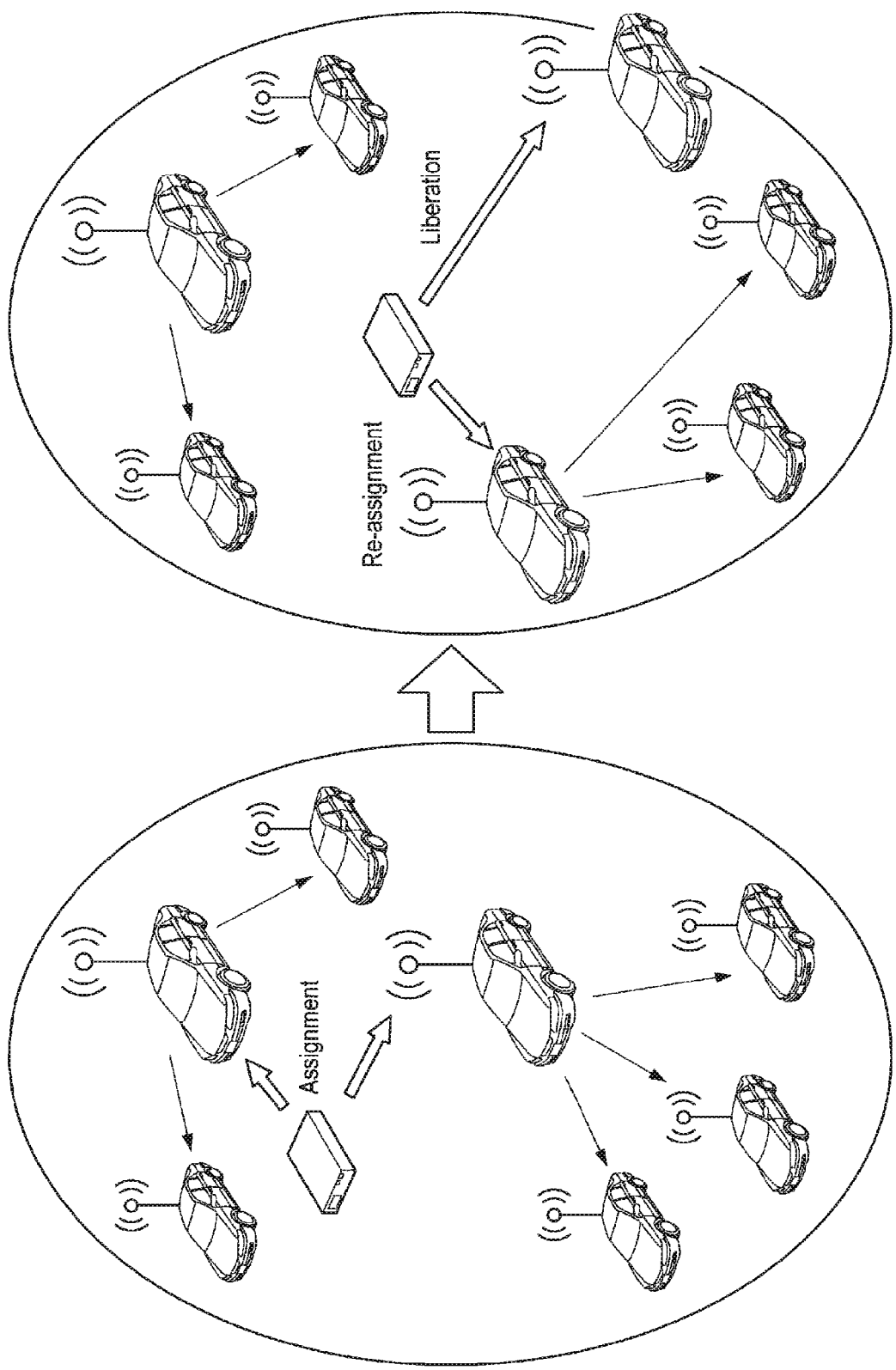
FIG. 41 is an explanatory diagram illustrating an example in which a representative UE is freed in a case in which separated from a current RSU.

Further, for example, the representative UE may be liberated in a case in which it is separated from the current eNB or the RSU. FIG. 40 is an explanatory diagram illustrating an example in which the representative UE is liberated in a case in which it is separated from the current eNB. Further, FIG. 41 is an explanatory diagram illustrating an example in which the representative UE is liberated in a case in which it is separated from the current RSU.

Figure 42:
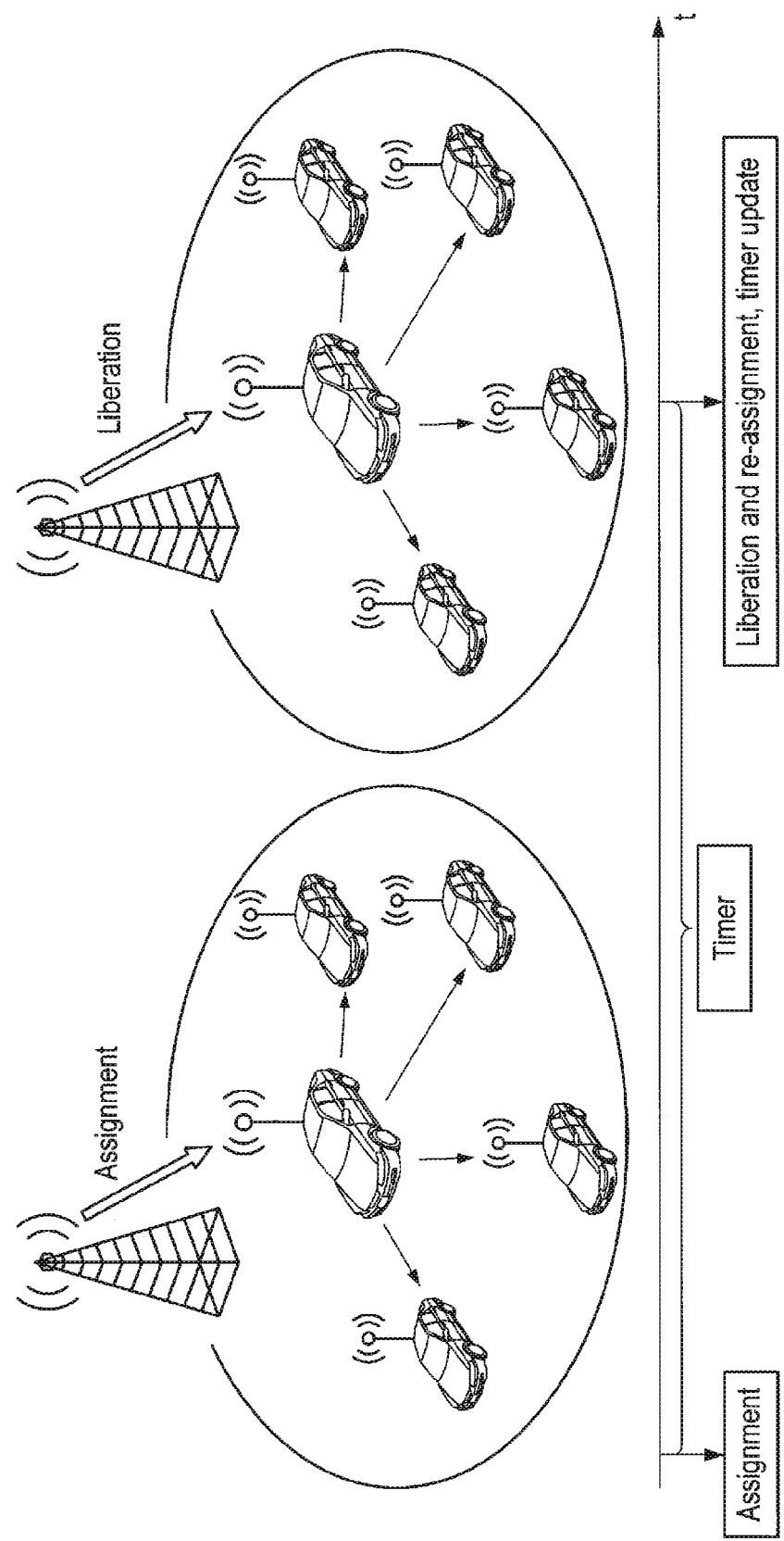
FIG. 42 is an explanatory diagram illustrating an example of new assignment of a representative UE using a timer.

A new assignment of the representative UE can be performed using, for example, a predetermined timer. FIG. 42 is an explanatory diagram illustrating an example of a new assignment of the representative UE using a timer.

Figure 43:
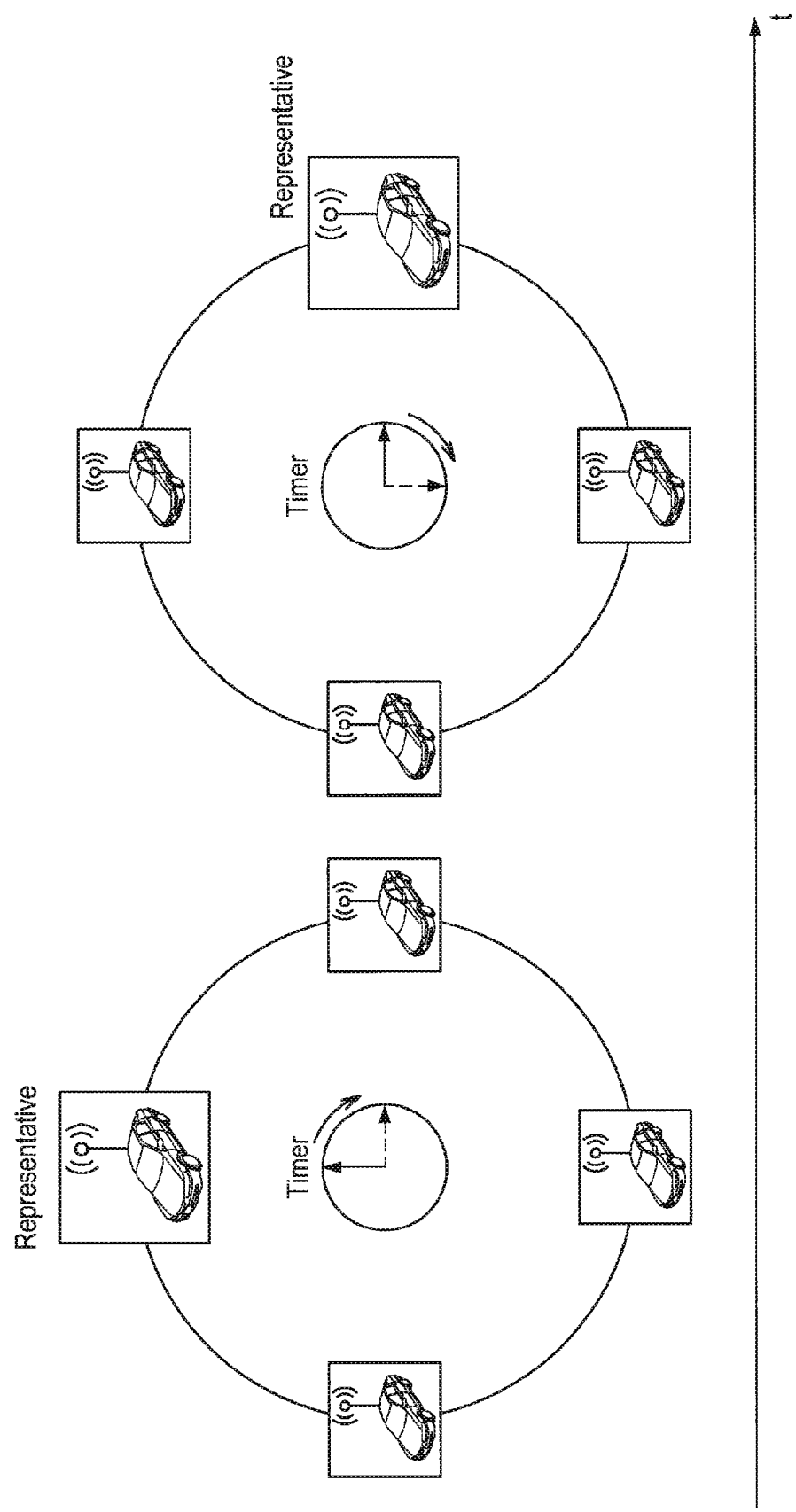
FIG. 43 is an explanatory diagram illustrating an example in which a representative UE performs sensing in order using a predetermined timer.

A new assignment of the representative UE can also be performed, for example, by the representative UE performing the sensing in order using a predetermined timer. FIG. 43 is an explanatory diagram illustrating an example in which the representative UE performs the sensing in order using a predetermined timer.

4. Sensing+LBT (LBT Using Back-Off)

In a subframe SF0, in the transmission terminal, the counter N is set 5. The terminal starts the sensing from a next subframe SF1. It is assumed that as a result of sensing, it is determined that there is a margin in resources in subframes SF1 to SF3, there is no margin in resources in subframes SF4 to SF5, and there is a margin in resources in subframes SF6 to SF7.

In the subframes SF1 to SF3, since there are three subframes that have extra resources, the counter N is subtracted from 5 to 2.

In the subframes SF4 to SF5, since there is no margin in resources, the value of the counter N does not change.

In the subframes SF6 to SF7, since there are three subframes that have enough resources, the counter N is decremented from 2 to 0. Therefore, the terminal selects the resources in the next subframe SF8 and transmits the packet.

(LBT without Back-Off)

In the subframe SF0, in the transmission terminal, the counter N is set 5. The terminal is on standby for five subframes, then selects the resources in the next subframe, and transmits the packet.

(Enhanced LBT in Case of TDM)

Figure 44:
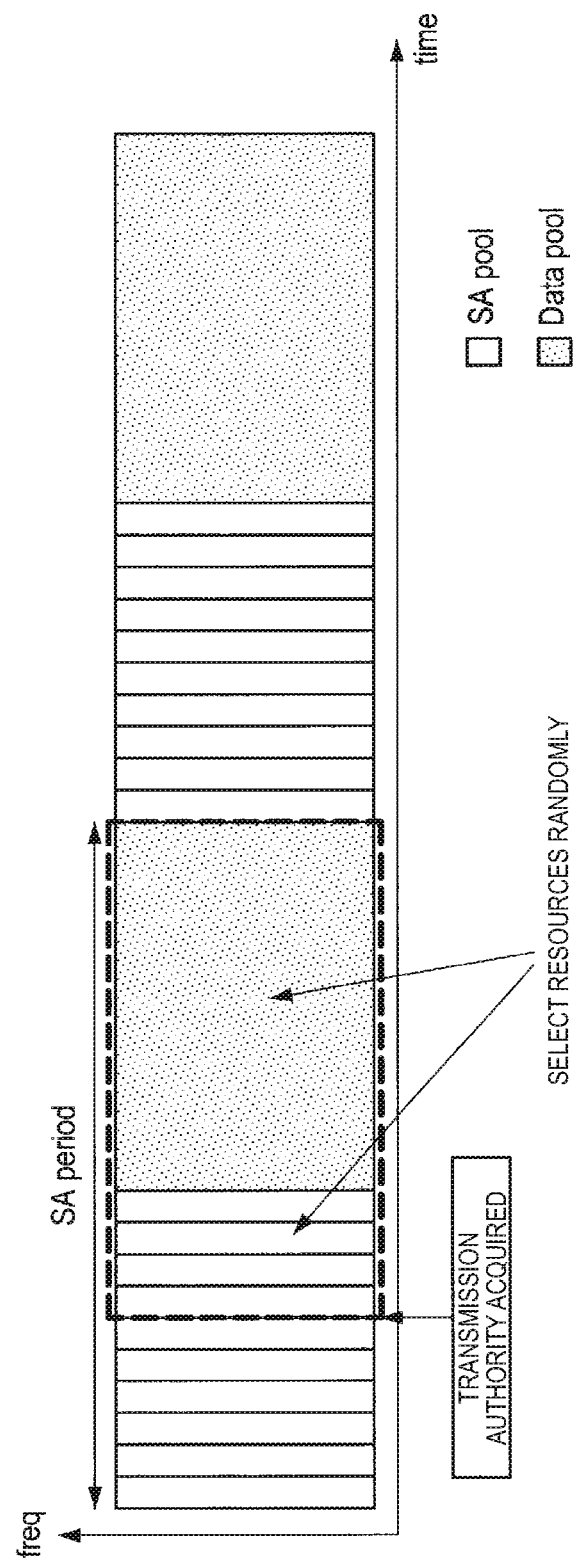
FIG. 44 is an explanatory diagram illustrating an enhanced LBT.

(1) Only transmission authority for SA is determined. As a condition, a subframe offset is set to 2. A first example is a case in which the counter N becomes 0, the transmission authority is acquired, and the number of remaining subframes is four which is larger than the subframe offset. FIG. 44 is an explanatory diagram illustrating an enhanced LBT. In this case, the UE randomly selects the SA resources from the remaining SA pool and the data pool in the current SA period.

Figure 45:
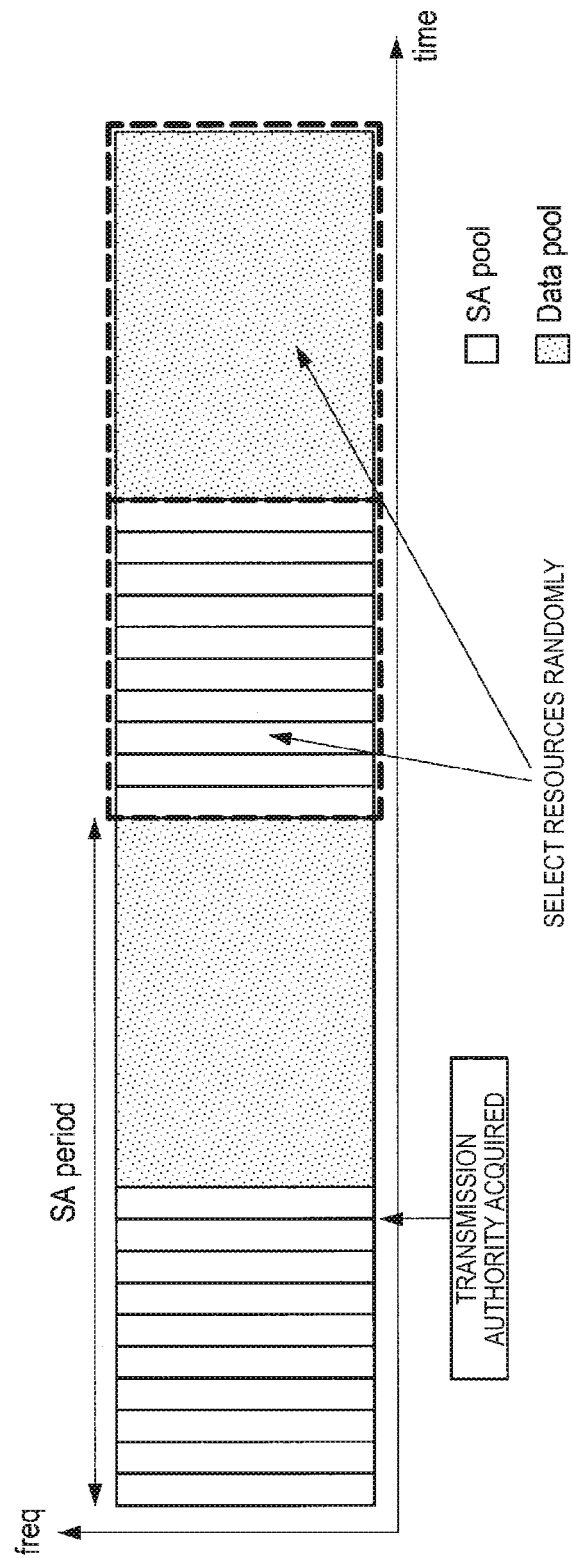
FIG. 45 is an explanatory diagram illustrating an enhanced LBT.

A second example is a case in which the counter N becomes 0, the transmission authority is acquired, and the number of remaining subframes is one which is smaller than the subframe offset. FIG. 45 is an explanatory diagram illustrating an enhanced LBT. In this case, the UE randomly selects the SA resources and the data resources from the SA pool and the data pool in the next SA period.

Figure 46:
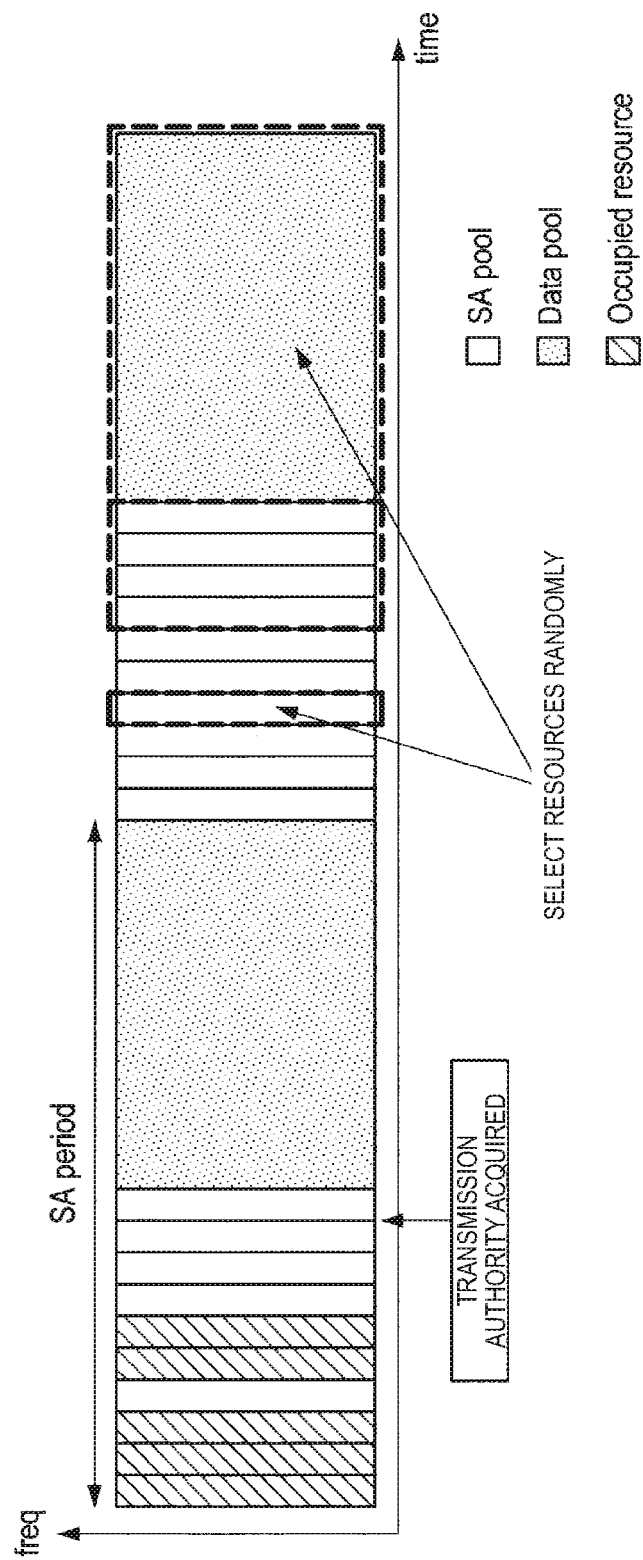
FIG. 46 is an explanatory diagram illustrating an enhanced LBT.

A third example is a case in which counter N becomes 0, the transmission authority is acquired, and the number of remaining subframes is one which is smaller than subframe offset. FIG. 46 is an explanatory diagram illustrating an enhanced LBT. In this case, the UE selects the SA resources on the basis of the result of SA_LBT in the SA pool and the data pool in the next SA period, and randomly selects the data resources.

(2) Only Transmission Authority for Data is Determined

Figure 47:
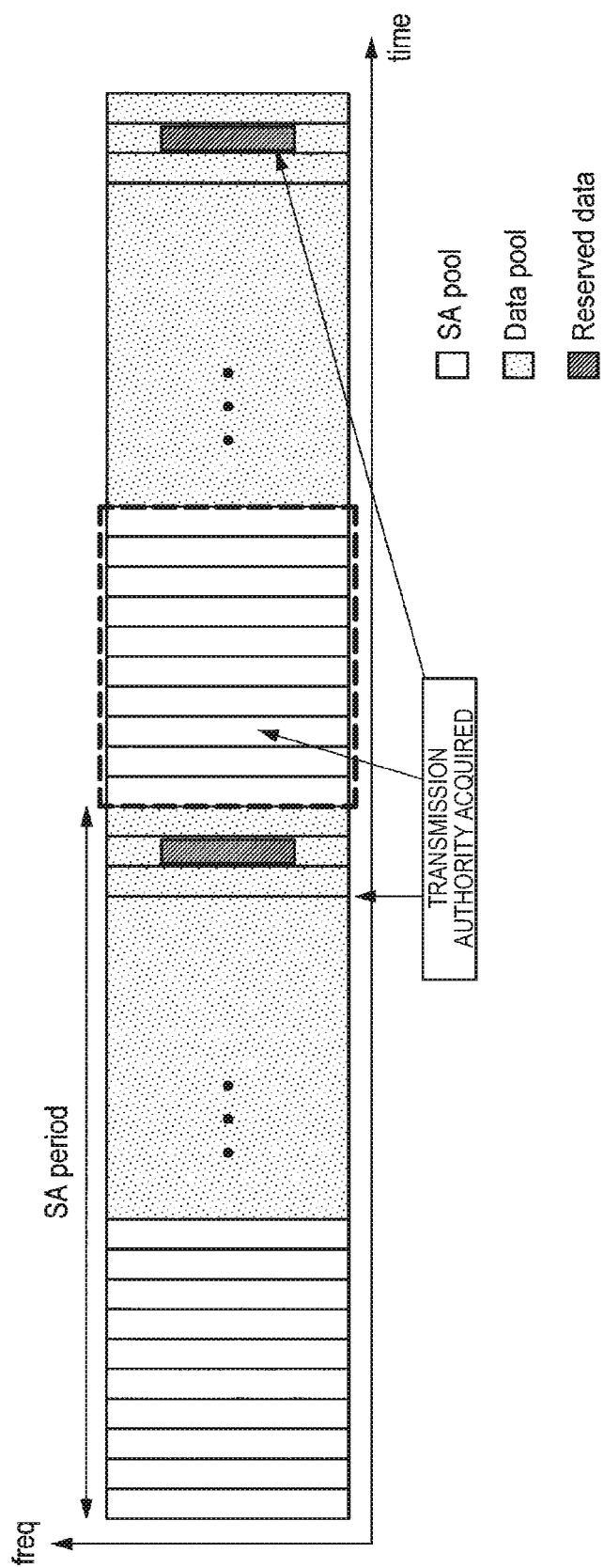
FIG. 47 is an explanatory diagram illustrating an enhanced LBT.

As a condition, the subframe offset is set to 2. A first example is a case in which the counter N becomes 0, the transmission authority is acquired, and the number of remaining subframes is 3 which is larger than the subframe offset. FIG. 47 is an explanatory diagram illustrating an enhanced LBT. In this case, the UE randomly selects the SA resources from the SA pool in the next SA period and selects the data resources from the reserved data pool.

Figure 48:
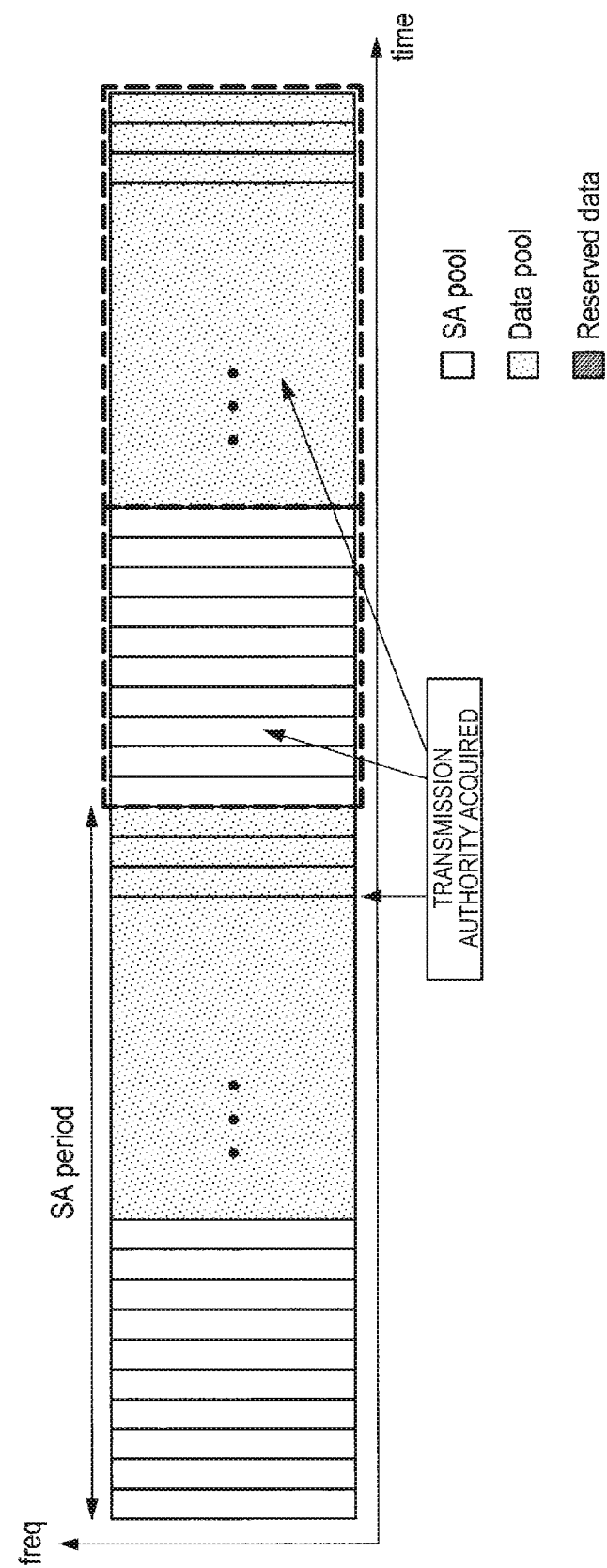
FIG. 48 is an explanatory diagram illustrating an enhanced LBT.

A second example is a case in which the counter N becomes 0, the transmission authority is acquired, and the number of remaining subframes is one which is smaller than the subframe offset. FIG. 48 is an explanatory diagram illustrating an enhanced LBT. In this case, the UE randomly selects the SA resources and the data resources from the SA pool and the data pool in the next SA period.

Figure 49:
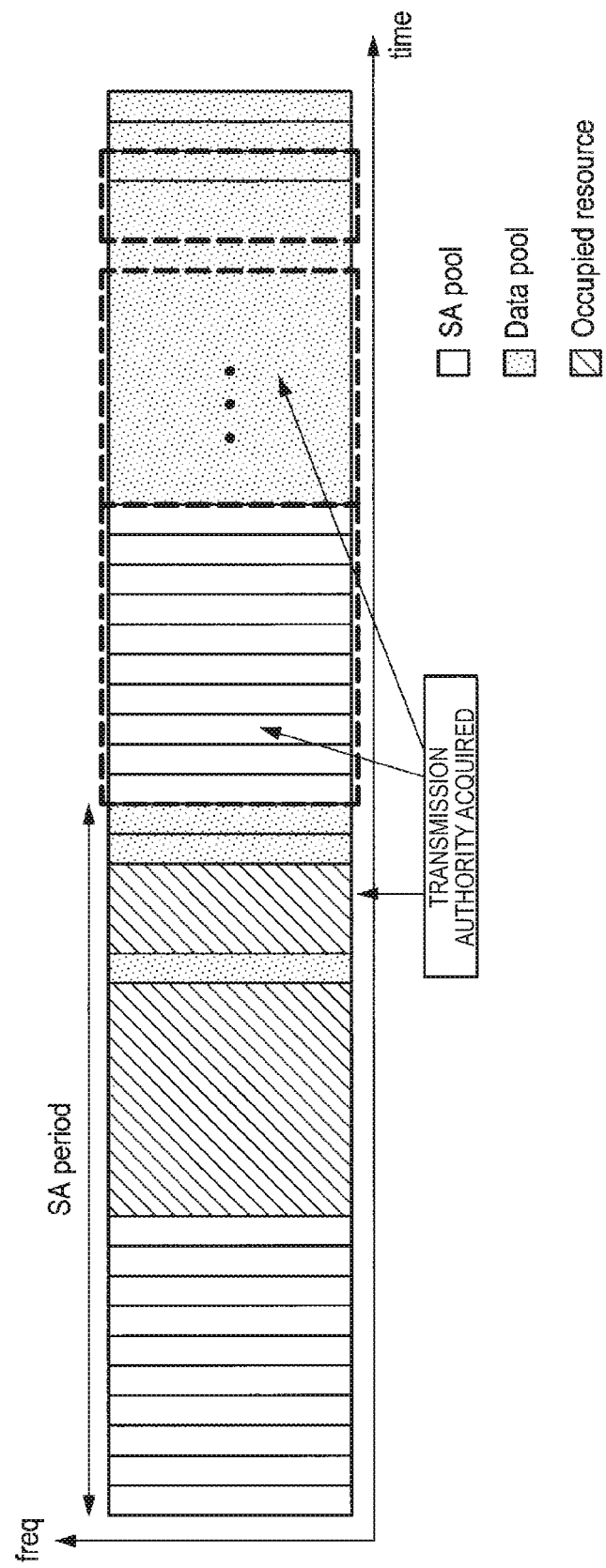
FIG. 49 is an explanatory diagram illustrating an enhanced LBT.

A third example is a case in which counter N becomes 0, the transmission authority is acquired, and the number of remaining subframes is one which is smaller than subframe offset. FIG. 49 is an explanatory diagram illustrating an enhanced LBT. In this case, the UE selects the SA resources from the SA pool in the next SA period, and selects the SA resources from the result of DATA_LBT in the data pool.

Figure 50:
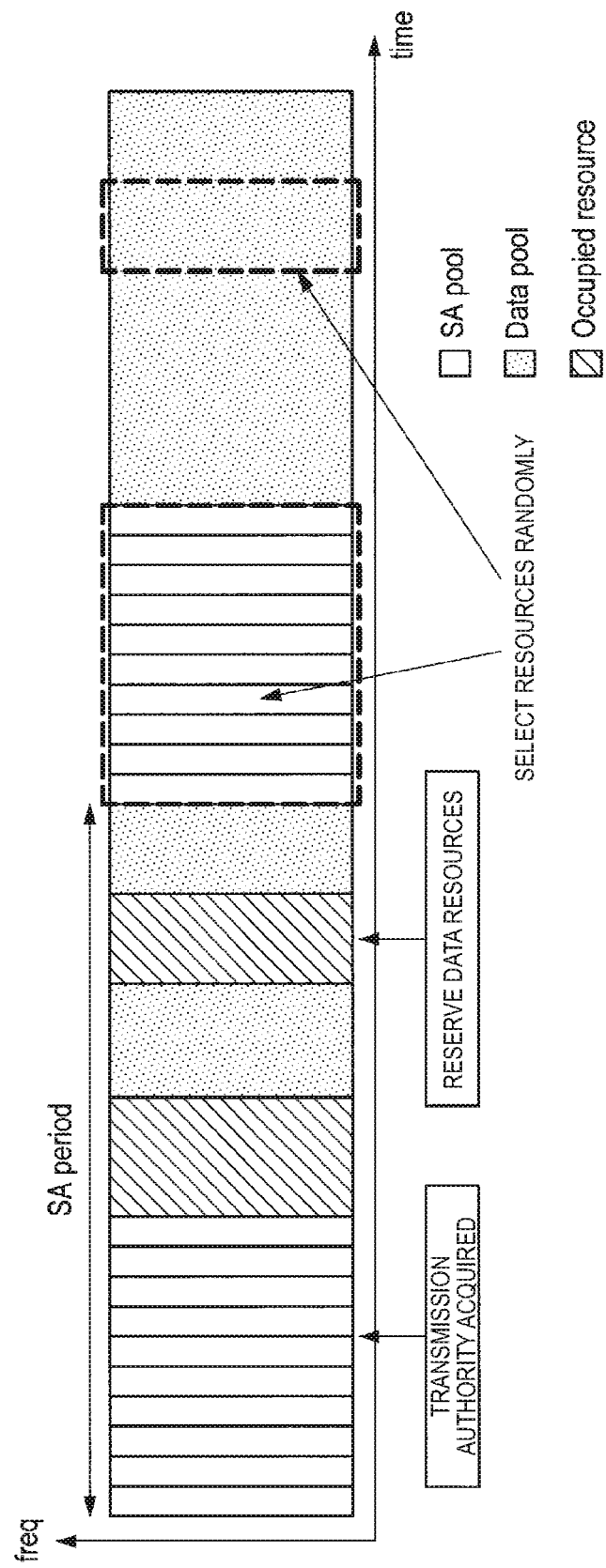
FIG. 50 is an explanatory diagram illustrating an enhanced LBT.

(3) Both Transmission Authority of SA and Transmission Authority of Data are Determined As a condition, the subframe offset is set to 2. FIG. 50 is an explanatory diagram illustrating an enhanced LBT. A first example is a case in which the transmission authority for the SA is acquired, but the data resources are not secured. In this case, the UE reserves the data resources in the current SA period and randomly selects the data resources from the SA pool and the data pool in the next SA period.

Figure 51:
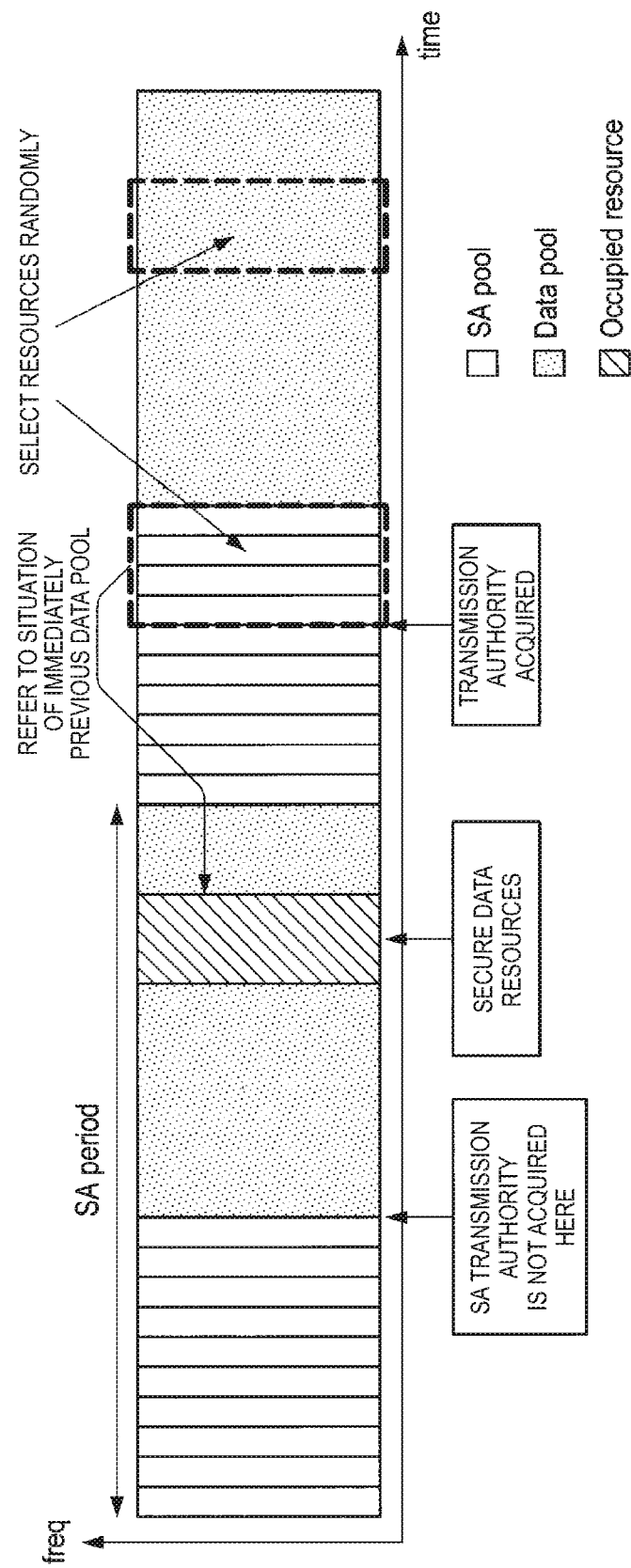
FIG. 51 is an explanatory diagram illustrating an enhanced LBT.

FIG. 51 is an explanatory diagram illustrating an enhanced LBT. A second example is a case in which the data resources are secured, but the transmission authority for the SA is not acquired. In this case, when the transmission authority is acquired, the UE randomly selects the SA resources from the current SA pool and the reserved data pool with reference to a situation of an immediately previous SA period.

1.3. Configuration Example

Figure 52:
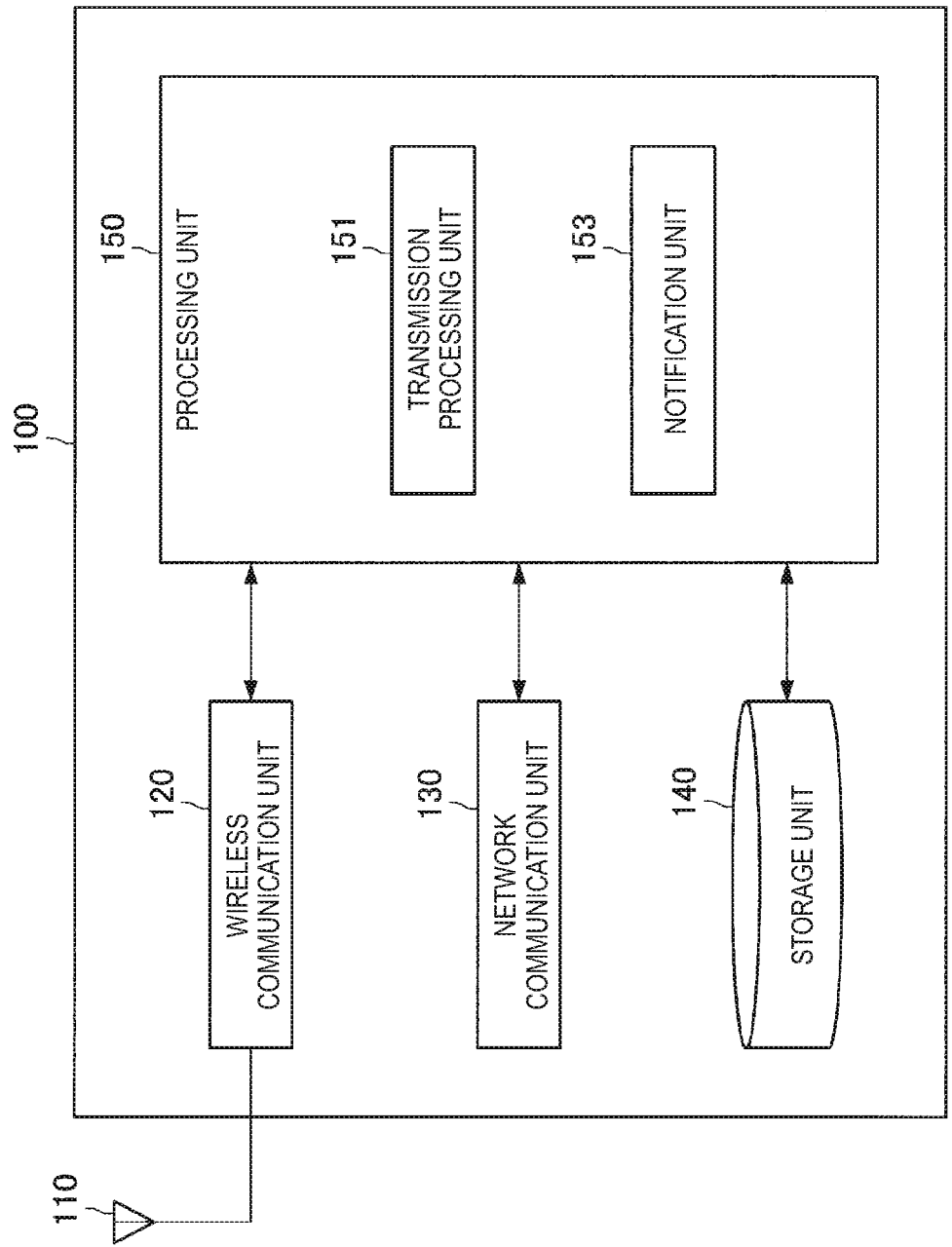
FIG. 52 is a block diagram illustrating an example of a configuration of a base station 100 according to an embodiment of the present disclosure.

Next, an example of a configuration of a base station (eNB) 100 according to an embodiment of the present disclosure will be described with reference to FIG. 52. FIG. 52 is a block diagram illustrating an example of the configuration of the base station 100 according to an embodiment of the present disclosure. Referring to FIG. 52, a base station 100 includes an antenna unit 110, a wireless communication unit 120, a network communication unit 130, a storage unit 140, and a processing unit 150.

(1) Antenna Unit 110

The antenna unit 110 radiates a signal output from the wireless communication unit 120 to the space as a radio wave. Further, the antenna unit 110 converts a radio wave in the space into a signal, and outputs the signal to the wireless communication unit 120.

(2) Wireless Communication Unit 120

The wireless communication unit 120 performs transmission and reception of signals. For example, the wireless communication unit 120 transmits a downlink signal to the terminal device and receives an uplink signal from the terminal device.

(3) Network Communication Unit 130

The network communication unit 130 performs transmission and reception of information. For example, the network communication unit 130 transmits information to other nodes and receives information from other nodes. For example, other node includes another base station and a core network node.

(4) Storage Unit 140

The storage unit 140 temporarily or permanently stores a program for the operation of the base station 100 and various data.

(5) Processing Unit 150

The processing unit 150 provides various functions of the base station 100. The processing unit 150 includes a transmission processing unit 151 and a notification unit 153. Further, the processing unit 150 may further include components other than these constituent elements. That is, the processing unit 150 may also perform an operation other than the operations of these components.

The transmission processing unit 151 executes a process related to transmission of data to be transmitted to a terminal device 200. The transmission processing unit 151 executes a general process of the base station (eNB). Further, the notification unit 153 executes a process related to notification of information to the terminal device 200. The notification unit 153 executes a general notification process for the terminal device of the base station (eNB).

Figure 53:
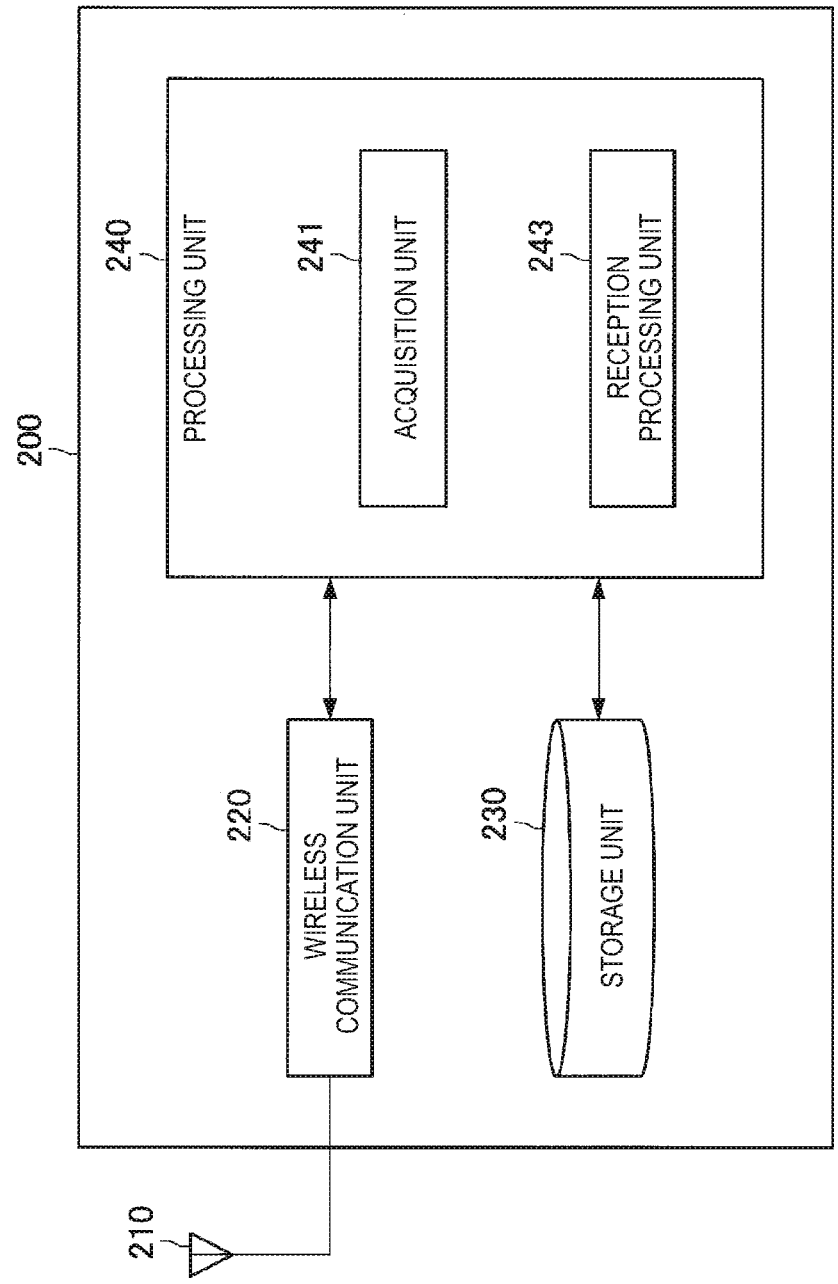
FIG. 53 is a block diagram illustrating an example of a configuration of a terminal device 200 according to an embodiment of the present disclosure.

Next, an example of a configuration of the terminal device 200 according to an embodiment of the present disclosure will be described with reference to FIG. 53. FIG. 53 is a block diagram illustrating an example of the configuration of the terminal device 200 according to an embodiment of the present disclosure. Referring to FIG. 53, the terminal device 200 includes an antenna unit 210, a wireless communication unit 220, a storage unit 230, and a processing unit 240.

(1) Antenna Unit 210

The antenna unit 210 radiates a signal output from the wireless communication unit 220 to the space as a radio wave. Further, the antenna unit 210 converts a radio wave in the space into a signal, and outputs the signal to the wireless communication unit 220.

(2) Wireless Communication Unit 220

The wireless communication unit 220 performs transmission and reception of signals. For example, the wireless communication unit 220 receives a downlink signal from the base station and transmits an uplink signal to the base station.

(3) Storage Unit 230

The storage unit 230 temporarily or permanently stores a program for the operation of the terminal device 200 and various data.

(4) Processing Unit 240

The processing unit 240 provides various functions of the terminal device 200. The processing unit 240 includes an acquisition unit 241 and a reception processing unit 243. Further, the processing unit 240 may further include other components than these constituent elements. That is, the processing unit 240 may also perform an operation other than the operations of these components.

The acquisition unit 241 executes a process related to acquisition of data transmitted from the base station 100. The reception processing unit 243 executes a process related to reception of data acquired by the acquisition unit 241. The reception processing unit 243 executes a general process of the terminal device described above.

2. APPLICATION EXAMPLES

The technology of the present disclosure can be applied to various products. The base station 100 may be realized as any type of evolved node B (eNB), for example, a macro eNB, a small eNB, or the like. A small eNB may be an eNB that covers a smaller cell than a macro cell, such as a pico eNB, a micro eNB, or a home (femto) eNB. Alternatively, the base station 100 may be realized as another type of base station such as a node B or a base transceiver station (BTS). The base station 100 may include a main body that controls radio communication (also referred to as a base station device) and one or more remote radio heads (RRHs) disposed in a different place from the main body. In addition, various types of terminals to be described below may operate as the base station 100 by temporarily or semi-permanently executing the base station function.

In addition, the terminal device 200 may be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the terminal device 200 may be realized as a terminal that performs machine-to-machine (M2M) communication (also referred to as a machine type communication (MTC) terminal). Furthermore, the terminal device 200 may be a wireless communication module mounted in such a terminal (for example, an integrated circuit module configured in one die).

2.1. Application Example with Regard to Base Station

First Application Example

Figure 54:
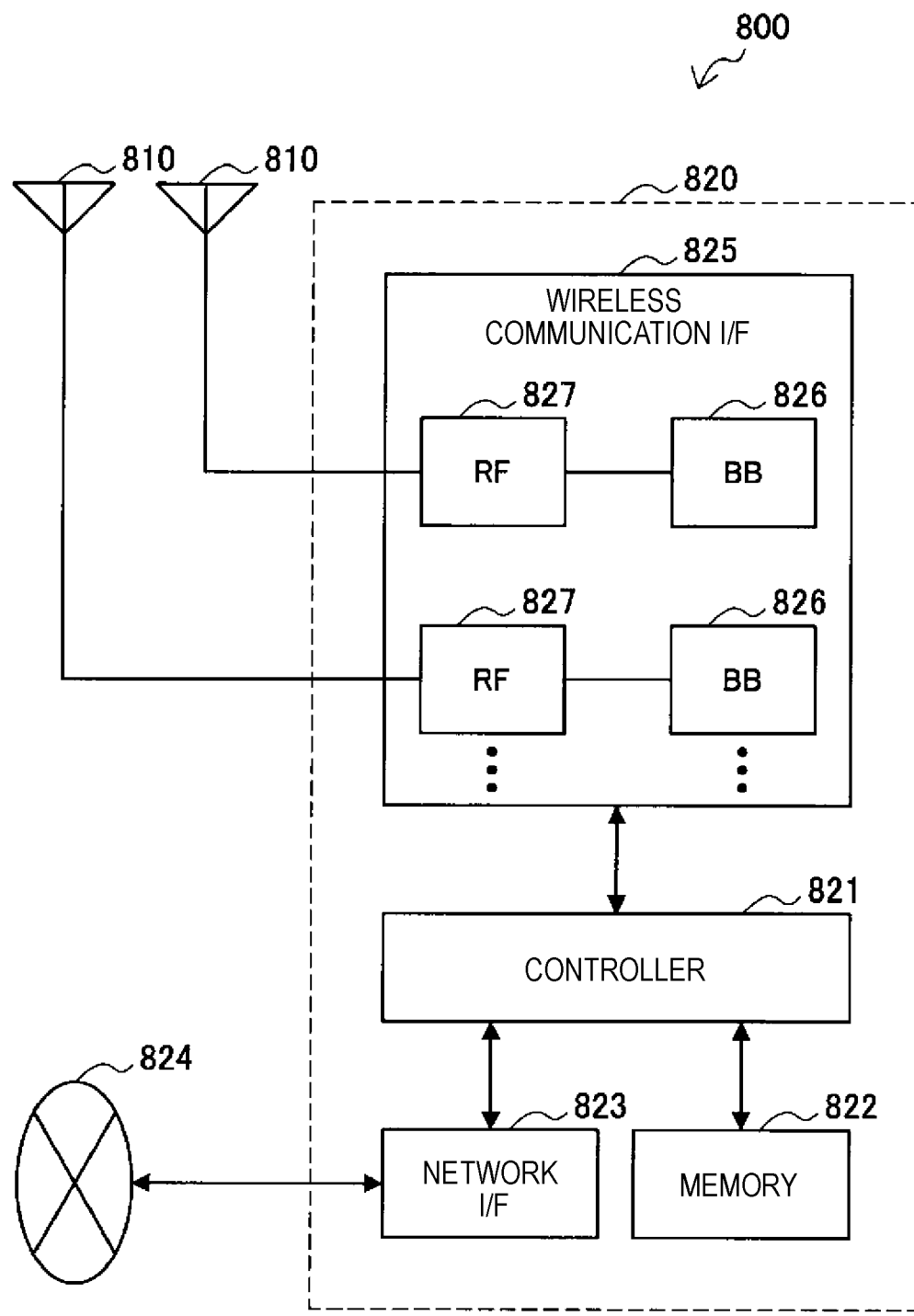
FIG. 54 is a block diagram illustrating a first example of a schematic configuration of an eNB to which the technology of the present disclosure can be applied.

FIG. 54 is a block diagram illustrating a first example of a schematic configuration of an eNB to which the technology of the present disclosure may be applied. An eNB 800 includes one or more antennas 810 and a base station device

820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 54. For example, the multiple antennas 810 may be compatible with multiple frequency bands used by the eNB 800. Although FIG. 54 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In this case, the eNB 800 may be connected to a core network node or another eNB through a logical interface (e.g. S1 interface or X2 interface). The network interface 823 may also be a wired communication interface or a wireless communication interface for wireless backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 54. For example, the multiple BB processors 826 may be compatible with multiple frequency bands used by the eNB 800. The wireless communication interface 825 may include the multiple RF circuits 827, as illustrated in FIG. 54. For example, the multiple RF circuits 827 may be compatible with multiple antenna elements. Although FIG. 54 illustrates the example in which the wireless communication interface 825 includes the multiple BB processors 826 and the multiple RF circuits 827, the wireless communication interface 825 may also include a single BB processor 826 or a single RF circuit 827.

In the eNB 800 shown in FIG. 54, one or more constituent elements (the transmission processing unit 151 and/or the notification unit 153) included in the processing unit 150 described with reference to FIG. 52 may be implemented by the wireless communication interface 825. Alternatively, at least some of these constituent elements may be implemented by the controller 821. As an example, a module which includes a part (for example, the BB processor 826) or all of the wireless communication interface 825 and/or the controller 821 may be mounted in the eNB 800, and the above-described one or more constituent elements may be implemented by the module. In this case, the module may store a program for causing the processor to function as the above-described one or more constituent elements (i.e., a program for causing the processor to execute operations of the one or more constituent elements) and may execute the program. As another example, the program for causing the processor to function as the above-described one or more constituent elements may be installed in the eNB 800, and the wireless communication interface 825 (for example, the BB processor 826) and/or the controller 821 may execute the program. As described above, the eNB 800, the base station device 820 or the module may be provided as a device which includes the one or more constituent elements, and the program for causing the processor to function as the above-described one or more constituent elements may be provided. In addition, a readable recording medium in which the program is recorded may be provided.

In addition, in the eNB 800 shown in FIG. 54, the wireless communication unit 120 described with reference to FIG. 52 may be implemented by the wireless communication interface 825 (for example, the RF circuit 827). Further, the antenna unit 110 may be implemented by the antenna 810. Moreover, the network communication unit 130 may be implemented by the controller 821 and/or the network interface 823. Further, the storage unit 140 may be implemented by the memory 822.

Second Application Example

Figure 55:
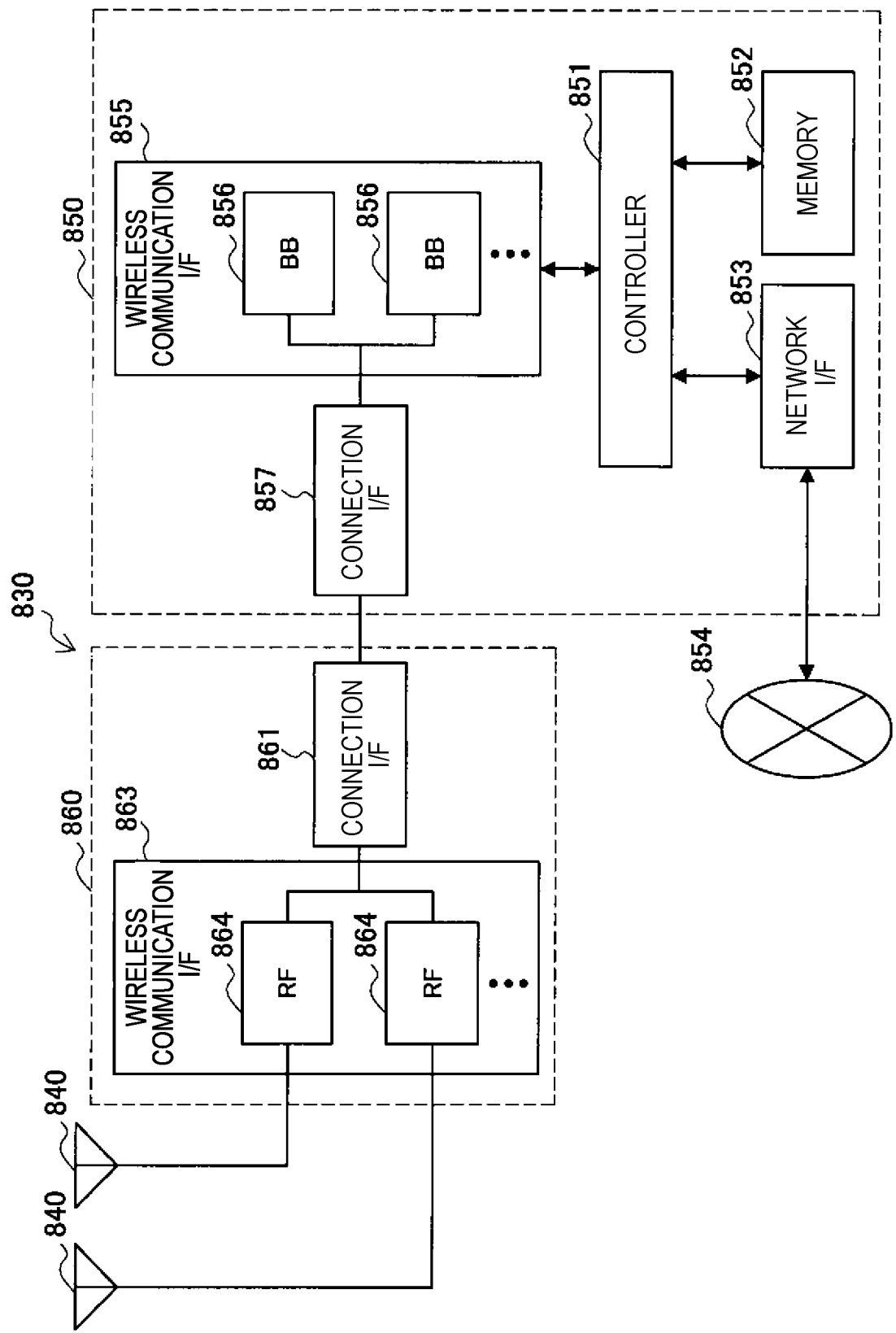
FIG. 55 is a block diagram illustrating a second example of the schematic configuration of the eNB to which the technology of the present disclosure can be applied.

FIG. 55 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 55. For example, the multiple antennas 840 may be compatible with multiple frequency bands used by the eNB 830. Although FIG. 55 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 54.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 54, except the BB processor 856 is connected to the RF circuit 864 of the RRH 860 via the connection interface 857. The wireless communication interface 855 may include the multiple BB processors 856, as illustrated in FIG. 55. For example, the multiple BB processors 856 may be compatible with multiple frequency bands used by the eNB 830. Although FIG. 55 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 55. For example, the multiple RF circuits 864 may support multiple antenna elements. Although FIG. 55 illustrates the example in which the wireless communication interface 863 includes the multiple RF circuits 864, the wireless communication interface 863 may also include a single RF circuit 864.

In the eNB 830 shown in FIG. 55, one or more constituent elements (the transmission processing unit 151 and/or the notification unit 153) included in the processing unit 150 described with reference to FIG. 52 may be implemented by the wireless communication interface 855 and/or the wireless communication interface 863. Alternatively, at least some of these constituent elements may be implemented by the controller 851. As an example, a module which includes a part (for example, the BB processor 856) or all of the wireless communication interface 855 and/or the controller 851 may be mounted in the eNB 830, and the above-described one or more constituent elements may be implemented by the module. In this case, the module may store a program for causing the processor to function as the above-described one or more constituent elements (i.e., a program for causing the processor to execute operations of the one or more constituent elements) and may execute the program. As another example, the program for causing the processor to function as the above-described one or more constituent elements may be installed in the eNB 830, and the wireless communication interface 855 (for example, the BB processor 856) and/or the controller 851 may execute the program. As described above, the eNB 830, the base station device 850 or the module may be provided as a device which includes the one or more constituent elements, and the program for causing the processor to function as the above-described one or more constituent elements may be provided. In addition, a readable recording medium in which the program is recorded may be provided.

In addition, in the eNB 830 shown in FIG. 55, for example, the wireless communication unit 120 described with reference to FIG. 52 may be implemented by the wireless communication interface 863 (for example, the RF circuit 864). Further, the antenna unit 110 may be implemented by the antenna 840. Moreover, the network communication unit 130 may be implemented by the controller 851 and/or the network interface 853. Further, the storage unit 140 may be implemented by the memory 852.

2-2. Application Example with Regard to Terminal Device

First Application Example

Figure 56:
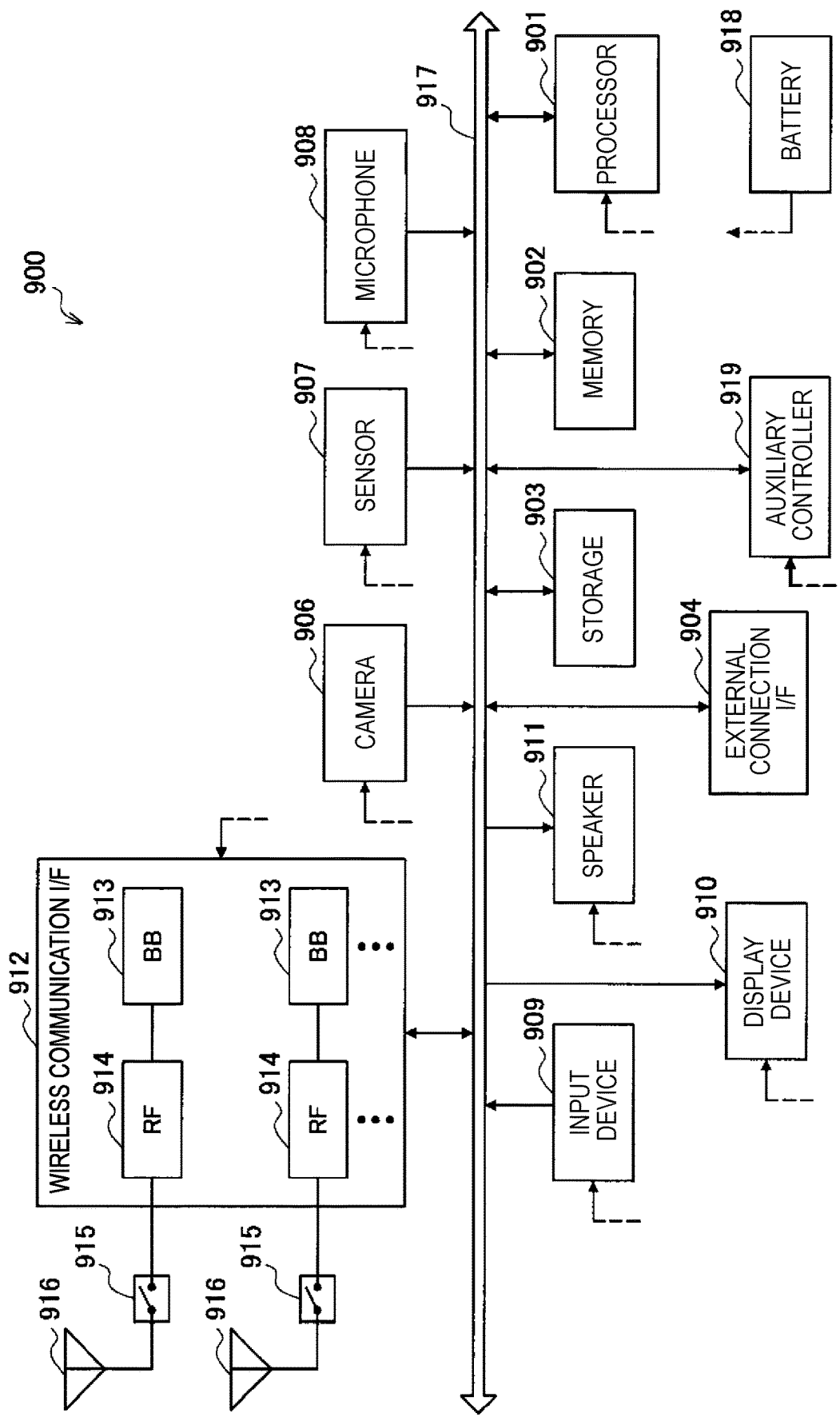
FIG. 56 is a block diagram illustrating an example of a schematic configuration of a smartphone 900 to which the technology of the present disclosure can be applied.

FIG. 56 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 913 and the multiple RF circuits 914, as illustrated in FIG. 56. Although FIG. 56 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 56. Although FIG. 56 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 56 via feeder lines, which are partially shown as dashed lines in the figure. The auxiliary controller 919 operates a minimum necessary function of the smartphone 900, for example, in a sleep mode.

In the smartphone 900 shown in FIG. 56, one or more constituent elements (the acquisition unit 241 and/or the reception processing unit 243) included in the processing unit 240 described with reference to FIG. 53 may be implemented by the wireless communication interface 912. Alternatively, at least some of these constituent elements may be implemented by the processor 901 or the auxiliary controller 919. As an example, a module which includes a part (for example, the BB processor 913) or all of the wireless communication interface 912, the processor 901 and/or the auxiliary controller 919 may be mounted in the smartphone 900, and the above-described one or more constituent elements may be implemented by the module. In this case, the module may store a program for causing the processor to function as the above-described one or more constituent elements (i.e., a program for causing the processor to execute operations of the above-described one or more constituent elements) and may execute the program. As another example, the program for causing the processor to function as the above-described one or more constituent elements may be installed in the smartphone 900, and the wireless communication interface 912 (for example, the BB processor 913), the processor 901 and/or the auxiliary controller 919 may execute the program. As described above, the smartphone 900 or the module may be provided as a device which includes the one or more constituent elements, and the program for causing the processor to function as the above-described one or more constituent elements may be provided. In addition, a readable recording medium in which the program is recorded may be provided.

In addition, in the smartphone 900 shown in FIG. 56, the wireless communication unit 220 described, for example, with reference to FIG. 53 may be implemented by the wireless communication interface 912 (for example, the RF circuit 914). Further, the antenna unit 210 may be implemented by the antenna 916. Moreover, the storage unit 230 may be implemented by the memory 902.

Second Application Example

Figure 57:
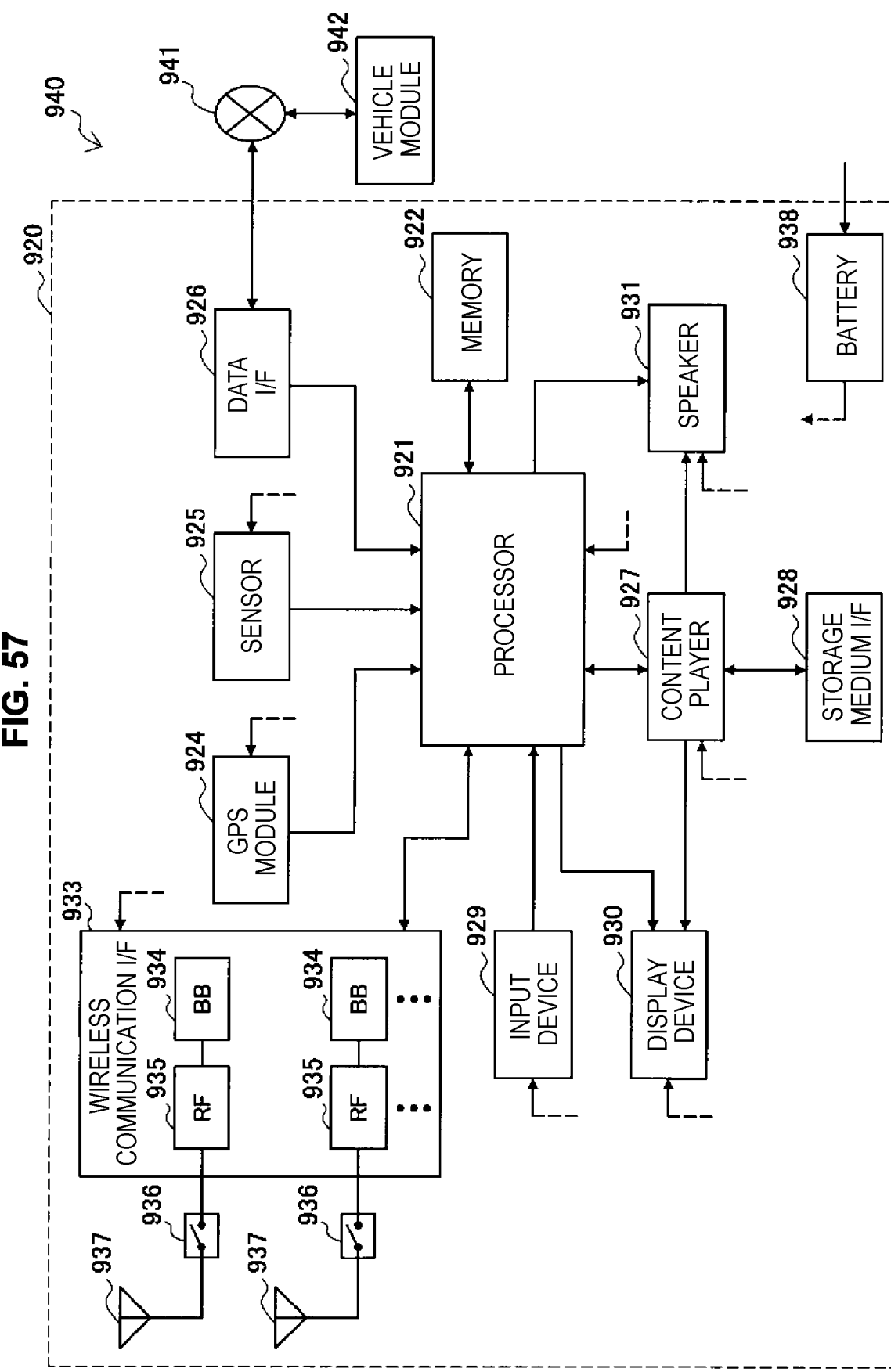
FIG. 57 is a block diagram illustrating an example of a schematic configuration of a car navigation device 920 to which the technology of the present disclosure can be applied.

FIG. 57 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 57. Although FIG. 57 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 57. Although FIG. 57 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 57 via feeder lines that are partially shown as dashed lines in the figure. The battery 938 accumulates power supplied form the vehicle.

In the car navigation device 920 shown in FIG. 57, one or more constituent elements (the acquisition unit 241 and/or the reception processing unit 243) included in the processing unit 240 described with reference to FIG. 53 may be implemented by the wireless communication interface 933. Alternatively, at least some of these constituent elements may be implemented by the processor 921. As an example, a module which includes a part (for example, the BB processor 934) or all of the wireless communication interface 933 and/or the processor 921 may be mounted in the car navigation device 920, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the above-described one or more constituent elements may be installed in the car navigation device 920, and the wireless communication interface 933 (for example, the BB processor 934) and/or the processor 921 may execute the program. As described above, the car navigation device 920 or the module may be provided as a device which includes the above-described one or more constituent elements, and the program for causing the processor to function as the above-described one or more constituent elements may be provided. In addition, a readable recording medium in which the program is recorded may be provided.

In addition, in the car navigation device 920 shown in FIG. 57, the wireless communication unit 220 described with reference to FIG. 53, for example, may be implemented by the wireless communication interface 933 (for example, the RF circuit 935). Further, the antenna unit 210 may be implemented by the antenna 937. Moreover, the storage unit 230 may be implemented by the memory 922.

The technology of the present disclosure may also be realized as an in-vehicle system (or a vehicle) 940 including one or more blocks of the car navigation device 920, the in-vehicle network 941, and a vehicle module 942. In other words, the in-vehicle system (or a vehicle) 940 may be provided as a device which includes the acquisition unit 241 and/or the reception processing unit 243. The vehicle module 942 generates vehicle data such as vehicle speed, engine speed, and trouble information, and outputs the generated data to the in-vehicle network 941.

According to the present disclosure, a device including a processing unit configured to perform sensing using one of first sensing of sensing resources for a predetermined period and selecting communication resources on a basis of a result of the sensing and second sensing of selecting communication resources on a basis of a result of decoding control information transmitted by another user with reference to a mapping table at the time of the first sensing and the second sensing is provided.

Further, according to the present disclosure, a method including performing sensing using one of first sensing of sensing resources for a predetermined period and selecting communication resources on a basis of a result of the sensing and second sensing of selecting communication resources on a basis of a result of decoding control information transmitted by another user with reference to a mapping table at the time of the first sensing and the second sensing is provided.

Further, according to the present disclosure, a first centralized sensing method and a second centralized sensing method are provided to improve efficiency of sensing.

Further, according to the present disclosure, the first centralized sensing method includes deciding, by an eNB or an RSU, one or more representatives performing sensing, assigning resources to one or more representatives performing the sensing, and liberating one or more representatives performing the sensing.

Further, according to the present disclosure, a method in which the eNB or the RSU decides one or more representatives performing sensing and a method in which the eNB or the RSU liberates one or more representatives performing sensing are included. Further, the second centralized sensing method including giving a notification to the UE, deciding one or more representatives performing sensing, using the information notified by the UE, and liberating one or more representatives performing the sensing, is provided.

Further, according to the present disclosure, since it is possible to implement transmission with less collision while maintaining fairness among users, two energy sensing+LBT sensing methods are provided.

Further, according to the present disclosure, in V2X communication, a first sensing method of energy sensing+ LBT with Backoff according to the severity of latency requirements.

Further, according to the present disclosure, in V2X communication, a second sensing method of Energy sensing+LBT without Backoff according to the severity latency requirements is provided.

Further, according to the present disclosure, a method including deciding switching between the LBT with Backoff and the LBT without Backoff and notification of an LBT type is provided.

Further, according to the present disclosure, since a case in which the operation is performed while performing coexistence with the DSRC system (802.11p communication), a two-step sensing method of detecting the DSRC system and avoiding packet collision with other users even within LTE V2X communication is provided.

Further, according to the present disclosure, in energy sensing+LBT, in the case of TDM, the SA pool and the data pool are divided in the time axis, and if the transmission authority for the SA resources and the resources of the data area are unable to be secured, transmission is unable to be performed, and thus three enhanced energy sensing+LBT sensing methods are provided.

Further, according to the present disclosure, in a case in which the transmission resources of the SA can be secured, a first Enhanced energy sensing+LBT sensing method of selecting the SA resources and the data data and transmitting a packet is provided.

Further, according to the present disclosure, in a case in which the transmission resources of data can be secured, a second enhanced energy sensing+LBT sensing method of selecting the SA resources and the data data and transmitting a packet is provided.

Further, according to the present disclosure, in a case in which both the transmission resources of the SA and the transmission resources of the data can be secured, a third enhanced energy sensing+LBT sensing method of selecting the SA resources and the data data and transmitting a packet is provided.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A device including
a processing unit configured to perform sensing using one of first sensing of sensing resources for a predetermined period and selecting communication resources on a basis of a result of the sensing and second sensing of selecting communication resources on a basis of a result of decoding control information transmitted by another user with reference to a mapping table at the time of the first sensing and the second sensing.

(2)

The device according to (1), in which the mapping table is a table in which a sensing mode to be used and a sensing parameter to be used are specified depending on a situation.

(3)

The device according to (1) or (2), in which the mapping table has a parameter of restricting a zone in which sensing is performed.

(4)

The device according to any one of (1) to (3), in which the processing unit performs switching between the first sensing and the second sensing on a basis of a predetermined condition.

(5)

The device according to any one of (1) to (4), in which the processing unit causes one of the first sensing and the second sensing to be centrally executed by another device.

(6)

The device according to (1) to (5), in which the processing unit causes another device that executes one of the first sensing and the second sensing to be liberated.

(7)

The device according to any one of (1) to (6), in which the processing unit performs sensing according to a Listen Before Talk (LBT) scheme in the first sensing.

(8)

The device according to (7), in which the processing unit selects the LBT scheme in accordance with a traffic type to be transmitted.

(9)

The device according to (8), in which the processing unit selects an LBT scheme with a back-off timer in accordance with a traffic type to be transmitted.

(10)

The device according to (8), in which the processing unit selects an LBT scheme with a back-off timer in accordance with a resource use situation.

(11)

The device according to (9), in which the back-off timer performs subtraction using a back-off timer in a time direction set in a direction of a time axis.

(12)

The device according to (9), in which the back-off timer performs subtraction using a back-off timer in a frequency direction set in a direction of a frequency axis.

(13)

The device according to (9), in which the back-off timer performs subtraction using one of a back-off timer in a time direction and a back-off timer in a frequency direction set in both directions of a time axis and a frequency axis.

(14)

The device according to (7), in which the processing unit causes a transmission terminal to acquire transmission authority for a scheduling assignment (SA) and data if only transmission resources of the SA are secured in the LBT.

(15)

The device according to (7), in which the processing unit causes a transmission terminal to acquire transmission authority for a scheduling assignment (SA) and data if only transmission resources of the data are secured in the LBT.

(16)

The device according to (7), in which the processing unit causes a transmission terminal to acquire transmission authority for a scheduling assignment (SA) and data if both transmission resources of the SA and transmission resources of the data are secured in the LBT.

(17)

The device according to any one of (1) to (16), in which the processing unit performs 2-step sensing by sensing of a DSRC system and sensing of a V2X system.

(18)

A method including
performing sensing using one of first sensing of sensing resources for a predetermined period and selecting communication resources on a basis of a result of the sensing and second sensing of selecting communication resources on a basis of a result of decoding control information transmitted by another user with reference to a mapping table at the time of the first sensing and the second sensing.

REFERENCE SIGNS LIST 100 base station
200 terminal device

The invention claimed is:

1. A device comprising
circuitry configured to perform sensing using one of first sensing of sensing resources for a predetermined period and selecting communication resources on a basis of a result of the sensing and second sensing of selecting communication resources on a basis of a result of decoding control information transmitted by another user with reference to a mapping table at the time of the first sensing and the second sensing, wherein the mapping table is a table in which a sensing mode to be used and a sensing parameter to be used are specified depending on a situation.

2. The device according to claim 1, wherein the mapping table has a parameter of restricting a zone in which sensing is performed.

3. The device according to claim 1, wherein the circuitry is further configured to perform switching between the first sensing and the second sensing on a basis of a predetermined condition.

4. The device according to claim 1, wherein the circuitry is further configured to cause one of the first sensing and the second sensing to be centrally executed by another device.

5. The device according to claim 1, wherein the circuitry is further configured to cause another device that executes one of the first sensing and the second sensing to be liberated.

6. The device according to claim 1, wherein the circuitry is further configured to perform sensing according to a Listen Before Talk (LBT) scheme in the first sensing.

7. The device according to claim 6, wherein the circuitry is further configured to select the LBT scheme in accordance with a traffic type to be transmitted.

8. The device according to claim 7, wherein the circuitry is further configured to select an LBT scheme with a back-off timer in accordance with a traffic type to be transmitted.

9. The device according to claim 7, wherein the circuitry is further configured to select an LBT scheme with a back-off timer in accordance with a resource use situation.

10. The device according to claim 8, wherein the back-off timer performs subtraction using a back-off timer in a time direction set in a direction of a time axis.

11. The device according to claim 8, wherein the back-off timer performs subtraction using a back-off timer in a frequency direction set in a direction of a frequency axis.

12. The device according to claim 8, wherein the back-off timer performs subtraction using one of a back-off timer in a time direction and a back-off timer in a frequency direction set in both directions of a time axis and a frequency axis.

13. The device according to claim 6, wherein the circuitry is further configured to cause a transmission terminal to acquire transmission authority for a scheduling assignment (SA) and data if only transmission resources of the SA are secured in the LBT.

14. The device according to claim 6, wherein the circuitry is further configured to cause a transmission terminal to acquire transmission authority for a scheduling assignment (SA) and data if only transmission resources of the data are secured in the LBT.

15. The device according to claim 6, wherein the circuitry is further configured to cause a transmission terminal to acquire transmission authority for a scheduling assignment (SA) and data if both transmission resources of the SA and transmission resources of the data are secured in the LBT.

16. The device according to claim 1, wherein the circuitry is further configured to perform 2-step sensing by sensing of a DSRC system and sensing of a V2X system.

17. A method, carried out in circuitry, comprising:
performing, using the circuitry, sensing using one of first sensing of sensing resources for a predetermined period and selecting communication resources on a basis of a result of the sensing and second sensing of selecting communication resources on a basis of a result of decoding control information transmitted by another user with reference to a mapping table at the time of the first sensing and the second sensing, wherein the mapping table is a table in which a sensing mode to be used and a sensing parameter to be used are specified depending on a situation.

18. The method of claim 17, wherein the mapping table has a parameter of restricting a zone in which sensing is performed.

19. The method of claim 17, wherein switching between the first sensing and the second sensing is performed on a basis of a predetermined condition.

20. The method of claim 17, wherein one of the first sensing and the second sensing is centrally executed by another device.

* * * * *